(12) United States Patent
Hosoda

(10) Patent No.: US 7,324,743 B2
(45) Date of Patent: Jan. 29, 2008

(54) TIME CODE CALCULATING METHOD AND TIME CODE CALCULATING APPARATUS

(75) Inventor: Takaharu Hosoda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1344 days.

(21) Appl. No.: 10/242,601

(22) Filed: Sep. 13, 2002

(65) Prior Publication Data

US 2003/0048379 A1    Mar. 13, 2003

(30) Foreign Application Priority Data

Sep. 13, 2001   (JP) .......................... P2001-278209

(51) Int. Cl.
    H04N 5/91    (2006.01)
(52) U.S. Cl. .................... 386/131; 386/65; 386/95
(58) Field of Classification Search .............. 386/65, 386/87, 95, 131
    See application file for complete search history.

(56) References Cited

U.S. PATENT DOCUMENTS 5,162,920 A  * 11/1992  Fujimoto ................. 386/95
5,373,369 A  * 12/1994  Fujimoto ................. 386/87
6,832,038 B1 * 12/2004  Hosoda .................... 386/65
7,167,633 B2 *  1/2007  Sullivan .................. 386/65

FOREIGN PATENT DOCUMENTS

| JP | 61-114657      | 6/1986  |
| JP | P2000-316138 A | 11/2000 |
| JP | 2002185980     | 6/2002  |
| JP | P2002-185980 A | 6/2002  |

* cited by examiner

Primary Examiner—Thai Q. Tran
Assistant Examiner—Mishawn Dunn
(74) Attorney, Agent, or Firm—McDermott Will & Emery LLP

(57) ABSTRACT

When converting a predetermined time code into another time code in a different format while increasing or decreasing a count value for one second corresponding to the format of the time code thus converted, first of all, a time code 210 which has not been converted is read in a frame pulse 207 corresponding to a time code 213 obtained after the conversion so that intermediate data 213' are generated. Next, an overlapping count value generated in the intermediate data 213' is corrected to add a continuity, thereby generating the time code 213 after the conversion.

14 Claims, 40 Drawing Sheets

(a) 24 frame/second frame pulse (201)

(b) 24 frame/second LTC output signal (209)

(c) 24 frame/second output LTC set value (210)

(d) 30 f frame/second converging data (211)

(e) 30 frame/second frame pulse (207)

(f) intermediate data (213')

(g) 1 field delay 2 dividing frame pulse (208)

(h) 24 frame/second output LTC offset value (212)

(i) 30 frame/second output LTC set value (213)

(j) 30 frame/second LTC output signal (214)

Fig. 9

| Read data 213' | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Offset value B2₁(M) | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 | 6 |

Fig. 10

Pattern 1(a)

| Intermediate data 213' | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Offset value B2₁(M) | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 | 6 |
| Primary conversion value 215 | 0 | 1 | 2 | 4 | 5 | 6 | 7 | 9 | 10 | 11 | 12 | 14 | 15 | 16 | 17 | 19 | 20 | 21 | 22 | 24 | 25 | 26 | 27 | 29 |
| Reference set ('∨' portion) continuous conversion ('↓' portion) | | | | | | | | | | | | | | | | | | | | | | | | ∨ |
| Continuous conversion | | | | →3 | | | | →8 | | | | →13 | | | | →18 | | | | →23 | | | | →28 |
| Conversion defined value | 0 | 1 | 2 | 3 | | | | 8 | | | | 13 | | | | 18 | | | | 23 | | | | 28 | 0 |

Pattern 1(b)

| Intermediate data 213' | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Offset value B2₁(M) | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 | 6 |
| Primary conversion value 215 | 0 | 1 | 2 | 4 | 5 | 6 | 7 | 9 | 10 | 11 | 12 | 14 | 15 | 16 | 17 | 19 | 20 | 21 | 22 | 24 | 25 | 26 | 27 | 29 |
| Reference set ('∨' portion) continuous conversion ('↓' portion) | | | | | | | | | | | | | | | | | | | | | | | | ∨ |
| Continuous conversion | | | | →3 | | | | →8 | | | | →13 | | | | →18 | | | | →23 | | | | →28 |
| Conversion defined value | 0 | 1 | 2 | 3 | | | | 8 | | | | 13 | | | | 18 | | | | 23 | | | | 28 | 0 |

Fig. 12

Pattern 2(a)

| Intermediate data 213' | 23 | | | | | | | | | | | | | | | | | | | | | | | |
|---|---|---|---|---|---|---|---|---|---|---|---|---|---|---|---|---|---|---|---|---|---|---|---|---|
| | 23 | 1 | 2 | 2 | 3 | 5 | 6 | 7 | 5 | 6 | 10 | 11 | 12 | 13 | 14 | 15 | 16 | 17 | 18 | 19 | 20 | 21 | 22 | 23 |
| Offset value B2₁(M) | 6 | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 6 |
| Primary conversion value 215 | 29 | 1 | 2 | 4 | 5 | 6 | 7 | 9 | 10 | 11 | 12 | 14 | 15 | 16 | 17 | 19 | 20 | 21 | 22 | 24 | 25 | 26 | 27 | 29 |
| Reference set ('∨' portion) continuous conversion ('↓' portion) | ∨ | | | | | | | | | | | | | | | | | | | | | | | |
| Continuous conversion | | | | →2 →3 | | | | →7 →8 | | | | →12 →13 | | | | →17 →18 | | | | →22 →23 | | | | →27 →28 |
| Conversion defined value | 29 | 1 | 2 | 3 | | | | 8 | | | | 13 | | | | 18 | | | | 23 | | | | 28 | 29 |

Pattern 2(b)

| Intermediate data 213' | 23 | 1 | 2 | 2 | 3 | 4 | 5 | 6 | 7 | 5 | 6 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| Offset value B2₁(M) | 6 | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 | 6 |
| Primary conversion value 215 | 29 | 1 | 2 | 4 | 5 | 6 | 7 | 9 | 10 | 11 | 12 | 14 | 15 | 16 | 17 | 19 | 20 | 21 | 22 | 24 | 25 | 26 | 27 | 29 |
| Reference set ('∨' portion) continuous conversion ('↓' portion) | ∨ | | | | | | | | | | | | | | | | | | | | | | | | |
| Continuous conversion | | | | →3 | | | | →8 | | | | →13 | | | | →18 | | | | →23 | | | | →28 | |
| Conversion defined value | 29 | 1 | 2 | 3 | | | | 8 | | | | 13 | | | | 18 | | | | 23 | | | | 28 | 29 |

Fig. 14

Pattern 3(a)

| Intermediate data 213' | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|---|
| Offset value | 5 | 6 | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 |
| Primary conversion value 215 | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 | 27 |
| Reference set ('V' portion) continuous conversion ('↓' portion) | | v | | | → | | | → | | | | → | | | | → | | | | → | | | | → | |
| Continuous conversion | | | | | 1 | | | 6 | | | 11 | | | 16 | 17 | | | 21 | 22 | | | 26 | 27 | | |
| Conversion defined value | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 | 27 |

Fig. 15

Pattern 3(b)

| Intermediate data 213' | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|---|
| Offset value | 5 | 6 | 0 | 0 | 0 | 1 | 1 | 1 | 1 | 2 | 2 | 2 | 2 | 3 | 3 | 3 | 3 | 4 | 4 | 4 | 4 | 5 | 5 | 5 | 5 |
| Primary conversion value 215 | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 | 27 |
| Reference set ('V' portion) continuous conversion ('↓' portion) | | v | | | | | | → | | | | → | | | | → | | | | → | | | | → | |
| Continuous conversion | | | | | 2 | 3 | | | 7 | 8 | | | 12 | 13 | | | 17 | 18 | | | 22 | 23 | | | 27 | 28 |
| Conversion defined value | 27 | 29 | 0 | 1 | 2 | 3 | 5 | 6 | 7 | 8 | 10 | 11 | 12 | 13 | 15 | 16 | 17 | 18 | 20 | 21 | 22 | 23 | 25 | 26 | 27 | 28 |

Fig. 16

Pattern 4(a)

| Intermediate data 213' | 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|
| Offset value | 5 | 5 | 6 | 0 | 0 | 1 | 1 | 1 | 1 | 2 | 2 | 2 | 2 | 3 | 3 | 3 | 3 | 4 | 4 | 4 | 4 | 5 | 5 | 5 | 5 |
| Primary conversion value 215 | 26 | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 |
| Reference set ('V' portion) continuous conversion ('↓' portion) | | | v | | → | | | → | | | | → | | | | → | | | | → | | | | → | |
| Continuous conversion | | | | | 1 | | | 5 | 6 | | | 10 | 11 | | | 15 | 16 | | | 20 | 21 | | | 25 | 26 |
| Conversion defined value | 26 | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 |

Fig. 17

Pattern 4(b)

| Intermediate data 213' | 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|
| Offset value | 5 | 5 | 6 | 0 | 0 | 1 | 1 | 1 | 1 | 2 | 2 | 2 | 2 | 3 | 3 | 3 | 3 | 4 | 4 | 4 | 4 | 5 | 5 | 5 | 5 |
| Primary conversion value 215 | 26 | 27 | 29 | 0 | 1 | 2 | 4 | 5 | 6 | 7 | 9 | 10 | 11 | 12 | 14 | 15 | 16 | 17 | 19 | 20 | 21 | 22 | 24 | 25 | 26 |
| Reference set ('V' portion) continuous conversion ('↓' portion) | | | v | | | | | → | | | | → | | | | → | | | | → | | | | → | |
| Continuous conversion | | | | | 1 | 2 | | | 6 | 7 | | | 11 | 12 | | | 16 | 17 | | | 21 | 22 | | | 26 | 27 |
| Conversion defined value | 26 | 27 | 29 | 0 | 1 | 2 | 3 | 5 | 6 | 7 | 8 | 10 | 11 | 12 | 13 | 15 | 16 | 17 | 18 | 20 | 21 | 22 | 23 | 25 | 26 | 27 |

Pattern 4(a)

| Intermediate data 213' | 21 | 22 | 23 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | | |
|---|---|---|---|---|---|---|---|---|---|---|---|---|---|---|---|---|---|---|---|---|---|---|---|---|---|---|---|
| 1 field delay 2 dividing frame pulse (208) | H | H | L | L | H | L | L | H | H | L | H | L | H | L | H | L | H | L | H | L | H | L | H | L | H | | |
| Offset value B3₁(H) for "H" | +5 | +5 | +5 | +0 | +0 | +0 | +1 | +1 | +1 | +1 | +2 | +2 | +2 | +2 | +3 | +3 | +3 | +3 | +4 | +4 | +4 | +4 | +5 | +5 | +5 | | |
| Offset value B3₁(L) for "L" | +5 | +5 | +6 | +0 | +0 | +0 | +1 | +1 | +1 | +2 | +2 | +2 | +3 | +3 | +3 | +3 | +4 | +4 | +4 | +5 | +5 | +5 | +5 | | | | |
| Primary conversion value | ** | ** | 29 | 28→ | 00→ | 02→ | 03→ | 05→ | 06→ | 07→ | 08→ | 10→ | 11→ | 12 | 13→ | 15→ | 16→ | 17→ | 18→ | 20→ | 21→ | 22→ | 23→ | 24→ | 25→ | 26 | Invalid |
| Continuous conversion | | | V | | 01 | 03 | 05 | 06 | 07 | 08 | 10 | 11 | | | 15 | | 17 | 18 | 20 | 21 | 22 | 23 | 25 | 26 | 27 | | V reference set |
| Cconversion defined value | ** | ** | 29 | 00 | 01 | 03 | 04 | 05 | 06 | 07 | 08 | 09 | 10 | 13 | 14 | 15 | 16 | 17 | 18 | 19 | 20 | 21 | 22 | 23 | 24 | 25 | 26 | 27 |

Fig. 27

Pattern 4(b)

| Intermediate data 213' | 21 | 22 | 23 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | | |
|---|---|---|---|---|---|---|---|---|---|---|---|---|---|---|---|---|---|---|---|---|---|---|---|---|---|---|---|
| 1 field delay 2 dividing frame pulse (208) | H | H | L | L | H | L | L | H | H | L | H | L | H | L | H | L | H | L | H | L | H | L | H | L | H | | |
| Offset value B3₁(H) for "H" | +5 | +5 | +5 | +0 | +0 | +0 | +1 | +1 | +1 | +1 | +2 | +2 | +2 | +2 | +3 | +3 | +3 | +3 | +4 | +4 | +4 | +4 | +5 | +5 | +5 | | |
| Offset value B3₁(L) for "L" | +5 | +5 | +6 | +0 | +0 | +1 | +1 | +1 | +2 | +2 | +2 | +3 | +3 | +3 | +3 | +4 | +4 | +4 | +5 | +5 | +5 | +5 | | | | | |
| Primary conversion value | ** | ** | 29 | 00→ | 02→ | 04 | 05→ | 06→ | 07→ | 08→ | 09→ | 10→ | 11→ | 12 | 14 | 15→ | 16→ | 17→ | 18→ | 19 | 20→ | 21→ | 22→ | 23→ | 24 | 25→ | 26 | Invalid |
| Continuous conversion | | | V | | 01 | 03 | 05 | 06 | 07 | 08 | 09 | 10 | 11 | | | 15 | 16 | 17 | 18 | | 20 | 21 | 22 | 23 | | 26 | 27 | V reference set |
| Cconversion defined value | ** | ** | 29 | 00 | 01 | 03 | 04 | 05 | 06 | 07 | 08 | 09 | 11 | 12 | 13 | 15 | 16 | 17 | 18 | 19 | 20 | 21 | 22 | 23 | 24 | 25 | 26 | 27 |

Fig. 35

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| Intermediate data 313' | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
| Offset value $B5_{(M)}$ | +0 | +0 | -1 | -1 | -1 | -1 | -2 | -2 | -2 | -2 | -2 | -3 | -3 | -3 | -3 | -3 | -3 | -4 | -4 | -4 | -4 | -4 | -5 | -5 | -5 | -5 | -5 | -6 | -6 | -6 |

Fig. 36

Pattern 1

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| Intermediate data 313' | 00 | 01 | 02 | 04 | 05 | 06 | 07 | 09 | 10 | 11 | 12 | 14 | 15 | 16 | 17 | 19 | 20 | 21 | 22 | 24 | 25 | 26 | 27 | 29 | | | | | | |
| Offset value $B5_{(M)}$ | +0 | +0 | -1 | -1 | -1 | -1 | -2 | -2 | -2 | -2 | -2 | -3 | -3 | -3 | -3 | -3 | -3 | -4 | -4 | -4 | -4 | -4 | -5 | -5 | -5 | -5 | -5 | -6 | -6 | +0 |
| Primary conversion value 315 | 00 | 01 | 01 | 03 | 04 | 05 | 05 | 07 | 08 | 09 | 10 | 11 | 12 | 13 | 14 | 16 | 17 | 17 | 18 | 20 | 21 | 22 | 22 | 24 | | | | | | 00 |
| Continuous conversion | v | | → 02 | | | | → 06 | | | | | | | → 14 | | | | | → 18 | | | | | v | | | | | | v |
| Conversion defined value | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | | | | | | 00 | v Reference set

Fig. 37

Pattern 2

| | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|---|
| Intermediate data 313' | 29 | 00 | 01 | 03 | 04 | 05 | 06 | 08 | 09 | 10 | 11 | 13 | 14 | 15 | 16 | 18 | 19 | 20 | 21 | 23 | 24 | 25 | 26 | 28 | 29 | | | | | |
| Offset value $B5_{(M)}$ | -6 | +0 | +0 | -1 | -1 | -1 | -1 | -2 | -2 | -2 | -2 | -2 | -3 | -3 | -3 | -3 | -3 | -3 | -4 | -4 | -4 | -4 | -4 | -5 | -5 | -5 | -5 | -5 | -6 | -6 |
| Primary conversion value 315 | 23 | 00 | 01 | 02 | 03 | 04 | 05 | 06 | 07 | 08 | 09 | 11 | 11 | 12 | 13 | 15 | 16 | 17 | 17 | 19 | 20 | 21 | 22 | 23 | | | | | | |
| Continuous conversion | v | | | | | | | | | | → 10 | | | | | → 14 | | | | | | | | v | | | | | | |
| Conversion defined value | 23 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | | | | | | v Reference set

Fig. 38

Pattern 3

| | 28 | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|---|---|
| Intermediate data 313' | 28 | 29 | 00 | 02 | 03 | 04 | 05 | 07 | 08 | 09 | 10 | 12 | 13 | 14 | 15 | 17 | 18 | 19 | 20 | 22 | 23 | 24 | 25 | 27 | 28 | | | | | |
| Offset value $B5_{(M)}$ | -6 | -6 | +0 | -1 | -1 | -1 | -1 | -2 | -2 | -2 | -2 | -2 | -3 | -3 | -3 | -3 | -3 | -3 | -4 | -4 | -4 | -4 | -4 | -5 | -5 | -5 | -5 | -5 | -6 | -6 |
| Primary conversion value 315 | 22 | 23 | 00 | 01 | 02 | 03 | 04 | 05 | 06 | 07 | 08 | 10 | 10 | 11 | 12 | 14 | 15 | 16 | 16 | 18 | 19 | 20 | 21 | 22 | | | | | | |
| Continuous conversion | v | v | | | | | | | | | | | | | | | | | | | | | | | | | | | | |
| Conversion defined value |  |  | 23 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | | | | | v Reference set

Fig. 39

Pattern 4

| | 27 | 28 | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|---|---|---|
| Intermediate data 313' | 27 | 28 | 29 | 01 | 02 | 03 | 04 | 06 | 07 | 08 | 09 | 11 | 12 | 13 | 14 | 16 | 17 | 18 | 19 | 21 | 22 | 23 | 24 | 26 | 27 | | | | | |
| Offset value $B5_{(M)}$ | -6 | -6 | -6 | +0 | -1 | -1 | -1 | -2 | -2 | -2 | -2 | -2 | -3 | -3 | -3 | -3 | -3 | -3 | -4 | -4 | -4 | -4 | -4 | -5 | -5 | -5 | -5 | -5 | -6 | -6 |
| Primary conversion value 315 | 21 | 22 | 23 | 01 | 02 | 03 | 03 | 04 | 05 | 06 | 07 | 09 | 09 | 10 | 11 | 13 | 14 | 15 | 15 | 17 | 18 | 19 | 20 | 21 | | | | | | |
| Continuous conversion | | | v | → 00 | | | → 04 | | | | | → 08 | | | | → 12 | | | | → 16 | | | → 20 | | | | | | | |
| Conversion defined value |  |  | 23 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | | | | | | v Reference set

Fig. 40

| Pattern 5 | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| Intermediate data 313' | 26 | 27 | 28 | 00 | 01 | 02 | 03 | 05 | 06 | 07 | 08 | 10 | 11 | 12 | 13 | 15 | 16 | 17 | 18 | 20 | 21 | 22 | 23 | 25 | 26 | | | | |
| Offset value B5$_{1(M)}$ | -6 | -6 | -6 | +0 | +0 | -1 | -1 | -1 | -1 | -2 | -2 | -2 | -2 | -3 | -3 | -3 | -3 | -4 | -4 | -4 | -4 | -5 | -5 | -5 | -5 | | | | |
| Primary conversion value 315 | 20 | 21 | 22 | 00 | | 01 | 02 | 04 | 05 | 05 | 06 | 08 | 09 | 09 | 10 | 12 | 13 | 13 | 14 | 16 | 17 | 17 | 18 | 20 | 21 | | | | |
| Continuous conversion | | | | V | | 01→ | 02→ | | | 05→ | 06→ | | | 09→ | 10→ | | | 13→ | 14→ | | | 17→ | 18→ | | | | | | |
| | | | | | | 02 | 03 | | | 06 | 07 | | | 10 | 11 | | | 14 | 15 | | | 18 | 19 | | | | | | |
| Conversion defined value | ** | ** | ** | 00 | 01 | 02 | 03 | 04 | 05 | 06 | 07 | 08 | 09 | 10 | 11 | 12 | 13 | 14 | 15 | 16 | 17 | 18 | 19 | 20 | 21 | | | | |

V Reference set

| Number of frame of synchronous point time information (233) | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Offset value | +0 | +0 | -1 | -1 | -1 | -1 | -2 | -2 | -2 | -2 | -3 | -3 | -3 | -3 | -4 | -4 | -4 | -4 | -5 | -5 | -5 | -5 | -6 | -6 |

Process for conversion into synchronous point (for 00,01 frame)

| Intermediate data 213' | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
| Offset value | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 | +0 |
| Synchronous regulation set value 216 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |

Fig. 45

Process for conversion into synchronous point (for 02 to 05 frame)

| Intermediate data 213' | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
| Offset value | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| Synchronous regulation set value 216 | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |

Fig. 46

Process for conversion into synchronous point (for 06 to 09 frame)

| Intermediate data 213' | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
| Offset value | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 | -2 |
| Synchronous regulation set value 216 | 28 | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 |

Fig. 47

Process for conversion into synchronous point (for 10 to 13 frame)

| Intermediate data 213' | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 |
| Offset value | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 | -3 |
| Synchronous regulation set value 216 | 27 | 28 | 29 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 |

Fig. 48

Process for conversion into synchronous point (for 14 to 17 frame)

| Intermediate data 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 00 |
|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 18 | 19 | 20 | 21 | 22 | 23 | 24 | 28 | 29 | 00 |
| Offset value | | | | | | | | | | | | | | | | -4 | -4 | -4 | -4 | -4 | -4 | -4 | -4 | -4 | -4 |
| Synchronous regulation set value 216 | | | | | | | | | | | | | | | | 26 | 27 | 28 | 29 | 00 | 01 | 02 | 03 | 24 | 25 | 26 |

Fig. 49

Process for conversion into synchronous point (for 18 to 21 frame)

| Intermediate data 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 00 |
|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 23 | 24 | 25 | | | |
| Offset value | | | | | | | | | | | | | | | | | | | | -5 | -5 | -5 | -5 | -5 | -5 |
| Synchronous regulation set value 216 | | | | | | | | | | | | | | | | | | | | 25 | 26 | 27 | 28 | 29 | 00 |

Fig. 50

Process for conversion into synchronous point (for 22,23 frame)

| Intermediate data 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 00 |
|---|---|---|---|---|---|---|---|---|---|---|---|---|---|---|---|---|---|---|---|---|---|---|---|---|---|
| 30 frame/second output LTC set value 213 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
| Offset value | -6 | -6 | -6 | -6 | -6 | -6 | -6 | -6 | -6 | -6 | -6 | -6 | -6 | -6 | -6 | -6 | -6 | -6 | -6 | -6 | -6 | -6 | -6 | -6 | -6 |
| Synchronous regulation set value 216 | 24 | 25 | 26 | 27 | 28 | 29 | 00 | 01 | 02 | 03 | 04 | 05 | 06 | 07 | 08 | 09 | 10 | 11 | 12 | 13 | 14 | 15 | 16 | 17 | 18 |

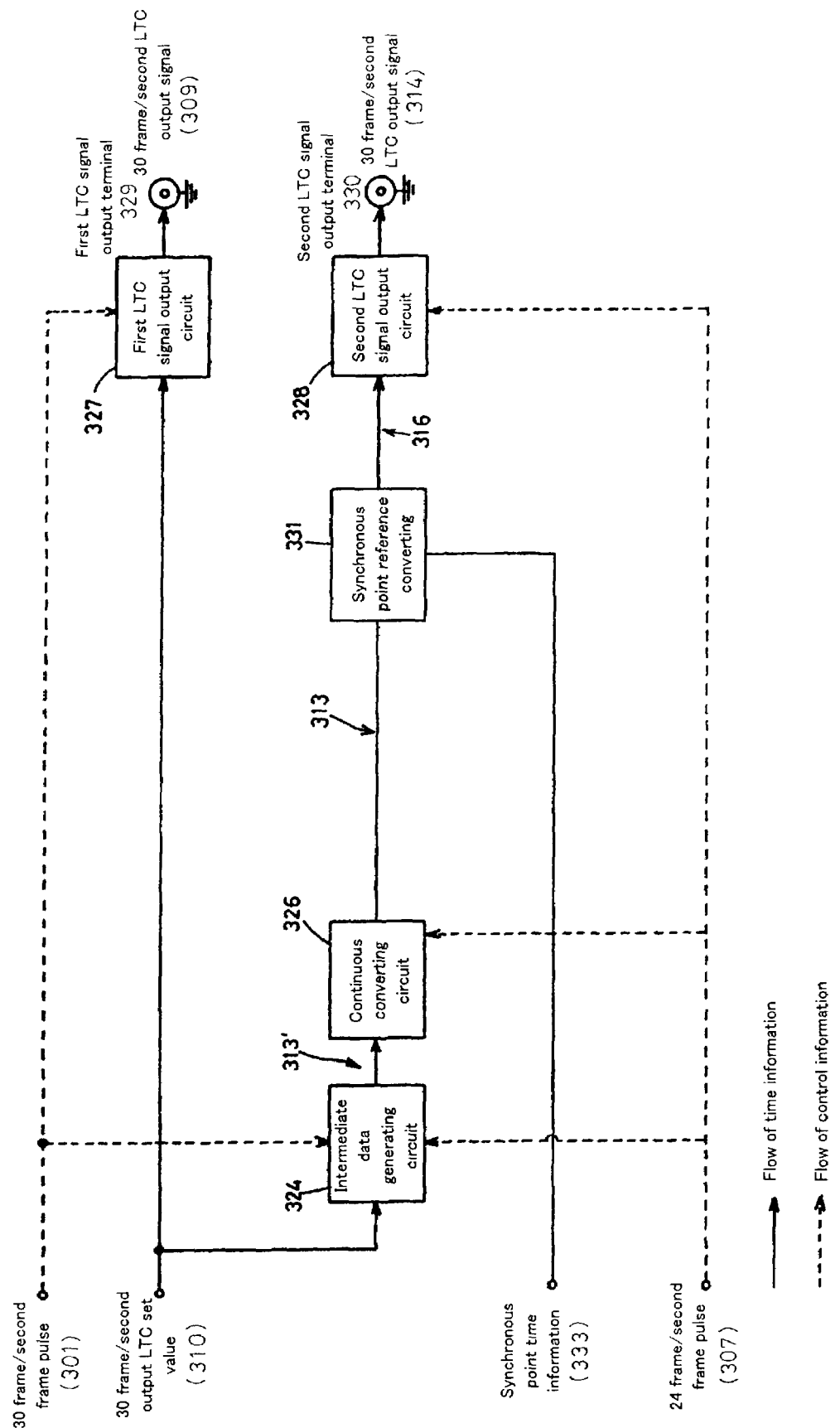

Intermediate data 313'
24 frame/second LTC set value 313

Fig. 53

| Number of frame of synchronous point time information (333) | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Offset value | +0 | +0 | +0 | +0 | +1 | +1 | +1 | +1 | +1 | +2 | +2 | +2 | +2 | +2 | +3 | +3 | +3 | +3 | +3 | +4 | +4 | +4 | +4 | +4 |

Fig. 54

Process for conversion into synchronous point (for 00 to 03 frame)

| Intermediate data 313' | 00 | 01 | 02 | 03 | 04 | 05 | 06 | 07 | 08 | 09 | 10 | | | | | | | | | | | | | |
|---|---|---|---|---|---|---|---|---|---|---|---|---|---|---|---|---|---|---|---|---|---|---|---|---|
| 24 frame/second output LTC set value 313 | 00 | 01 | 02 | 04 | 05 | 06 | 07 | 08 | 09 | 10 | | | | | | | | | | | | | | |
| Offset value | +0 | +0 | +0 | +0 | +0 | +0 | +0 | +0 | +0 | +0 | | | | | | | | | | | | | | |
| Synchronous regulation set value 316 | 00 | 01 | 02 | 03 | 04 | 05 | 06 | 07 | 08 | | | | | | | | | | | | | | | |

Fig. 55

Process for conversion into synchronous point (for 04 to 08 frame)

| Intermediate data 313' | 00 | 01 | 02 | 03 | 04 | 05 | 06 | 07 | 09 | 10 | 11 | 12 | 13 | 14 | 15 | | | | | | | | | |
|---|---|---|---|---|---|---|---|---|---|---|---|---|---|---|---|---|---|---|---|---|---|---|---|---|
| 24 frame/second output LTC set value 313 | 00 | 01 | 02 | 03 | 04 | 05 | 06 | 07 | 08 | 09 | 10 | 11 | 12 | 13 | 14 | 15 | | | | | | | | |
| Offset value | +0 | +0 | +0 | +0 | +1 | +1 | +1 | +1 | +1 | +1 | +1 | +1 | +1 | +1 | +1 | | | | | | | | | |
| Synchronous regulation set value 316 | 00 | 01 | 02 | 03 | 04 | 05 | 06 | 07 | 08 | 09 | 10 | 11 | 12 | 13 | | | | | | | | | | |

Fig. 56

Process for conversion into synchronous point (for 09 to 13 frame)

| Intermediate data 313' | 00 | 01 | 02 | 03 | 04 | 05 | 06 | 07 | 09 | 10 | 11 | 12 | 14 | 15 | 16 | 17 | 19 | 20 | 21 | | | | | |
|---|---|---|---|---|---|---|---|---|---|---|---|---|---|---|---|---|---|---|---|---|---|---|---|---|
| 24 frame/second output LTC set value 313 | 00 | 01 | 02 | 03 | 04 | 05 | 06 | 07 | 08 | 09 | 10 | 11 | 12 | 13 | 14 | 15 | 16 | 17 | 18 | 19 | 20 | | | |
| Offset value | +0 | +2 | +2 | +2 | +2 | +2 | +2 | +2 | +2 | +2 | +2 | +2 | +2 | +2 | +2 | +2 | +2 | +2 | +2 | +2 | +2 | | | |
| Synchronous regulation set value 316 | 01 | 02 | 03 | 04 | 05 | 06 | 07 | 08 | 09 | 10 | 11 | 12 | 13 | 14 | 15 | 16 | 17 | 18 | | | | | | |

Fig. 57

Process for conversion into synchronous point (for 14 to 18 frame)

| Intermediate data 313' | 00 | 01 | 02 | 03 | 04 | 05 | 06 | 07 | 09 | 10 | 11 | 12 | 14 | 15 | 16 | 17 | 19 | 20 | 21 | 22 | | | | |
|---|---|---|---|---|---|---|---|---|---|---|---|---|---|---|---|---|---|---|---|---|---|---|---|---|
| 24 frame/second output LTC set value 313 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
| Offset value | +3 | +3 | +3 | +3 | +3 | +3 | +3 | +3 | +3 | +3 | +3 | +3 | +3 | +3 | +3 | +3 | +3 | +3 | +3 | +3 | +3 | +3 | +3 | +3 |
| Synchronous regulation set value 316 | 03 | 04 | 05 | 06 | 07 | 08 | 09 | 10 | 11 | 12 | 13 | 14 | 15 | 16 | 17 | 18 | 19 | 20 | 21 | 22 | 23 | 00 | 01 | 02 |

Fig. 58

Process for conversion into synchronous point (for 19 to 23 frame)

| Intermediate data 313' | 00 | 01 | 02 | 03 | 04 | 05 | 06 | 07 | 09 | 10 | 11 | 12 | 14 | 15 | 16 | 17 | 19 | 20 | 21 | 22 | | | | |
|---|---|---|---|---|---|---|---|---|---|---|---|---|---|---|---|---|---|---|---|---|---|---|---|---|
| 24 frame/second output LTC set value 313 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
| Offset value | +4 | +4 | +4 | +4 | +4 | +4 | +4 | +4 | +4 | +4 | +4 | +4 | +4 | +4 | +4 | +4 | +4 | +4 | +4 | +4 | +4 | +4 | +4 | +4 |
| Synchronous regulation set value 316 | 04 | 05 | 06 | 07 | 08 | 09 | 10 | 11 | 12 | 13 | 14 | 15 | 16 | 17 | 18 | 19 | 20 | 21 | 22 | 23 | 00 | 01 | 02 | 03 | 04 |

TIME CODE CALCULATING METHOD AND TIME CODE CALCULATING APPARATUS

FIELD OF THE INVENTION

The present invention relates to a time code calculating method and a time code calculating apparatus which calculate a time code to be attributed to an image signal of a recording media.

BACKGROUND OF THE INVENTION

An absolute address signal is recorded on a recording media (a video tape, a hard disk or the like) such as a video tape for broadcasting in a state of a one-to-one correspondence to an image signal for each frame. Accurate edition is carried out based on the absolute signal for the edition of the video tape for broadcasting and non-linear edition utilizing the hard disk.

The absolute address signal is referred to as an SMPTE/EBU time code (which will be hereinafter referred to as a time code), in which SMPTE (Society of Motion Picture and Television Engineers) and EBU (European Broadcast Union) are standardized.

For a method of transmitting an image signal, there has been used a television transmitting method such as a method constituting a frame for one second by 30 frames (which will be hereinafter referred to as a 30 frame/second type) or a method of constituting a one-second frame by 25 frames (which will be hereinafter referred to as a 25 frame/second type). In recent years, furthermore, there has also been used a method for an image of a movie such as a method of constituting a one-second frame by 24 frames (which will be hereinafter referred to a 24 frame/second type).

A time/minute/second/frame is used for the unit of a time code. Each unit of the time code is constituted by a 2-figure number (00/00/00). The digits of time, minute and second are counted in the same manner as in a 24-hour clock. For a frame digit, a frame number per second in the method is counted, and digit-up and down to a second digit are carried out.

In the 30 frame/second type, a time per frame is 33.3 milliseconds. For this reason, one frame has 29.97 Hz (30 Hz: a 1000 msec=xHz: 33.3 milliseconds×30 frames). Therefore, it is impossible to avoid such a situation that a shift is slightly caused between the step of the time code and an actual time. A shift of approximately 108 frames (3.6 seconds) per hour is caused and becomes a problem when an edition work or the like is to be executed for a long time. In the 25 frame/second type and the 24 frame/second type, the shift of the step is not caused because the actual time and the step of the time code are coincident with each other.

In the 30 frame/second type, the following two standards are set to the step of the time code.

A first standard is referred to as a drop mode in which a time code is dropped (removed) corresponding to a shift in order to eliminate the shift of the step. In the drop mode standard, two frames (each minute/00 frame and each minute/01 frame; these frames will be hereinafter referred to as drop frames) are skipped from each positive point (00 second point per minute) excluding 0 minute, 10 minutes, 20 minutes, 30 minutes, 40 minutes and 50 minutes for each hour respectively in order to eliminate the shift of the step between a frame non-coincidence actual time and a time code for a long time (which is equal to or more than a minute). More specifically, a next frame to the 29th frame is not set to be a 00 frame but 02 frame with a jump so that the time code is excessively stepped. Consequently, the shift of the step is eliminated.

A second mode is referred to as a non-drop mode in which the shift of a step present between an actual time and a time on the time code is estimated to utilize the time code. In the non-drop mode, a frame to be skipped is not generated differently from the drop mode.

Thus, the method of transmitting an image signal mixes various methods such as the 24 frame/second type, the 25 frame/second type, the 30 frame/second type (drop mode) and the 30 frame/second type (non-drop mode). For this reason, in the case in which a plurality of image sources are to be prepared for various image production works (edition and the like), it has become difficult to prepare the same standard. Under the circumstances, recently, a converter for converting the standard of an image signal to be recorded again has been desired highly.

SUMMARY OF THE INVENTION

Accordingly, the present invention has a main object to provide a time code calculating method and a time code calculating apparatus which can be used optimally when converting the standard of an image signal.

In order to achieve the above-mentioned object, the present invention constitutes the time code calculating method and the time code calculating apparatus in the following manner.

The present invention provides a time code calculating method for converting a predetermined time code into another time code in a different format while increasing or decreasing a count value for one second corresponding to the format of the time code obtained after the conversion, comprising:

an intermediate data generating step of generating intermediate data by reading the time code which has not been converted in a frame pulse corresponding to the time code obtained after the conversion; and an overlapping count value correcting step of correcting an overlapping count value generated in the intermediate data to add a continuity to the intermediate data, thereby generating the time code which has been converted.

Moreover, the present invention provides a time code calculating apparatus for converting a predetermined time code into another time code in a different format while increasing or decreasing a count value for one second corresponding to the format of the time code obtained after the conversion, comprising:

an intermediate data generator for generating intermediate data by reading the time code which has not been converted in a frame pulse corresponding to the time code obtained after the conversion; and an overlapping count value corrector for correcting an overlapping count value generated in the intermediate data to add a continuity to the intermediate data, thereby generating the time code obtained after the conversion.

Consequently, the present invention provides a time code calculating method and a time code calculating apparatus which can be used optimally when converting the standard of an image signal.

BRIEF DESCRIPTION OF THE DRAWINGS

Other objects of the present invention will be apparent from the understanding of specific embodiments to be described below and will be clarified in the appended claims.

Various advantages which are not described in this specification will be obvious to the skilled in the art by carrying out the present invention.

FIG. 9 is a diagram showing the structure of a continuity addition offset table according to the second embodiment;

FIG. 10 is a diagram showing a pattern 1($a$) of continuous conversion in the time code calculating step of the time code calculating apparatus according to the second embodiment;

FIG. 11 is a diagram showing a pattern 1($b$) of the continuous conversion in the time code calculating step of the time code calculating apparatus according to the second embodiment;

FIG. 12 is a diagram showing a pattern 2($a$) of the continuous conversion in the time code calculating step of the time code calculating apparatus according to the second embodiment;

FIG. 13 is a diagram showing a pattern 2($b$) of the continuous conversion in the time code calculating step of the time code calculating apparatus according to the second embodiment;

FIG. 14 is a diagram showing a pattern 3($a$) of the continuous conversion in the time code calculating step of the time code calculating apparatus according to the second embodiment;

FIG. 15 is a diagram showing a pattern 3($b$) of the continuous conversion in the time code calculating step of the time code calculating apparatus according to the second embodiment;

FIG. 16 is a diagram showing a pattern 4($a$) of the continuous conversion in the time code calculating step of the time code calculating apparatus according to the second embodiment;

FIG. 17 is a diagram showing a pattern 4($b$) of the continuous conversion in the time code calculating step of the time code calculating apparatus according to the second embodiment;

FIG. 19 is a diagram showing the structure of a continuity addition offset table according to the third embodiment;

FIG. 20 is a diagram showing a pattern 1($a$) of continuous conversion in the time code calculating step of the time code calculating apparatus according to the third embodiment;

FIG. 21 is a diagram showing a pattern 1($b$) of the continuous conversion in the time code calculating step of the time code calculating apparatus according to the third embodiment;

FIG. 22 is a diagram showing a pattern 2($a$) of the continuous conversion in the time code calculating step of the time code calculating apparatus according to the third embodiment;

Figures 23, 24, 25:
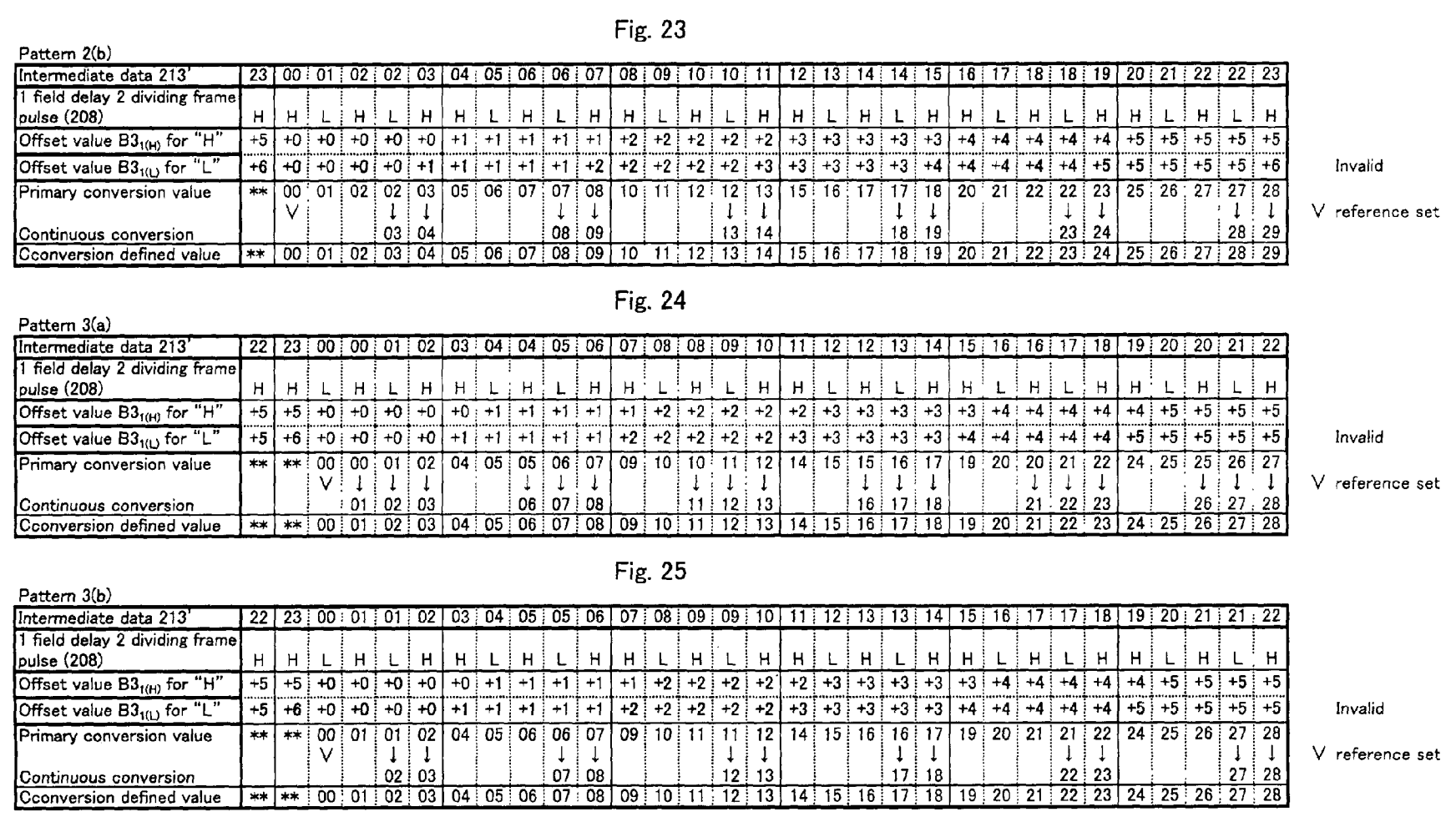

FIG. 23 is a diagram showing a pattern 2($b$) of the continuous conversion in the time code calculating step of the time code calculating apparatus according to the third embodiment;

FIG. 24 is a diagram showing a pattern 3($a$) of the continuous conversion in the time code calculating step of the time code calculating apparatus according to the third embodiment;

FIG. 25 is a diagram showing a pattern 3($b$) of the continuous conversion in the time code calculating step of the time code calculating apparatus according to the third embodiment;

FIG. 26 is a diagram showing a pattern 4($a$) of the continuous conversion in the time code calculating step of the time code calculating apparatus according to the third embodiment;

FIG. 27 is a diagram showing a pattern 4($b$) of the continuous conversion in the time code calculating step of the time code calculating apparatus according to the third embodiment;

FIG. 35 is a diagram showing the structure of a continuity addition offset table according to the fifth embodiment;

FIG. 36 is a diagram showing a pattern 1 of continuous conversion in the time code calculating step of the time code calculating apparatus according to the fifth embodiment;

FIG. 37 is a diagram showing a pattern 2 of the continuous conversion in the time code calculating step of the time code calculating apparatus according to the fifth embodiment;

FIG. 38 is a diagram showing a pattern 3 of the continuous conversion in the time code calculating step of the time code calculating apparatus according to the fifth embodiment;

FIG. 39 is a diagram showing a pattern 4 of the continuous conversion in the time code calculating step of the time code calculating apparatus according to the fifth embodiment;

FIG. 40 is a diagram showing a pattern 5 of the continuous conversion in the time code calculating step of the time code calculating apparatus according to the fifth embodiment;

FIGS. 42A to 42G are diagrams showing the relationship between intermediate data and a 30 frame/second output LTC set value according to the sixth embodiment, respectively;

FIG. 43 is a diagram showing the structure of a synchronous regulation offset table according to the sixth embodiment;

FIG. 44 is a diagram showing a conversion process to a synchronous point (00, 01) in the time code calculating step of the time code calculating apparatus according to the sixth embodiment;

FIG. 45 is a diagram showing a conversion process to a synchronous point (02 to 05) in the time code calculating step of the time code calculating apparatus according to the sixth embodiment;

FIG. 46 is a diagram showing a conversion process to a synchronous point (06 to 09) in the time code calculating step of the time code calculating apparatus according to the sixth embodiment;

FIG. 47 is a diagram showing a conversion process to a synchronous point (10 to 13) in the time code calculating step of the time code calculating apparatus according to the sixth embodiment;

FIG. 48 is a diagram showing a conversion process to a synchronous point (14 to 17) in the time code calculating step of the time code calculating apparatus according to the sixth embodiment;

FIG. 49 is a diagram showing a conversion process to a synchronous point (18 to 21) in the time code calculating step of the time code calculating apparatus according to the sixth embodiment;

FIG. 50 is a diagram showing a conversion process to a synchronous point (22, 23) in the time code calculating step of the time code calculating apparatus according to the sixth embodiment;

FIG. 51 is a block diagram showing the structure of a time code calculating apparatus according to a seventh embodiment of the present invention;

FIGS. 52A to 52E are diagrams showing the relationship between intermediate data and a 24 frame/second output LTC set value according to the seventh embodiment, respectively;

FIG. 53 is a diagram showing the structure of a synchronous regulation offset table according to the seventh embodiment;

FIG. 54 is a diagram showing a conversion process to a synchronous point (00 to 03) in the time code calculating step of the time code calculating apparatus according to the seventh embodiment;

FIG. 55 is a diagram showing a conversion process to a synchronous point (04 to 08) in the time code calculating step of the time code calculating apparatus according to the seventh embodiment;

FIG. 56 is a diagram showing a conversion process to a synchronous point (09 to 13) in the time code calculating step of the time code calculating apparatus according to the seventh embodiment;

FIG. 57 is a diagram showing a conversion process to a synchronous point (14 to 18) in the time code calculating step of the time code calculating apparatus according to the seventh embodiment;

FIG. 58 is a diagram showing a conversion process to a synchronous point (19 to 23) in the time code calculating step of the time code calculating apparatus according to the seventh embodiment;

DETAILED DESCRIPTION OF THE INVENTION

Preferred embodiments of the present invention will be described below with reference to the drawings.

First Embodiment

A first embodiment provides a time code calculating apparatus to be used when converting image data of a 24 frame/second type (a non-drop mode) into image data having a 30 frame/second type (a non-drop mode). In the first embodiment, a time code is converted in such a state that a synchronous point is fixed in the time code calculating apparatus.

The fixation of the synchronous point implies that [ab (hour):cd (minute):ef (second):00 (frame)] indicative of a positive point for each second is set to be a synchronous point.

Such a time code calculating apparatus is incorporated and used in a recording and reproducing apparatus such as a digital VTR for converting, recording and reproducing an image format.

Figure 1:
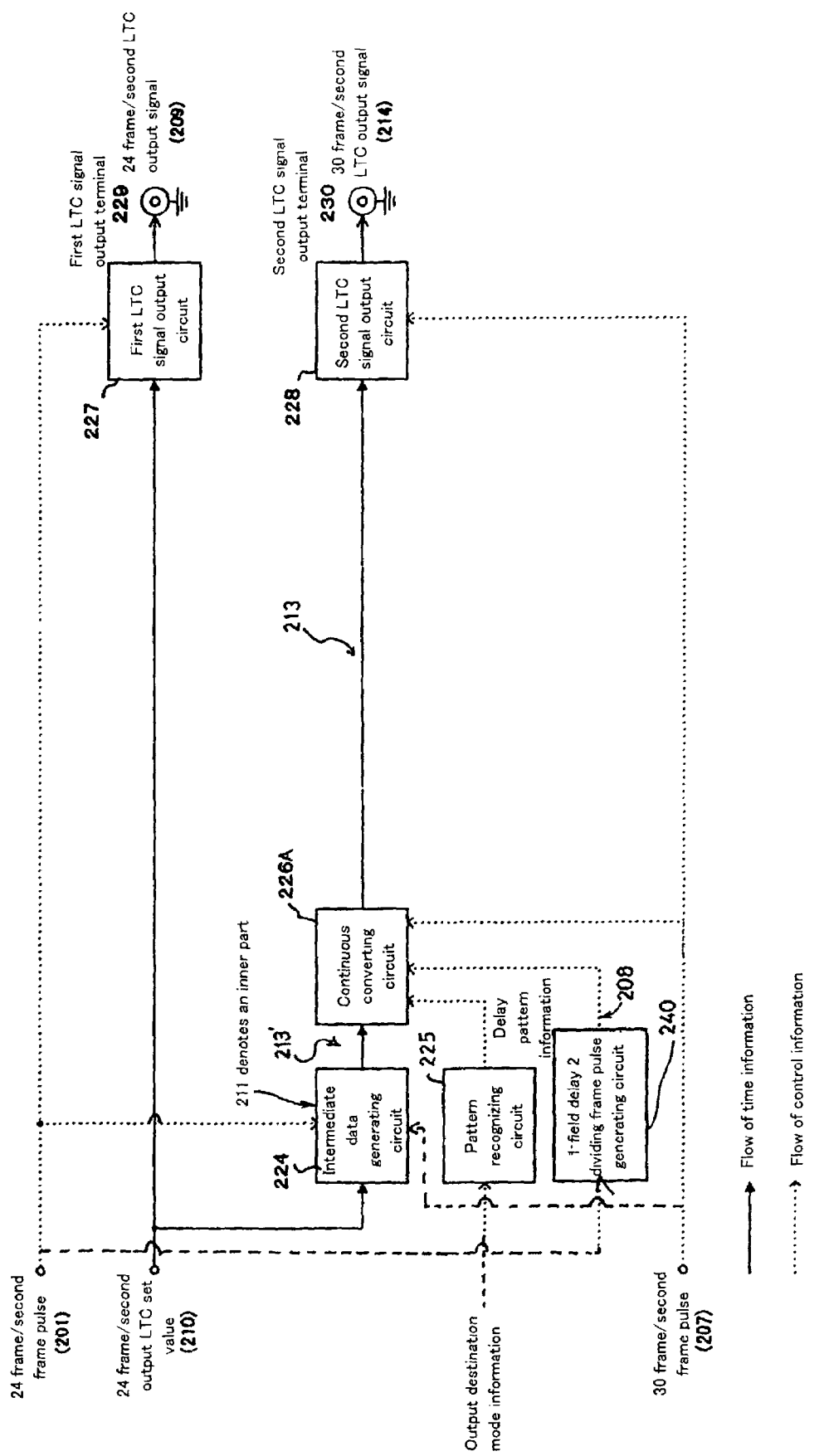
FIG. 1 is a block diagram showing the structure of a time code calculating apparatus according to a first embodiment of the present invention.

First of all, the schematic structure of the time code calculating apparatus according to the present embodiment will be described with reference to a functional block diagram of FIG. 1 and a time chart schematically showing a signal conversion process of FIG. 2.

The time code calculating apparatus comprises an intermediate data generating circuit 224 according to an example of an intermediate data generator, a pattern recognizing circuit 225, a continuity converting circuit 226A according to an example of an overlapping count value corrector, a first LTC signal output circuit 227, a second LTC signal output circuit 228 and a 1-field delay 2-diving frame pulse generating circuit 240.

The intermediate data generating circuit 224 reads an output LTC set value 210 to be used for image data of a 24 frame/second type in the output timing of a frame pulse 201 to be used in the image data of the 24 frame/second type (more specifically, a pulse fall timing). Consequently, the intermediate data generating circuit 224 generates data 211 for 30 frame-second conversion therein. Furthermore, the intermediate data generating circuit 224 reads the data 211 for 30 frame/second conversion in the output timing of a 30 frame/second frame pulse 207 (more specifically, a pulse fall timing), thereby generating intermediate data 213'.

The pattern recognizing circuit 225 decides a delay pattern generated in a recording and reproducing apparatus in which the time code calculating apparatus is incorporated based on a combination of an operation mode (reproduction, recording, edition, fast-forward reproduction or the like) of the recording and reproducing apparatus and an image data output destination (a display device, a hard disk image recording apparatus, an editing apparatus or the like), and supplies the delay pattern information to a continuity converting circuit 226A.

The continuity converting circuit 226A applies, to the intermediate data 213', an offset corresponding to the delay pattern information (supplied from the pattern recognizing circuit 225), thereby generating a 30 frame/second output set value 21213 which is continuous and is synchronous with the 24 frame/second output LTC set value 210 at a synchronous point without a delay.

The first LTC signal output circuit 227 reads the 24 frame/second output LTC set value 210 in the output timing (more specifically, a pulse rise timing) of the 24 frame/second frame pulse 201, thereby generating a 24 frame/second LTC output signal 209 and outputting the same 24 frame/second LTC output signal 209 from a first LTC signal output terminal 229 to the outside.

The second LTC signal output circuit 228 reads the 30 frame/second output LTC set value 213 in the output timing (more specifically, a pulse rise timing) of the 30 frame/second frame pulse 207, thereby generating a 30 frame/second LTC output signal 214 and outputting the 30 frame/second LTC output signal 214 from a second LTC signal output terminal 230 to the outside.

The 1-field delay 2-dividing frame pulse generating circuit 240 divides the 24 fame/second frame pulse 201 into two parts and carries out a delay processing for one field (½ cycle), thereby generating a 1-field delay 2-dividing frame pulse 208 to be an example of an overlapping count value decision signal and supplying the 1-field delay 2-dividing frame pulse 208 to the continuity converting circuit 226A.

A method of calculating a time code which is to be executed by the time code calculating apparatus according to the present embodiment will be described below with reference to a synchronous point correlation diagram of FIG. 2, a time chart of FIG. 3 and a detailed diagram showing a continuity addition offset table B1 of FIG. 4.

When a time code of a 24 frame/second type is to be converted into a time code of a 30 frame/second type, four kinds of delay modes are present. The reason is as follows. In a recording and reproducing apparatus in which the time code calculating apparatus is incorporated, a time lag is generated between a time code (24 frame/second type) in a reading state from a recording tape and actual image data output from the recording and reproducing apparatus depending on a combination of an operation mode and an output destination. As a result, the actual image data are delayed from the time code in some cases. In these cases, the time lag is a time difference which is made because a processing time required for an output from an image output terminal and a time code output terminal (which is displayed as a time code super on a screen) through each of an image system signal processing and a time code system signal processing is different between an image system and a time code system.

Examples of the output destination of the recording and reproducing apparatus include the time code output terminal, a time code super display of a screen, a time code display on an operation panel of the recording and reproducing apparatus, an output to an edition controller for RS-422 connection, and the like.

When conversion from the 24 frame/second type to the 30 frame/second type is to be carried out, moreover, the heads of respective frames (V sink positions of frame images) are coincident with each other at an interval of four frames in the 24 frame/second type and at an interval of five frames in the 30 frame/second type. Therefore, when a 00 frame in the 24 frame/second type is coincident with a 00 frame in the 30 frame/second type, a 04 frame in the 24 frame/second type is then coincident with a 05 frame in the 30 frame/second type. Subsequently, the heads of the frames are coincident with each other at a rate of 4:5.

In a first delay mode (pattern 1), a delay is not generated at all. In the delay mode, the 24 frame/second output LTC set value 210 is input to the time code calculating apparatus without a delay. For this reason, when a time code of the 24 frame/second type is converted into a time code of the 30 frame/second type based on the 24 frame/second output LTC set value 210 (more specifically, the 30 frame/second LTC output signal 214 is generated from the 24 frame/second output LTC set value 210), it is necessary to output the 30 frame/second LTC output signal 214 without a delay in order to cause the output timings of the time codes of both types to be coincident with each other.

In a second delay mode (pattern 2), a delay corresponding to one frame is generated. In the delay mode, the 24 frame/second output LTC set value 210 is input to the time code calculating apparatus in a state of a delay corresponding to one frame. For this reason, when the time code of the 24 frame/second type is converted into the time code of the 30 frame/second type based on the 24 frame/second output LTC set value 210 (more specifically, the 30 frame/second LTC output signal 214 is generated from the 24 frame/second output LTC set value 210), it is necessary to output the 30 frame/second LTC output signal 214 in a state of a delay corresponding to one frame in order to cause the output timings of the time codes of both types to be coincident with each other.

In a third delay mode (pattern 3), a delay corresponding to two frames is generated. In the delay mode, the 24 frame/second output LTC set value 210 is input to the time code calculating apparatus in a state of a delay corresponding to two frames. For this reason, when the time code of the 24 frame/second type is converted into the time code of the 30 frame/second type based on the 24 frame/second output LTC set value 210 (more specifically, the 30 frame/second LTC output signal 214 is generated from the 24 frame/second output LTC set value 210), it is necessary to output the 30 frame/second LTC output signal 214 with a delay corresponding to two frames in order to cause the output timings of the time codes of both types to be coincident with each other.

In a fourth delay mode (pattern 4), a delay corresponding to three frames is generated. In the delay mode, the 24 frame/second output LTC set value 210 is input to the time code calculating apparatus in a state of a delay corresponding to three frames. For this reason, when the time code of the 24 frame/second type is converted into the time code of the 30 frame/second type based on the 24 frame/second output LTC set value 210 (more specifically, the 30 frame/second LTC output signal 214 is generated from the 24 frame/second output LTC set value 210), it is necessary to output the 30 frame/second LTC output signal 214 with a delay corresponding to three frames in order to cause the output timings of the time codes of both types to be coincident with each other.

In order to convert the time code of the 24 frame/second type to the time code of the 30 frame/second type corresponding to the delay modes described above, the pattern recognizing circuit 225 and the continuity converting circuit 226A carry out the following processing in the time code calculating apparatus according to the present embodiment.

First of all, the pattern recognizing circuit 225 decides a delay pattern generated based on a combination of an operation mode of the recording and reproducing apparatus in which the time code calculating apparatus is incorporated and an image data output destination. Then, the continuity converting circuit 226A applies a continuity addition offset corresponding to the result of the decision. Consequently, the continuity converting circuit 226A generates the 30 frame/second output set value 213 which is continuous data and is synchronous with the 24 frame/second output LTC set value 210 without a delay. These processings will be described below in detail.

First of all, the 24 frame/second output LTC set value 210, the 24 frame/second frame pulse 201 and the 30 frame/second frame pulse 207 are input to the intermediate data generating circuit 224. The set value 210, the pulse 201 and the pulse 207 are input from the recording and reproducing apparatus incorporating the time code calculating apparatus therein.

The 30 frame/second frame pulse 207 which is synchronous with the 24 frame/second pulse 201 (more specifically, which is synchronous with the synchronous point) is supplied.

The intermediate data generating circuit 224 generates the intermediate data 213' based on the set value 210 and the pulses 201 and 207 which are input. The generation of the intermediate data 213' by the intermediate data generating circuit 224 is equivalent to the intermediate data generating step.

The intermediate data generating circuit 224 generates the intermediate data 213' in the following manner. The intermediate data generating circuit 224 first reads the set value 210 in the fall timing of the pulse 201 and outputs the set value 210 thus read in the rise timing of the pulse 201, thereby outputting the data 211 for conversion.

When the data 211 for conversion is to be generated from the set value 210 thus read, an offset of +1 is added to the data 211 for conversion. The +1 offset processing is executed for the following reasons. When the exact set value 210 is generated as the data 211 for conversion, a delay in the processing of the time code calculating apparatus is generated. Therefore, the +1 offset processing described above is executed in order to absorb such a delay.

Furthermore, the intermediate data generating circuit 224 reads the data 211 for conversion in the fall timing of the frame pulse 207, thereby generating the intermediate data 213' and supplying the intermediate data 213' to the continuity converting circuit 226A.

In the data 211 for 30 frame/second conversion, a value is basically increased continuously for 24 counts (00 to 23 counts) per second in the same manner as the 24 frame/second output LTC set value 210. On the other hand, in the 30 frame/second output LTCD set value 213, a value is increased continuously for 30 counts (00 to 29 counts) per second.

Thus, a count difference of six counts per second is present between the data 211 for conversion and the 30 frame/second output LTC set value 213. For this reason, the intermediate data 213' generated by reading the data 211 for conversion in the fall timing of the frame pulse 207 are simply generated by forcibly repeating a processing of reading the data 211 for conversion five times at an interval of ⅙ second to be a time interval at which the data 211 for conversion are increased by four counts. Accordingly, the output timing of the intermediate data 213' is synchronous with a cycle of 30 frames/second and an output count value thereof ranges from 0 to 23, and a part of the output count values overlap and are discontinuous.

On the other hand, output destination information and operation mode information are input to the pattern recognizing circuit 225. These information are supplied from the recording and reproducing apparatus. The pattern recognizing circuit 225 decides a delay pattern based on the supplied information and the delay pattern information thus decided is supplied to the continuity converting circuit 226A. Herein, the delay pattern implies the first to fourth delay patterns (patterns 1 to 4) described above.

The 1-field delay 2-dividing frame pulse 208 and the 30 frame/second pulse 207 are supplied to the continuity converting circuit 226A in addition to the intermediate data 213' and the delay pattern information.

The 1-field delay 2-dividing frame pulse 208 is generated by delaying the 24 frame/second frame pulse 201 by one field (that is, a ½ cycle of the pulse 201) and carrying out a 2-dividing processing in the 1-field delay 2-dividing frame pulse generating circuit 240.

The 30 frame/second frame pulse 207 which is synchronous with the 24 frame/second frame pulse 201 (more specifically, which is synchronous with the synchronous point) is generated.

The continuity converting circuit 226A executes a processing of adding one count (which will be hereinafter referred to as an addition offset processing) by using the delay pattern information, the 1-field delay 2-dividing frame pulse 208 and the 30 frame/second frame pulse 207 in order to correct the intermediate data 213' to be discontinuous data into the set value 213. This processing is repetitively executed every time the intermediate data 213' are updated. The intermediate data 213' are updated to have the same value in some cases.

The addition offset processing is executed by adding a preset 24 frame/second output LTC offset value 212 to the intermediate data 213'.

The addition offset processing will further be described in detail. As described above, portions in which adjacent count areas 213' (α) and 213' (α+1) take overlapping values are present in any case in the intermediate data 213' generated by simply reading the data 211 for conversion in the fall timing of the frame pulse 207. In order to modify the intermediate data 213' having such a feature into the 30 frame/second output LTC set value 213 to be continuous data, it is necessary to both first and second addition offset processings. The first and second addition offset processings are reset at an interval of one second and are thus repeated.

In the first addition offset processing, an addition processing is not carried out for the count area 213' ($\alpha_r$) positioned in a first stage on a time basis but the addition processing is carried out for the count value by +1 in only the count area 213' ($\alpha_r$+1) positioned in a second stage in the adjacent count areas (which will be hereinafter referred to as overlapping count areas) 213' ($\alpha_r$) and 213' ($\alpha_r$+1) having the overlapping values in the intermediate data 213'.

In the second addition offset processing, the same offset processing (+1 addition processing) is continuously executed for all count areas 213' ($\alpha_r$+(2 to x)) [x is incremented till a reset every one second] which are positioned on the backward side on a time basis from the count area 213' ($\alpha_r$+1) in the second stage in which the first addition offset processing is executed and the processing is then executed.

In the above and following description, the first stage on a time basis indicates a forward side on a time base, that is, a past side, and the rear stage and the backward side on a time basis indicate a backward side on the time base, that is, a future side.

Since the first addition offset processing is repetitively executed at an interval of $\frac{1}{6}$ second at which the data 211 for conversion are read five times, it is executed six times in total every second. For this reason, in the second addition offset processing, the +1 addition processing to be executed in the first addition offset processing is continuously carried out. The first and second addition offset processings are reset every second as described above.

If the first and second addition offset processings are executed, it is possible to modify the intermediate data 213' into the 30 frame/second output LTC set value 213.

When the above addition offset processings are to be executed, a problem arises in a processing of selectively extracting the overlapping count areas 213' ($\alpha_r$) and 213' ($\alpha_r$+1) which are adjacent to each other in the intermediate data 213', and furthermore, a processing of identifying the count area 213' ($\alpha_r$) positioned on the first stage side on a time basis and the count area 213' ($\alpha_r$+1) positioned on the second stage side in the overlapping count areas 213' ($\alpha_r$) and 213' ($\alpha_r$+1) which are adjacent to each other.

If the correlation between the 24 frame/second output LTC set value 210 and the 30 frame/second output LTC set value 213 is guessed, it is possible to predict the portions in which the overlapping count areas 213' ($\alpha_r$) and 213' ($\alpha_r$+1) are generated. By taking the timing area T1 shown in FIG. 2 as an example, a count area 213' (03) taking a value of (03) overlaps. This can be predicted by checking the correlation between the timing chart of the data 211 for conversion and the timing chart of the intermediate data 213'.

In the overlapping count areas 213' ($\alpha_r$) and ($\alpha_r$+1), however, the generation portions and the overlapping values finely fluctuate, respectively. The reason will be described below. As described above, the intermediate data 213' are generated by reading the data 211 for conversion synchronously with the fall timing of the frame pulse 207. The rise timing of the 24 frame/second frame pulse 201 to be the data switching timing of the data 211 for conversion is synchronous with the synchronous point, and furthermore, a cycle $f_{201}$ thereof is $\frac{1}{24}$ second.

On the other hand, the fall timing of the frame pulse 207 is delayed from the synchronous point (the rise timing of the frame pulse 201) by $\frac{1}{60}$ second, and furthermore, a cycle $f_{207}$ thereof is $\frac{1}{30}$ second.

Because of the above-mentioned feature, the cycles $f_{201}$ and $f_{207}$ are coincident with each other in a cycle $f_{(201=207)}$ to satisfy $f_{201}=f_{207}$. In other words, both of the cycles of $f_{201}$ and $f_{207}$ are coincident with each other in a cycle $f_{(201=207)}=\frac{1}{24}$ second with a delay of $\frac{1}{12}$ second from the synchronous point. Referring to the data 211 for conversion which are read in such a timing that both of the cycles $f_{201}$ and $f_{207}$ are coincident with each other in the data 211 for conversion read in the cycle $f_{207}$, therefore, the data 211 for conversion before or after switching are read depending on the fine shift of the switching timing. In this timing, therefore, it is impossible to decide which data 211 for conversion are read.

Figure 2:
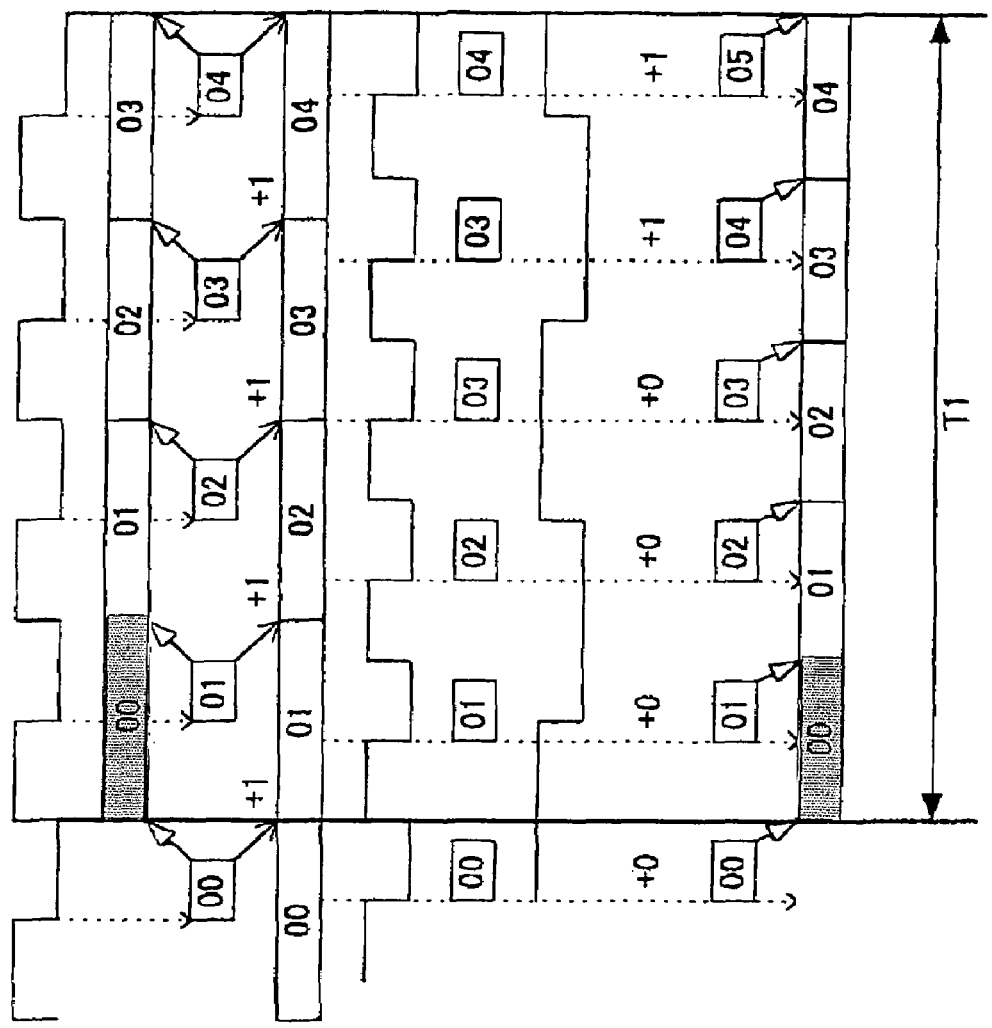
FIG. 2 is a time chart showing the time code calculating step of the time code calculating apparatus according to the first embodiment.
Figure 3:
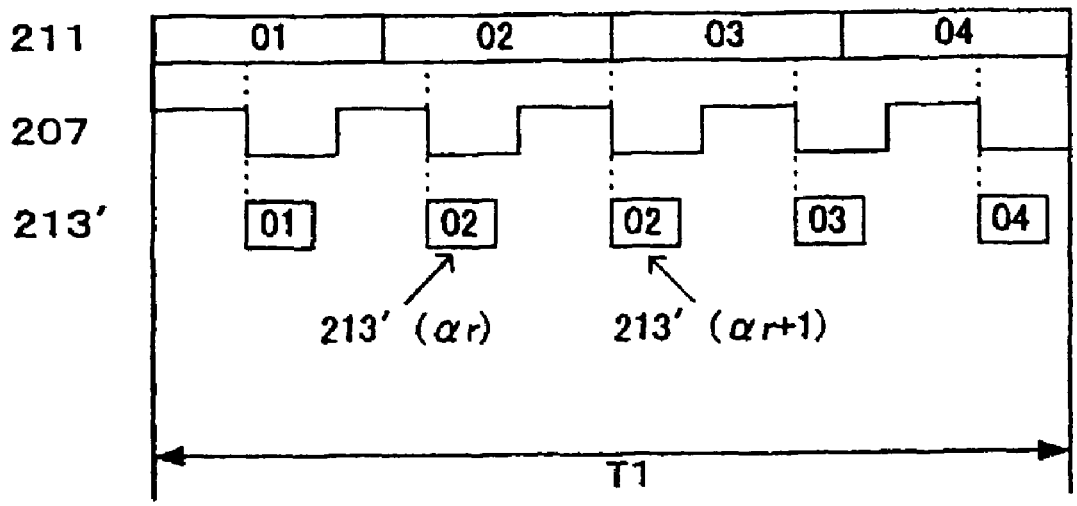
FIGS. 3A and 3B are other time charts showing the time code calculating step of the time code calculating apparatus according to the first embodiment.
Figure 3:
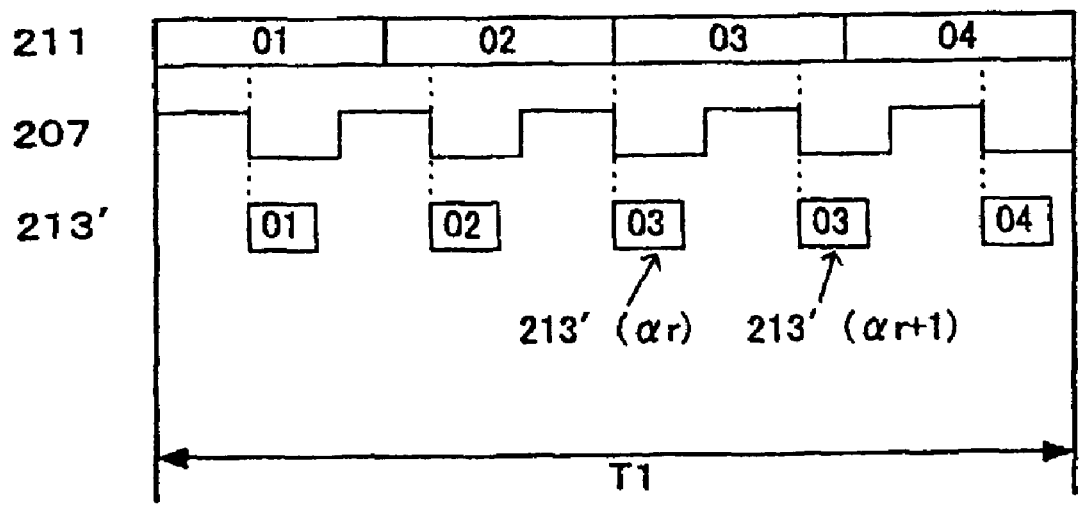

In the case of the timing area T1 shown in FIG. 2, when the data 211 for conversion are read after the passage of $\frac{1}{12}$ second from the synchronous point, thereby generating the intermediate data 213', a count value of (02) or (03) is read as the intermediate data 213' depending on the fine shift of the switching timing of the data 211 for conversion.

FIG. 3A shows the intermediate data 213' in the timing area T1 in which (02) is read as the data 211 for conversion and the count values of the overlapping count areas 213' ($\alpha_r$) and ($\alpha_{r+1}$) are set to be (02). Moreover, FIG. 3B shows the intermediate data 213' in the timing area T1 in which (03) is read as the data 211 for conversion and the count values of the overlapping count areas 213' ($\alpha_r$) and ($\alpha_{r+1}$) are set to be (03).

The count area of the intermediate data 213' in which the value thus fluctuates is set to be the overlapping count areas 213' ($\alpha_r$) and ($\alpha_{r+1}$). In the timing area T1 shown in FIG. 2, therefore, the overlapping count areas 213' ($\alpha_r$) and ($\alpha_{r+1}$) take (02) or (03) as the count values according to the circumstances.

Such a phenomenon is caused in all the timing areas T1 to T6 in the same manner. For this reason, the count values of the overlapping count areas 213' ($\alpha_r$) and ($\alpha_{r+1}$) are not stabilized in the intermediate data 213' and are changed based on the fine shift of the switching timing of the data 211 for conversion.

For the above reasons, it is necessary to carry out special processings for a processing of selectively extracting the overlapping count areas 213' ($\alpha_r$) and 213' ($\alpha_{r+1}$) and for a processing of identifying the overlapping count area 213' ($\alpha_r$) positioned on the first stage side on a time basis and the overlapping count area 213' ($\alpha_{r+1}$) positioned on the second stage side. Therefore, the continuity converting circuit 226A executes these processings by using the 1-field delay 2-dividing frame pulse 208 in the following manner.

The 1-field delay 2-dividing frame pulse 208 is a signal obtained by dividing the 24 frame/second frame pulse 201 into two parts, and furthermore, carrying out a delay processing for one field ($\frac{1}{2}$ cycle) as described above. When such a pulse 208 is generated, the following processing is carried out.

A timing for generating optional count areas 213' (x) and 213' (x+1) which are adjacent to each other in the intermediate data 213' respectively (a timing for reading the data 211 for 30 frame/second conversion, that is, the fall timing of the pulse 207) corresponds to the pulse 208 in the following manner.

The timing for generating the count area 213' (x) corresponds one-on-one to a period in which the pulse 208 has a high level (H). The timing for generating the count area 213' (x+1) corresponds one-on-one to a period in which the pulse 208 has a low level (L).

In the present invention, the overlapping count area 213' ($\alpha$) positioned on the first stage side and the overlapping count area 213' ($\alpha$+1) positioned on the second stage side on a time basis are identified in the following manner based on the level of the pulse 208 by making the most of the characteristic of the pulse 208. Herein, description will be given by taking the timing area T1 (after zero second to ⅙ second from the synchronous point) as an example. The other timing areas T2 to T6 are basically synchronous with the timing area T1, and the timing chart of each signal in the timing areas T2 to T6 is equivalent to that of the timing area T1. For this reason, the identification can also be carried out in the timing areas T2 to T6 in the same manner as the timing area T1.

More specifically, the timing areas T1 to T6 imply the following areas. The timing area T1 is a period taken until ⅙ second passes from the synchronous point. The timing area T2 is a period taken until ⅙ to ²⁄₆ second passes from the synchronous point. The timing area T3 is a period taken until ²⁄₆ to ³⁄₆ second passes from the synchronous point. The timing area T4 is a period taken until ³⁄₆ to ⁴⁄₆ second passes from the synchronous point. The timing area T5 is a period taken until ⁴⁄₆ to ⅚ second passes from the synchronous point. The timing area T6 is a period taken until ⅚ to 1 second passes.

In the timing area T1 shown in FIG. 2, the timings for generating the overlapping count areas 213' ($\alpha_r$) and 213' ($\alpha_{r+1}$) are caused before and after a timing t1 after ¹⁄₁₂ second from the synchronous point. The overlapping count areas 213' ($\alpha_r$) and 213' ($\alpha_{r+1}$) take (02) or (03) based on the fine shift of the switching timing of the data 211 for conversion.

In the case in which (02) is taken as the overlapping value, the timing for generating the overlapping count area 213 ($\alpha_r$) positioned on the first stage side on a time basis is coincident with a timing for generating the low level (L) of the frame pulse 208. The timing for generating the overlapping count area 213 ($\alpha_{r+1}$) positioned on the second stage side is coincident with a timing for generating the high level (H) of the frame pulse 208.

In the case in which (03) is taken as the overlapping value, the timing for generating the overlapping count area 213 ($\alpha_r$) positioned on the first stage side on a time basis is coincident with a timing for generating the high level (H) of the frame pulse 208. The timing for generating the overlapping count area 213 ($\alpha_{r+1}$) positioned on the second stage side is coincident with a timing for generating the low level (L) of the frame pulse 208.

Based on the correlation between the overlapping count areas 213' ($\alpha_r$) and ($\alpha_{r+1}$) and the frame pulse 208 described above, the first addition offset processing is executed. More specifically, in the case in which the count value (02) is taken in the intermediate data 213' and the frame pulse 208 has the low level (L), the count area 213' ($02_f$) is the overlapping count area but is decided to be the overlapping count area 213' ($\alpha_r$) positioned on the first stage side on a time basis. Based on the decision, the first addition offset processing is not carried out over the count area 213' ($02_f$).

In the case in which the count value (02) is taken in the intermediate data 213' and the frame pulse 208 has the high level (H), a count area 213' ($02_b$) is the overlapping count area and is decided to be the overlapping count area 213' ($\alpha_r+1$) positioned on the second stage side on a time basis. Based on the decision, the first addition offset processing is carried out over the count area 213' ($02_b$).

In the case in which the count value (03) is taken in the intermediate data 213' and the frame pulse 208 has the high level (H), the count area 213' ($03_f$) is the overlapping count area and is decided to be the overlapping count area 213' ($\alpha_r$) positioned on the first stage side on a time basis. Based on the decision, the first addition offset processing is not carried out over the count area 213' ($03_f$).

In the case in which the count value (03) is taken in the intermediate data 213' and the frame pulse 208 has the low level (L), the count area 213' ($03_b$) is the overlapping count area and is decided to be the overlapping count area 213' ($\alpha_r+1$) positioned on the second stage side on a time basis. Based on the decision, the first addition offset processing is carried out over the count area 213' ($03_b$).

The second addition offset processing described above is executed through the first addition offset processing. The second addition offset processing is executed for all the count areas of the intermediate data 213' positioned on the backward side on a time basis from the first offset processing.

Figure 4:
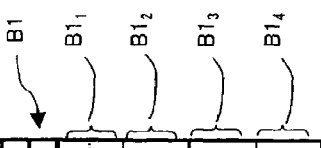
FIG. 4 is a diagram showing the structure of a continuity addition offset table according to the first embodiment.

FIG. 4 shows a table for an offset amount in the continuity addition offset processing (the first and second addition offset processings) described above. A continuity addition offset table B1 is stored in the storage area (not shown) of the continuity converting circuit 226A.

The timings for generating the overlapping count areas 213' ($\alpha_r$) and 213' ($\alpha_{r+1}$) are generated before and after a timing in which ¹⁄₁₂ second is delayed from the synchronous point to obtain a cycle of $f_{(201=207)}$=¹⁄₂₄ second. On the other hand, four delay patterns (first to fourth delay patterns) are present in the 24 frame/second output LTC set value 210 as described above. For this reason, the overlapping count areas 213' ($\alpha_r$) and 213' ($\alpha_{r+1}$) take various values according to the delay patterns. In the continuity addition offset table B1 shown in FIG. 4, offset data B1$_1$ to B1$_4$ which are varied for each of the first to fourth delay patterns (patterns 1 to 4) are set. Furthermore, the offset data B1$_1$ to B1$_4$ have two kinds of offset value groups (B1$_{1(H)}$, B1$_{1(L)}$), (B1$_{2(H)}$, B1$_{2(L)}$), (B1$_{3(H)}$, B1$_{3(L)}$) and (B1$_{4(H)}$, B1$_{4(L)}$) corresponding to the levels (H) and (L) of the 1-field delay 2-dividing frame pulse 208, respectively.

More specifically, the continuity converting circuit 226A executes the above-mentioned continuity addition offset processing in the following manner. The continuity converting circuit 226A reads the intermediate data 213' from the intermediate data generating circuit 224 and reads the delay pattern information from the pattern recognizing circuit 225. Then, the continuity converting circuit 226A collates the read the delay pattern with the continuity addition offset table B1 (which is stored in the continuity converting circuit 226), thereby determining an offset amount to be applied to the intermediate data 213'. Subsequently, the continuity converting circuit 226A executes the addition offset processing over the intermediate data 213' based on the offset amount thus determined, thereby generating the 30 frame/second output LTC set value 213.

The processing of the continuity converting circuit 226A described above is equivalent to the overlapping count value correcting step.

Figure 5:
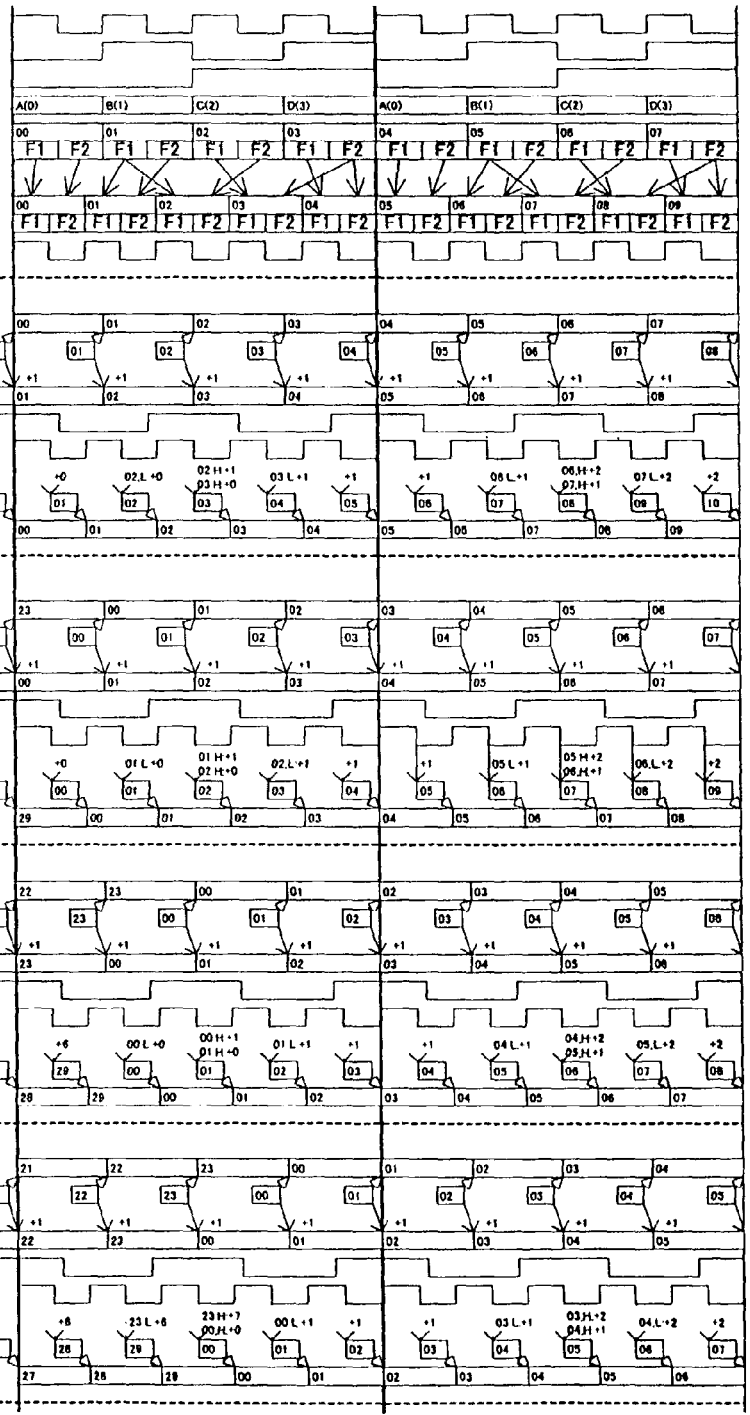
FIG. 5 is a further time chart in the time code calculating step of the time code calculating apparatus according to the first embodiment, illustrating a first stage.
Figure 6:
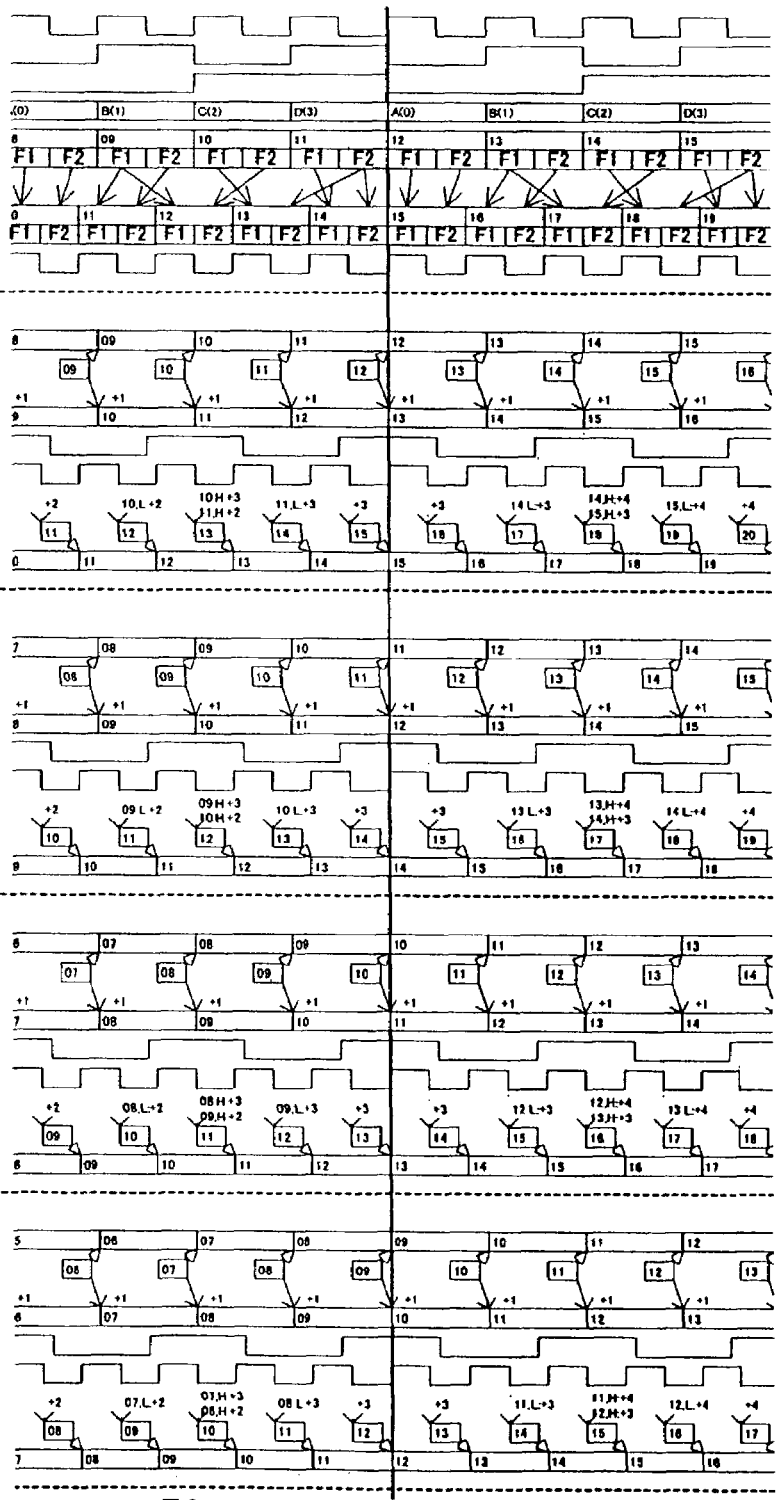
FIG. 6 is a further time chart in the time code calculating step of the time code calculating apparatus according to the first embodiment, illustrating a middle stage.
Figure 7:
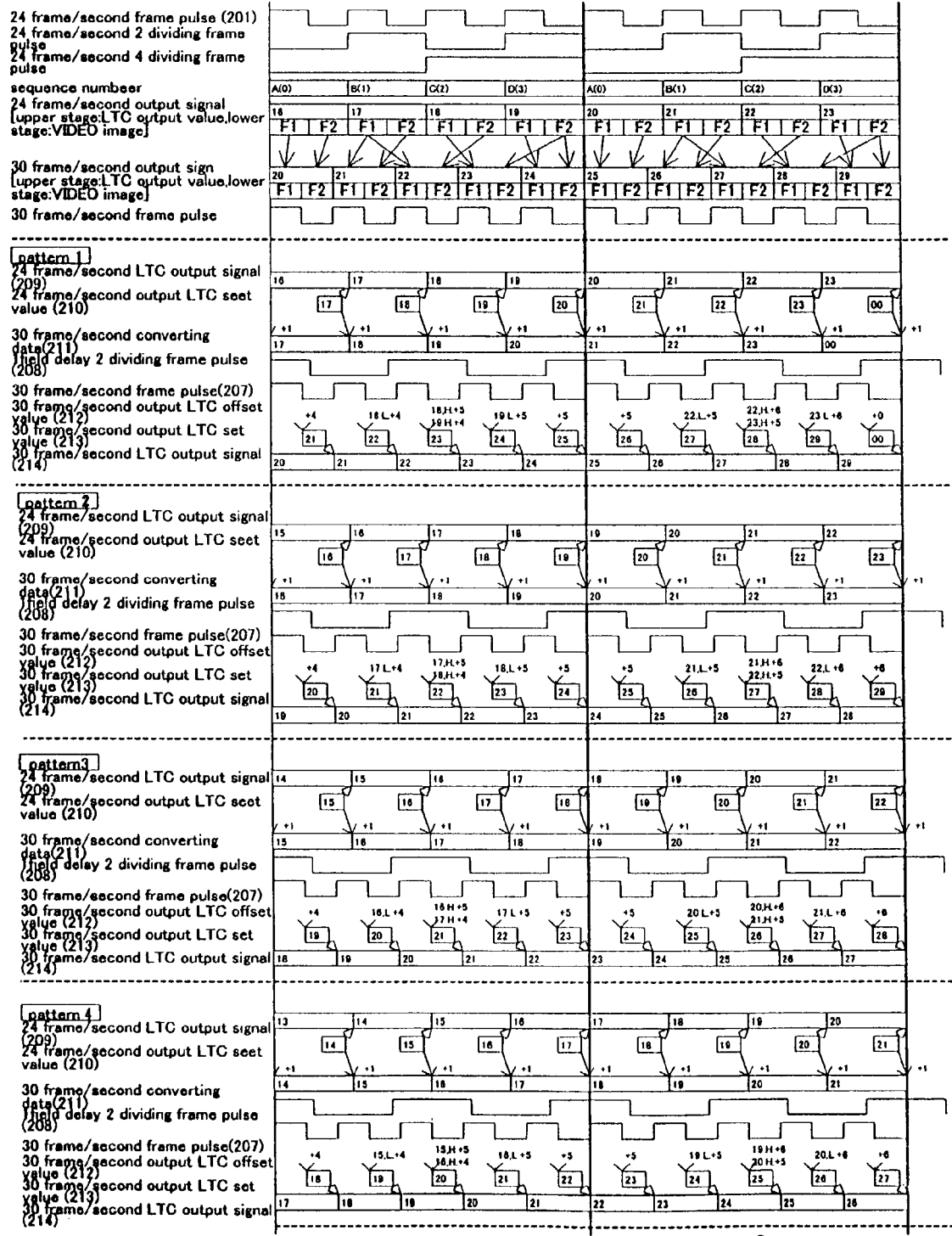
FIG. 7 is a further time chart in the time code calculating step of the time code calculating apparatus according to the first embodiment, illustrating a second stage.

The continuity converting circuit 226A outputs the generated set value 213 to the second LTC signal output circuit 228. The second LTC signal output circuit 228 reads the input set value 213 in the rise timing of the 30 frame/second frame pulse 207, thereby generating and outputting the 30 frame/second LTC output signal 214. FIGS. 5 to 7 show a conversion correlation diagram between the 30 frame/second LTC output signal 214 thus generated and each signal.

Second Embodiment

Figure 8:
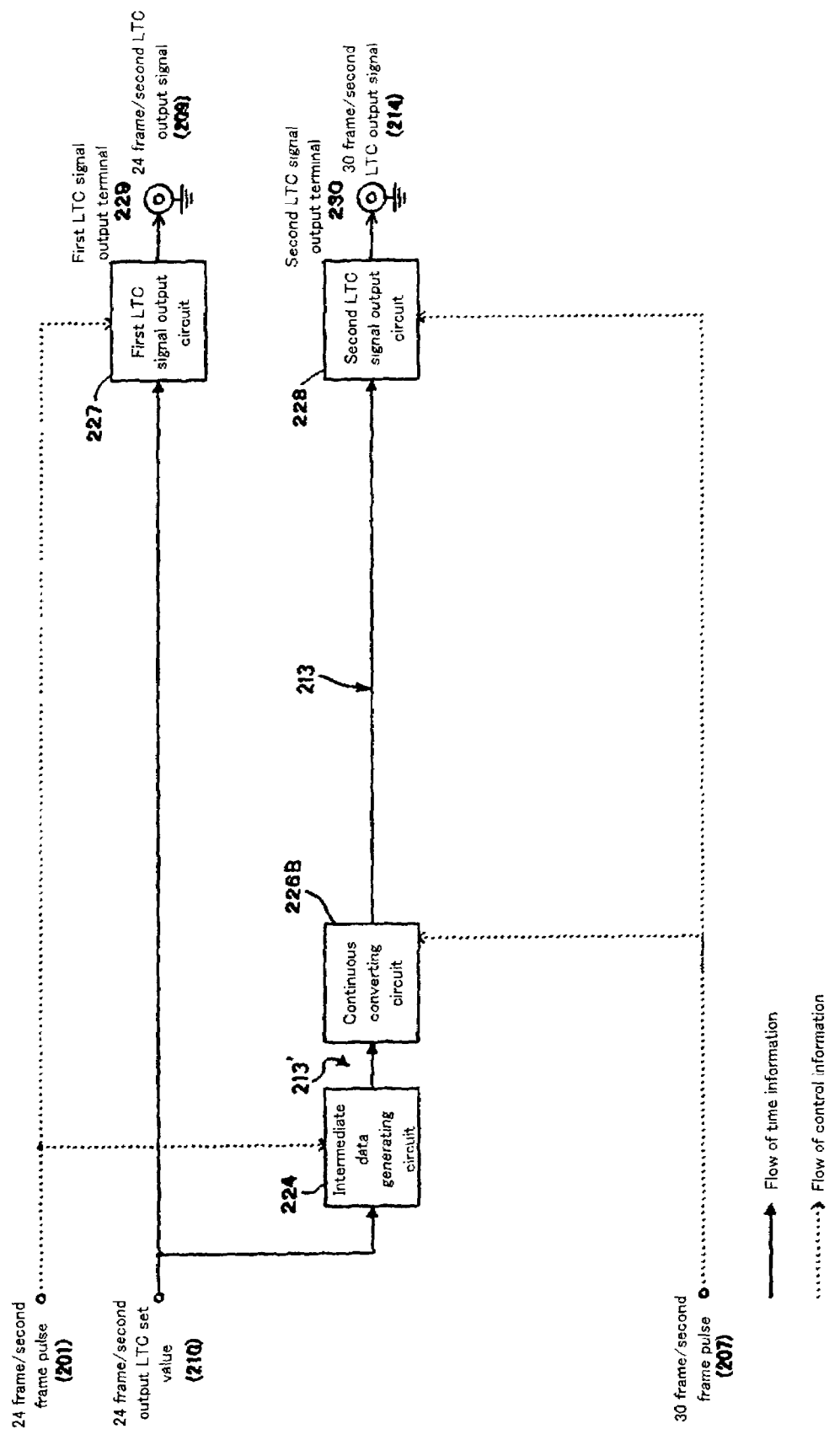
FIG. 8 is a block diagram showing the structure of a time code calculating apparatus according to a second embodiment of the present invention.

FIG. 8 is a block diagram showing the structure of a time code calculating apparatus according to a second embodiment of the present invention. The time code calculating apparatus basically has the same structure as that of the apparatus according to the first embodiment. However, there are the following features.

The pattern recognizing circuit 225 is not required because the delay pattern information is not used.

The 1-field delay 2-dividing frame pulse 208 is not used.

The delay pattern information is not used and the 1-field delay 2-dividing frame pulse 208 is not used so that the structure and operation of a continuity converting circuit 226B to be an example of a continuity converter are different.

Accordingly, description will be given to only the structure of the continuity converting circuit 226B and the overlapping count value correcting step to be executed by the continuity converting circuit 226B according to the present embodiment. Since other structures and steps are the same as those in the first embodiment, description thereof will be omitted.

In the continuity addition offset table B1 of the continuity converting circuit 226A according to the first embodiment, the offset data $B1_1$ to $B1_4$ are set every first to fourth delay patterns. Furthermore, the offset data $B1_1$ to $B1_4$ are constituted by two kinds of offset value groups $(B1_{1(H)}, B1_{1(L)})$, $(B1_{2(H)}, B1_{2(L)})$, $(B1_{3(H)}, B1_{3(L)})$ and $(B1_{4(H)}, B1_{4(L)})$, respectively. Thus, the continuity addition offset table B1 has a complicated data structure.

On the other hand, the continuity converting circuit 226B according to the present embodiment has the following continuity addition offset table B2. The continuity addition offset table B2 is constituted by one offset data $B2_1$ irrespective of a delay pattern as shown in FIG. 9. In addition, the offset data $B2_1$ are constituted by a single offset value group $B2_{1(M)}$.

The continuity converting circuit 226B executes an addition offset processing over intermediate data 213' based on the continuity addition offset table B2 thus constituted. For this reason, a pattern recognizing circuit for recognizing the delay pattern is omitted.

The operation of the time code calculating apparatus according to the present embodiment will be described below with reference to conversion process diagrams of FIGS. 10 to 17.

When a time code of a 24 frame/second type is to be converted into a time code of a 30 frame/second type, the first addition offset processing and the second addition offset processing are required as described in the first embodiment.

In the first addition offset processing, an addition processing is not carried out over an overlapping count area 213' $(\alpha_r)$ positioned on the first stage side (past side) on a time basis but is carried out over an overlapping count area 213' $(\alpha_r+1)$ positioned on the second stage side (future side) by adding +1 to a count value thereof.

In the second addition offset processing, after the first addition offset processing is executed, the same addition offset processing (+1 addition processing) is continuously executed over all count areas 213' $(\alpha_r+(2 \text{ to } x))$ positioned on the further backward side on a time basis from the count area 213' $(\alpha_r+1)$ subjected to the first addition offset processing.

In order to execute the first addition offset processing, the following two processings are required. In a first processing, the overlapping count areas 213' $(\alpha_r)$ and 213' $(\alpha_r+1)$ which are adjacent to each other in the intermediate data 213' are extracted selectively. In a second processing, the overlapping count area 213' $(\alpha_r)$ positioned in the first stage and the overlapping count area 213' $(\alpha_r+1)$ positioned in the second stage on a time basis which are adjacent to each other are distinguished from each other.

For this reason, in the first embodiment, the pattern recognizing circuit 225 for recognizing the first to fourth delay patterns is provided. In the first embodiment, furthermore, the continuity addition offset table B1 having the offset data $B1_1$ to $B1_4$ and the offset value groups $(B1_{1(H)}, B1_{1(L)})$, $(B1_{2(H)}, B1_{2(L)})$, $(B1_{3(H)}, B1_{3(L)})$ and $(B1_{4(H)}, B1_{4(L)})$ are required.

In the present embodiment, such a structure is omitted as much as possible and the conversion of a time code is implemented. Correspondingly, the structure can be simplified. Therefore, the time code calculating apparatus according to the present embodiment is constituted in the following manner.

The continuity converting circuit 226B is constituted such that the first addition offset processing is not executed but only the second addition offset processing is executed. For this purpose, furthermore, the continuity addition offset table B2 for executing the second addition offset processing is stored in the continuity converting circuit 226B.

In the first embodiment, the first addition offset processing and the second addition offset processing are executed at the same time. For this reason, the continuity addition offset table B1 having the offset value groups $(B1_{1(H)}, B1_{1(L)})$, $(B1_{2(H)}, B1_{2(L)})$, $(B1_{3(H)}, B1_{3(L)})$ and $(B1_{4(H)}, B1_{4(L)})$ and the offset data $B1_1$ to $B1_4$ are stored in the continuity converting circuit 226A.

On the other hand, in the present embodiment, only the second addition offset processing is executed. For this reason, the continuity addition offset table B2 including offset data $B2_1$ having one pattern and an offset value group $B2_{1(M)}$ having one pattern is stored in the continuity converting circuit 226B as shown in FIG. 9. Consequently, a table data volume is reduced and an increase in the speed of the operation processing is realized.

Next, the continuity conversion processing of the continuity converting circuit 226B using the continuity addition offset table B2 will be described with reference to FIGS. 10 to 17. FIGS. 10 to 17 are diagrams showing the conversion process of the continuity conversion processing.

In the intermediate data 213', four basic output patterns 1 to 4 which are different from each other are present for the first to fourth delay pattern as described with reference to FIG. 3 and the like. Also in the basic output patterns 1 to 4 present for each delay pattern, two output patterns (a) and (b) which are different from each other are present based on the fine shift of the switching timing of data 211 for 30 frame/second conversion. For this reason, in the intermediate data 213', eight output patterns 1(*a*), 1(*b*), 2(*a*), 2(*b*), 3(*a*), 3(*b*), 4(*a*) and 4(*b*) are present in total based on a combination of the basic output patterns 1 to 4 and the output patterns (a) and (b). On the other hand, FIGS. 10 to 17 show the respective conversion processes for the intermediate data 213' in the patterns 1(*a*) to 4(*b*).

The continuity converting circuit 226B generates a primary conversion value 215 in the following manner. The continuity converting circuit 226B adds the offset data $B2_1$ (more specifically, the offset value group $B2_{1(M)}$) stored in the continuity addition offset table B2 to each count value of the intermediate data 213', thereby generating the primary conversion value 215. The addition processing is executed irrespective of the output pattern of the intermediate data 213'. The addition processing is uniformly executed corresponding to the count value of the intermediate value 213'.

The offset data $B2_1$ stored in the continuity addition offset table B2 are used for executing the second addition offset processing and do not completely correspond to a processing of adding a continuity to the intermediate data 213'. For this reason, the primary conversion value 215 is to have a data configuration leaving a discontinuity incidental to the intermediate data 213'.

Therefore, the continuity converting circuit 226B executes the following continuity conversion processing over the generated primary conversion value 215.

For the continuity conversion processing, first of all, a reference set processing is executed. The reference set processing is carried out in the following manner. The reference set processing serves to set a count value to be a reference for a conversion processing (which will be hereinafter referred to as a reference count value) for the continuity conversion processing in each count value (corresponding to a frame value) constituting the primary conversion value 215. The reference count value thus set is set to have a count (normally zero count or the like) to be a reference point for the conversion processing in the continuity conversion processing to be subsequently executed.

Usually, a count value (0) or a count value (29) in the primary conversion value 215 is set to be the reference count value. In consideration of the case in which the count value (0) and the count value (29) in the primary conversion value 215 overlap each other, the count value is set in the following manner.

In the following description, a count value to be a selection object for the reference count value in the primary conversion value 215 will be referred to as a selection object count value. A count value positioned on the last side on a time basis from the selection object count value will be referred to as a selection object first stage count value. The count value obtained after the continuity conversion processing will be referred to as a conversion defined value.

The selection object count value which satisfies either of the following conditions 1 and 2 is defined as a reference count value.

Condition 1: The selection object count value is (29) and the conversion defined value of the selection object first stage count value is (29).

Condition 2: The selection object count value is (0) and the conversion defined value of the selection object first stage count value is not (0).

While the continuity conversion processing is executed before a time that the reference count value is set, the conversion defined value generated by the continuity conversion processing before the reference count value is set cannot but be unstable. On the other hand, the conversion defined value generated by the continuity conversion processing after setting the reference count value based on the conditions described above is stable. For this reason, the conversion defined value generated by the continuity conversion processing after defining the reference count value is set to be a 30 frame/second output LTC set value 213.

Next, the continuity conversion processing will be described. In the following description of the continuity conversion processing, a count value to be a conversion processing object in a primary conversion value will be referred to as a conversion object count value and a count value positioned on the last side (past side) on a time basis from the conversion object count value will be referred to as a conversion object first stage count value.

In the continuity conversion processing, the following processing is executed in the case in which the conversion defined value of the conversion object first stage count value is compared with the conversion object count value and they are discontinuous (more specifically, a difference thereof is not (1)).

The conversion object count value is subjected to a conversion processing in such a manner that the conversion object count value continues rearward (that is, in a count-up direction) on the basis of the conversion defined value of the conversion object first stage count value. In the case in which the conversion defined value of the conversion object first stage count value and the conversion object count value continue, the above-mentioned processing is not executed.

The conversion defined values obtained by executing such a continuity conversion processing continue to each other and become the 30 frame/second output set value 213.

The continuity converting circuit 226B outputs the generated set value 213 to the second LTC signal output circuit 228. The second LTC signal output circuit 228 reads the input set value 213 in the rise timing of a 30 frame/second frame pulse 207, thereby generating and outputting a 30 frame/second LTC output signal 214.

Third Embodiment

Figure 18:
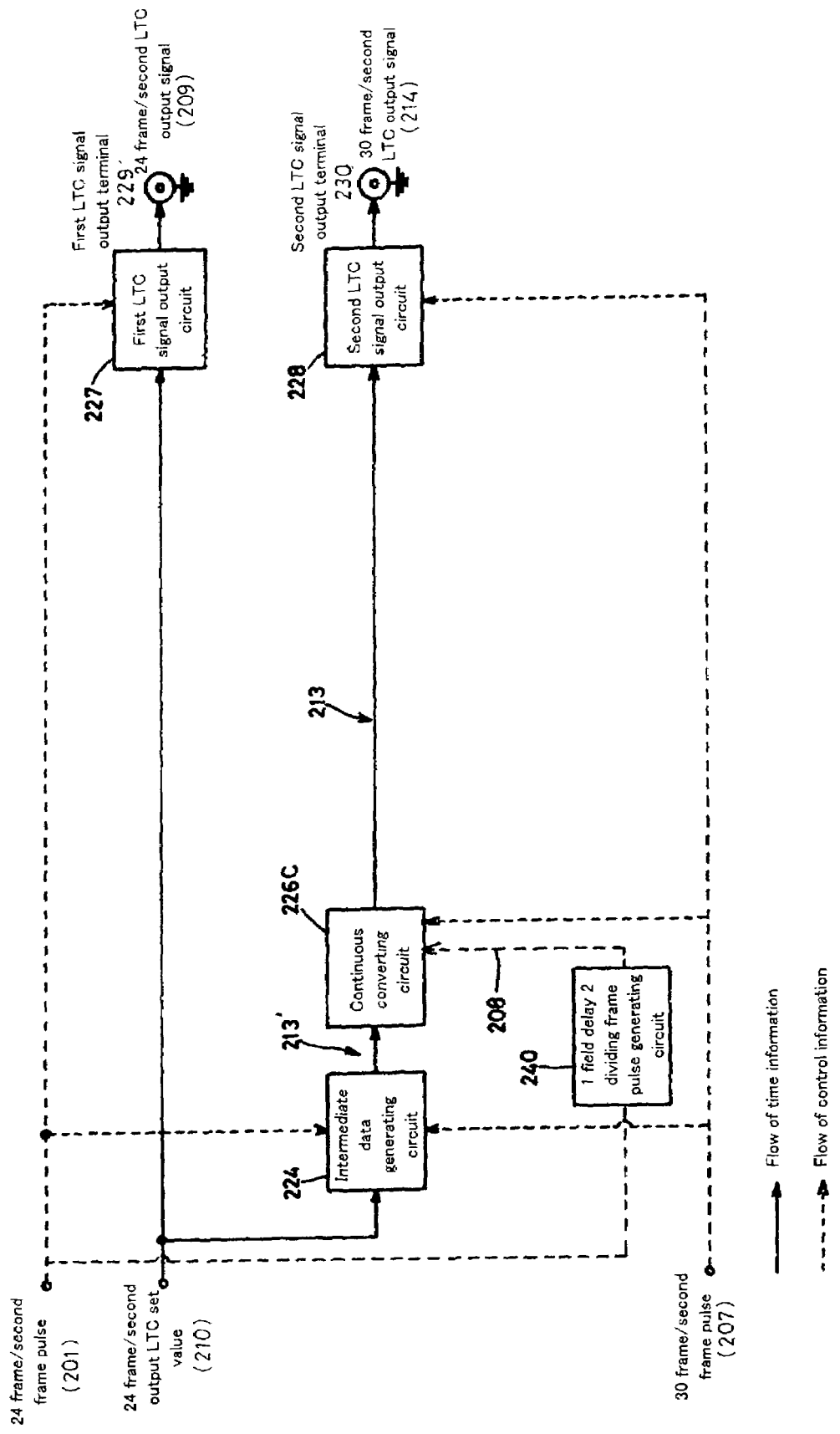
FIG. 18 is a block diagram showing the structure of a time code calculating apparatus according to a third embodiment of the present invention.

FIG. 18 is a block diagram showing the structure of a time code calculating apparatus according to a third embodiment of the present invention. The time code calculating apparatus basically has the same structure as that of the apparatus according to the first embodiment. However, there are the following features.

The pattern recognizing circuit 225 is not required because the delay pattern information is not used.

The delay pattern information is not used so that the structure and operation of the continuity converting circuit 226C to be an example of a continuity converter are different.

Accordingly, description will be given to only the structure of a continuity converting circuit 226C and the overlapping count value correcting step to be executed by the continuity converting circuit 226C according to the present embodiment. Since other structures and steps are the same as those in the first embodiment, description thereof will be omitted.

Figures 19, 20, 21, 22:
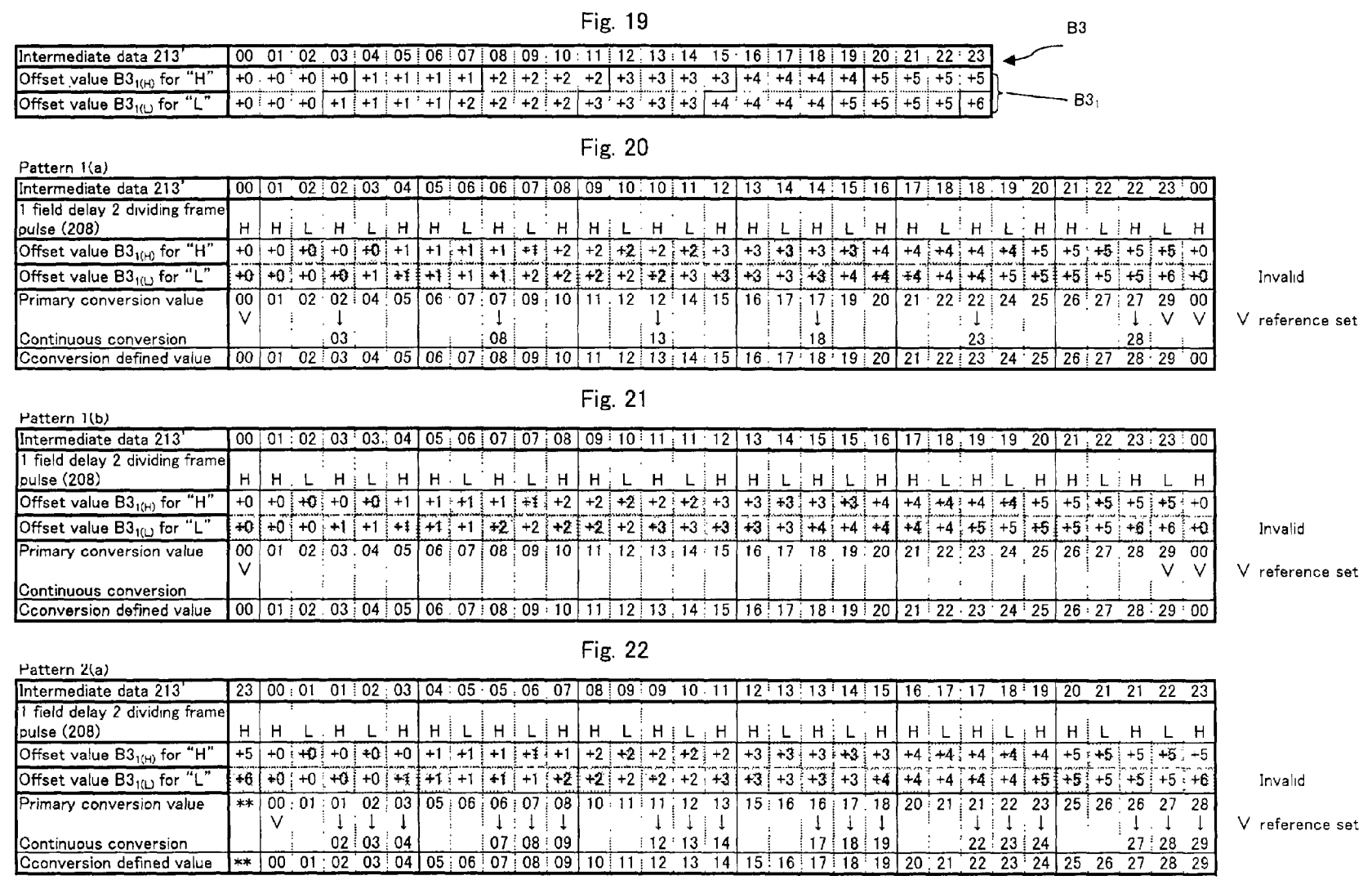

The continuity converting circuit 226C according to the present embodiment stores a continuity addition offset table B3 in a recording area thereof. In the continuity addition offset table B1 of the continuity converting circuit 226A according to the first embodiment, offset data $B1_1$ to $B1_4$ are set every first to fourth delay patterns. On the other hand, in the continuity converting circuit 226C according to the present embodiment, the continuity addition offset table B3 including one offset data $B3_1$ is set irrespective of the delay pattern as shown in FIG. 19. The offset data $B3_1$ include two kinds of offset value groups ($B1_{3(H)}$, $B3_{1(L)}$) corresponding to levels (H) and (L) of a 1-field delay 2-dividing frame pulse 208 in the same manner as in the first embodiment.

In the present embodiment, thus, an addition offset processing is executed by using the offset table B3 including single offset data $B3_1$ for intermediate data 213'. For this reason, in the present embodiment, a pattern recognizing circuit for recognizing a delay pattern is not required, and furthermore, a table data volume is reduced. In the present embodiment, moreover, an increase in the speed of an operation is also realized.

The processing to be executed by the time code calculating apparatus according to the present embodiment will be described below with reference to conversion process diagrams of FIGS. 20 to 27. FIGS. 20 to 27 are diagrams corresponding to FIGS. 10 to 17, respectively.

The continuity converting circuit 226C adds the offset data $B3_1$ to each count value of the intermediate data 213', thereby generating a primary conversion value 215. The offset data $B3_1$ are stored in the continuity addition offset table B3 corresponding to each count value of the intermediate data 213' The offset data $B3_1$ are added irrespective of the output pattern of the intermediate data 213'. In more detail, the following processing is executed.

The offset data $B3_1$ have two kinds of offset value groups $B3_{1(H)}$ and $B3_{1(L)}$ corresponding to the levels (H) and (L) of the 1-field delay 2-dividing frame pulse 208. The continuity converting circuit 226C executes the following processing in order to separately use the offset value groups $B3_{1(H)}$ and $B3_{1(L)}$.

The 1-field delay 2-dividing frame pulse 208 is input to the continuity converting circuit 226C. The continuity converting circuit 226C decides the level of the frame pulse 208. Then, the continuity converting circuit 226C executes the offset processing over the intermediate data 213' by using the offset value groups $B3_{1(H)}$ and $B3_{1(L)}$ corresponding to the result of the decision (the level of the frame pulse 208). Consequently, the primary conversion value 215 is generated.

More specifically, when the level of the frame pulse 208 is (H), the offset processing is executed by using the offset value included in the offset value group $B3_{1(H)}$. When the level of the frame pulse 208 is (L), the offset processing is executed by using the offset value included in the offset value group $B3_{1(L)}$.

The continuity converting circuit 226C executes the continuity conversion processing over the primary conversion value 215 thus generated in the same manner as in the second embodiment.

The continuity converting circuit 226C first executes a next reference set processing in order to carry out the continuity conversion processing in the same manner as in the second embodiment.

The continuity converting circuit 226C defines, as a reference count value, a selection object count value constituting the primary conversion value 215 which satisfies either of the following conditions 1 and 2.
☐ Condition 1: The selection object count value is (29).
☐ Condition 2: The selection object count value is (0) and the conversion defined value of the selection object first stage count value is not (0).

The continuity converting circuit 226C sets the reference count value and defines, as a conversion defined value, data generated by the following continuity conversion processing on the basis of the set reference count value.

The continuity conversion processing is the same as the processing described in the second embodiment. More specifically, in the case in which the conversion defined value of a conversion object first stage count value and the conversion object count value are discontinuous, the conversion object count value is subjected to the conversion processing in such a manner that the conversion object count value continues rearward (that is, a count-up direction) on a time basis based on the conversion defined value of the conversion object first stage count value.

The conversion defined values obtained by executing such a continuity conversion processing are continuous to each other and become a 30 frame/second output set value 213.

The continuity converting circuit 226C outputs the generated set value 213 to the second LTC signal output circuit 228. The second LTC signal output circuit 228 reads the input set value 213 in the rise timing of a 30 frame/second frame pulse 207. Consequently, the second LTC signal output circuit 228 generates and outputs a 30 frame/second LTC output signal 214.

Fourth Embodiment

A fourth embodiment provides a time code calculating apparatus to be used when converting image data of a 30 frame/second type into image data of a 24 frame/second type (a non-drop mode), in which the present invention is carried out. In the time code calculating apparatus, a time code is converted in such a state that a synchronous point is fixed.

Figure 28:
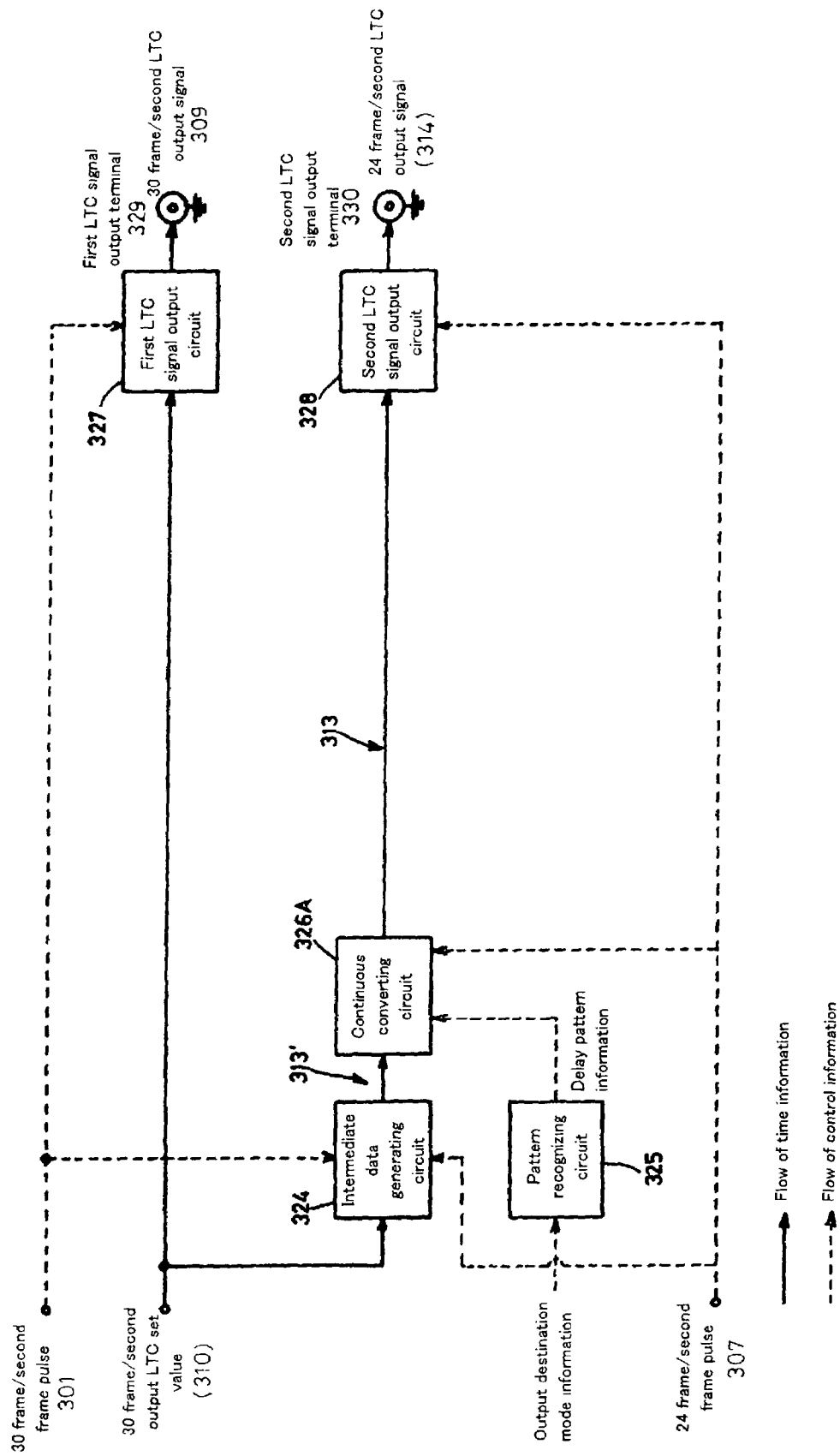
FIG. 28 is a block diagram showing the structure of a time code calculating apparatus according to a fourth embodiment of the present invention.
Figure 29:
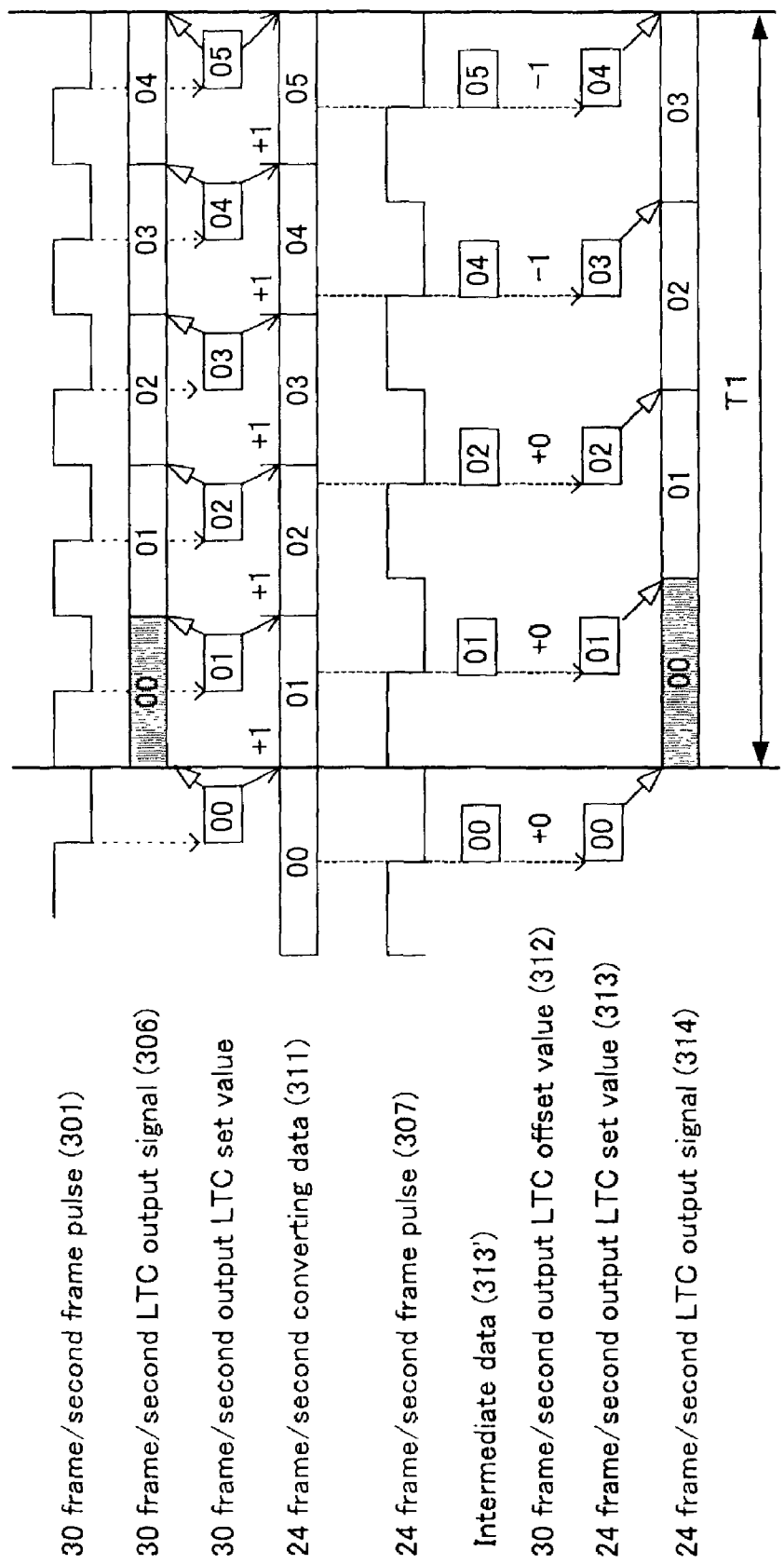
FIG. 29 is a time chart showing the time code calculating step of the time code calculating apparatus according to the fourth embodiment.

First of all, the schematic structure of the time code calculating apparatus according to the present embodiment will be described with reference to a functional block diagram of FIG. 28 and a time chart schematically showing a signal conversion process of FIG. 29. The time code calculating apparatus comprises an intermediate data generating circuit 324 according to an example of an intermediate data generator, a pattern recognizing circuit 325, a continuity converting circuit 326A according to an example of an overlapping count value corrector, a first LTC signal output circuit 327, and a second LTC signal output circuit 328.

The intermediate data generating circuit 324 reads an output LTC set value 310 to be used for the image data of the 30 frame/second type in the output timing of a frame pulse 301 to be used in the image data of the 30 frame/second type (more specifically, a pulse fall timing). Consequently, the intermediate data generating circuit 324 generates data 311 for 24 frame/second conversion. Furthermore, the intermediate data generating circuit 324 reads the data 311 for 24 frame/second conversion in the output timing of a 24 frame/second frame pulse 307 (more specifically, a pulse fall timing). Thus, the intermediate data generating circuit 324 generates intermediate data 313'.

The pattern recognizing circuit 325 decides a delay pattern generated in a recording and reproducing apparatus in which the time code calculating apparatus is incorporated based on a combination of an operation mode (reproduction, recording, edition, fast-forward reproduction or the like) of the recording and reproducing apparatus and an image data output destination (a display device, a hard disk image recording apparatus, an editing apparatus or the like). Then, the pattern recognizing circuit 325 supplies the delay pattern information obtained by the decision to a continuity converting circuit 326A.

The continuity converting circuit 326A applies, to the intermediate data 313', a continuity addition offset corresponding to the delay pattern information (supplied from the pattern recognizing circuit 325). Consequently, the continuity converting circuit 326A generates a 24 frame/second output LTC set value 313. The 24 frame/second output LTC set value 313 is continuous data. The 24 frame/second output LTC set value 313 is synchronous with the 30 frame/second output LTC set value 310 at a synchronous point without a delay.

The first LTC signal output circuit 327 reads the 30 frame/second output LTC set value 310 in the output timing (more specifically, a pulse rise timing) of the 30 frame/second frame pulse 301. Consequently, the first LTC signal output circuit 327 generates a 30 frame/second LTC output signal 309. The 30 frame/second LTC output signal 309 thus generated is output from a first LTC signal output terminal 329 to the outside.

The second LTC signal output circuit 328 reads the 24 frame/second output LTC set value 313 in the output timing (more specifically, a pulse rise timing) of the 24 frame/second frame pulse 307. Consequently, the second LTC signal output circuit 328 generates a 24 frame/second LTC output signal 314. The 24 frame/second LTC output signal 314 thus generated is output from a second LTC signal output terminal 330 to the outside.

A processing of calculating a time code which is to be executed by the time code calculating apparatus according to the present embodiment, more specifically, the intermediate data generating step and the overlapping count value correcting step will be described below with reference to a synchronous point correlation diagram of FIG. 29 and a detailed diagram showing a continuity addition offset table B4 of FIG. 30.

When a time code of a 30 frame/second type is to be converted into a time code of a 24 code/second type, five kinds of delay modes are present for the same reason as described in the first embodiment. In each delay mode, when the 24 frame/second LTC output signal 314 is to be generated from the 30 frame/second output LTC set value 310, a next processing is executed to cause the output timings of the time codes of both types to be coincident with each other.

In a first delay mode (pattern 1), a delay is not generated at all. In the first delay mode, the 24 frame/second LTC output signal 314 is output without a delay.

In a second delay mode (pattern 2), a delay corresponding to one frame is generated. In the second delay mode, the 24 frame/second LTC output signal 314 is output with a delay corresponding to one frame.

In a third delay mode (pattern 3), a delay corresponding to two frames is generated. In the third delay mode, the 24 frame/second LTC output signal 314 is output with a delay corresponding to two frames.

In a fourth delay mode (pattern 4), a delay corresponding to three frames is generated. In the fourth delay mode, the 24 frame/second LTC output signal 314 is output with a delay corresponding to three frames.

In a fifth delay mode (pattern 5), a delay corresponding to four frames is generated. In the fifth delay mode, the 24 frame/second LTC output signal 314 is output with a delay corresponding to four frames.

In order to convert the time code of the 30 frame/second type to the time code of the 24 frame/second type corresponding to the delay modes described above, the pattern recognizing circuit 325 and the continuity converting circuit 326A in the time code calculating apparatus according to the present embodiment carry out the following processings.

The pattern recognizing circuit 325 decides a delay pattern generated based on a combination of an operation mode of the recording and reproducing apparatus in which the time code calculating apparatus is incorporated and an image data output destination. The continuity converting circuit 326A applies a continuity addition offset corresponding to the result of the decision, thereby generating the 24 frame/second output LTC set value 313. The 24 frame/second output LTC set value 313 is continuous data. The 24 frame/second output LTC set value 313 is synchronous with the 30 frame/second output LTC set value 310 without a delay.

Next, description will be given to the details of the processing to be executed by the intermediate data generating circuit 324. First of all, the 30 frame/second output LTC set value 310, the 30 frame/second frame pulse 301 and the 24 frame/second frame pulse 307 are input to the intermediate data generating circuit 324. The set value 310, the pulse 301 and the pulse 307 are input from the recording and reproducing apparatus incorporating the time code calculating apparatus therein.

The 24 frame/second frame pulse 307 which is synchronous with the 30 frame/second frame pulse 301 (more specifically, which is synchronous with the synchronous point) is supplied. The intermediate data generating circuit 324 generates the intermediate data 313' based on the set value 310 and the pulse 301 which are input.

The intermediate data 313' are generated in the intermediate data generating circuit 324 in the following manner. The set value 310 is read in the fall timing of the pulse 301, and furthermore, the set value 310 thus read is output in the rise timing of the pulse 301. Consequently, the data 311 for conversion are generated in the intermediate data generating circuit 324. When the data 311 for conversion are to be generated, an offset of +1 is added. The +1 offset is added for the same reason as described in the first embodiment. The intermediate data generating circuit 324 reads the data 311 for conversion thus generated in the fall timing of the frame pulse 307, thereby generating the intermediate data 313'. The intermediate data 313' thus generated are supplied to the continuity converting circuit 326A.

In the data 311 for 24 frame/second conversion, a value is basically increased continuously for 30 counts (00 to 29 counts) per second in the same manner as the 30 frame/second output LTC set value 310. On the other hand, in the 24 frame/second output LTC set value 313, a value is increased continuously for 24 counts (00 to 23 counts) per second.

Thus, a count difference of six counts per second is present between the data 311 for conversion and the 24 frame/second output LTC set value 313. For this reason, the intermediate data 313' generated by reading the data 311 for conversion in the fall timing of the frame pulse 307 are simply generated by forcibly repeating a processing of reading the data 311 for conversion four times at an interval of ⅙ second to be a time interval at which the data 311 for conversion are increased by five counts. Accordingly, the output timing of the intermediate data 313' is synchronous with a cycle of 24 frames/second and a value of 0 to 29 is simply fetched discontinuously for the output count value of the intermediate data 313'.

On the other hand, output destination information and operation mode information are input to the pattern recognizing circuit 325. These information are supplied from the recording and reproducing apparatus. The pattern recognizing circuit 325 decides a delay pattern based on these information and supplies the delay pattern information thus decided to the continuity converting circuit 326A. Herein, the delay pattern implies the first to fifth delay patterns (patterns 1 to 5) described above.

The 24 frame/second frame pulse 307 is supplied to the continuity converting circuit 326A in addition to the intermediate data 313' and the delay pattern information.

The 24 frame/second frame pulse 307 which is synchronous with the 30 frame/second frame pulse 301 is generated.

The continuity converting circuit 326A executes a processing of subtracting one count (which will be hereinafter referred to as a subtraction offset processing) over the intermediate data 313'. This processing is repetitively executed every time the intermediate data 313' are updated (to have the same value in some cases). This processing is executed to modify the intermediate data 313' to be discontinuous data into the set value 313.

The subtraction offset processing is executed by subtracting a preset 30 frame/second output offset value 312 from the intermediate data 313'.

The subtraction offset processing will further be described in detail. As described above, portions in which adjacent count areas 313' ($\alpha$) and 313' ($\alpha$+1) are discontinuous are present in any case in the intermediate data 313'. This is caused by simply reading the data 311 for conversion in the fall timing of the frame pulse 307, thereby generating the intermediate data 313'.

In order to modify the intermediate data 313' having such a feature into the 24 frame/second output LTC set value 313 to be continuous data, a continuity addition offset processing including first and second subtraction offset processings which will be described below is executed. The first and second subtraction processings are reset at an interval of one second and are thus repeated.

The first subtraction offset processing does not carry out a subtraction processing for a count area 313' ($\alpha_r$) positioned on the first stage side (past side) on a time basis but carries out the subtraction processing for the count value by −1 in only the count area 313' ($\alpha$+1) positioned on the second stage side (future side) in the discontinuous and adjacent count areas (which will be hereinafter referred to as discontinuous count areas) 313' ($\alpha_r$) and 313' ($\alpha_r$+1) in the intermediate data 313'.

In the second subtraction offset processing, the same subtraction offset processing (−1 subtraction processing) is continuously executed for all count areas 313' ($\alpha_r$+(2 to x)) [x is incremented till a reset every one second] which are positioned on the backward side on a time basis from the count area 313' ($\alpha_r$+1) positioned on the second stage side on a time basis in which the first subtraction offset processing is executed.

The first subtraction offset processing is repetitively executed at an interval of ⅙ second at which the data 311 for conversion are read four times. For this reason, the first subtraction offset processing is executed six times in total every second. In the second subtraction offset processing, accordingly, the −1 subtraction processing which is executed by each first subtraction offset processing is continuously subjected to an integration processing. Such first and second subtraction offset processings are reset every second as described above.

If the continuity addition offset processing including the first and second subtraction offset processings is executed, it is possible to modify the intermediate data 313' into the 24 frame/second output LTC set value 313.

When the above continuity addition offset processing is to be executed, a problem arises in the following and second processings. In the first processing, the discontinuous count areas 313' ($\alpha_r$) and 313' ($\alpha_r$+1) which are adjacent to each other are selectively extracted in the intermediate data 313'.

In the second processing, the count area 313' ($\alpha_r$) positioned on the first stage side and the count area 313' ($\alpha_r$+1) positioned on the second stage side on a time basis are identified in the discontinuous count areas 313' ($\alpha_r$) and 313' ($\alpha_r$+1) which are adjacent to each other.

If the correlation between the 30 frame/second output LTC set value 310 and the 24 frame/second output LTC set value 313 is guessed, it is possible to predict the portions in which the discontinuous count areas 313' ($\alpha_r$) and 313' ($\alpha_r$+1) are generated. By taking the timing area T1 shown in FIG. 29 as an example, count areas 313' (02) and 313' (04) taking values of (02) and (04) are discontinuous.

This can be predicted by checking the correlation between the timing chart of the data 311 for conversion and the timing chart of the intermediate data 313'. In addition, in the portion in which the discontinuous count area is generated, such a fluctuation as to be caused in the overlapping count area is not caused when the 24 frame/second frame pulse 307 is to be converted into the 30 frame/second frame pulse 301.

Figure 30:
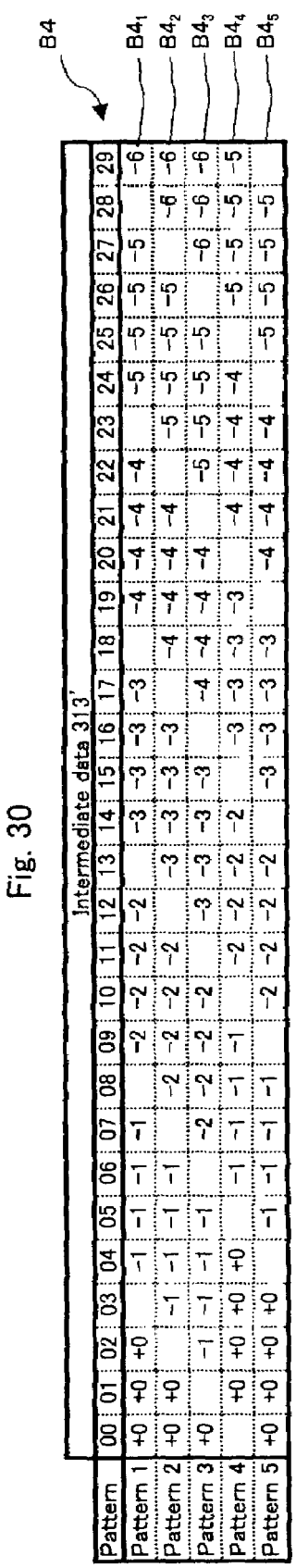
FIG. 30 is a diagram showing the structure of a continuity addition offset table according to the fourth embodiment.

Therefore, the continuity converting circuit 326A executes the first and second subtraction offset processings by using the continuity addition offset table B4 shown in FIG. 30. In the continuity addition offset table B4, offset data $B4_1$ to $B4_5$ which are varied for the first to fifth delay patterns (patterns 1 to 5) are set.

More specifically, the continuity converting circuit 326A executes the above-mentioned first and second offset processings in the following manner. The continuity converting circuit 326A reads the intermediate data 313' from the intermediate data generating circuit 324 and reads the delay pattern information from the pattern recognizing circuit 325. Then, the continuity converting circuit 326A collates the read delay pattern with the continuity addition offset table B4, thereby determining an offset amount to be applied to the intermediate data 313'. The continuity converting circuit 326A executes the subtraction offset processing over the intermediate data 313' based on the offset amount thus determined, thereby generating the 24 frame/second output LTC set value 313.

Figure 31:
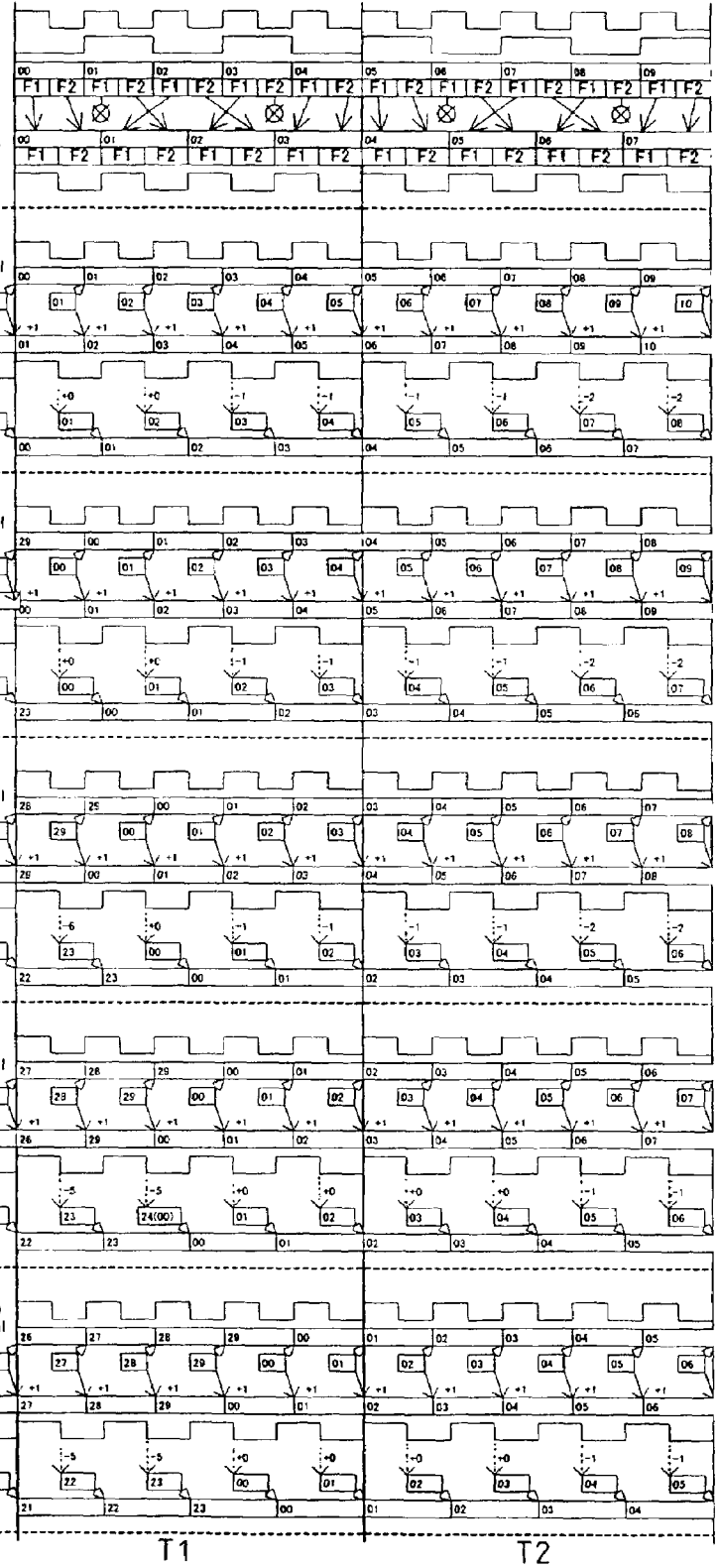
FIG. 31 is a further time chart in the time code calculating step of the time code calculating apparatus according to the fourth embodiment, illustrating a first stage.
Figure 32:
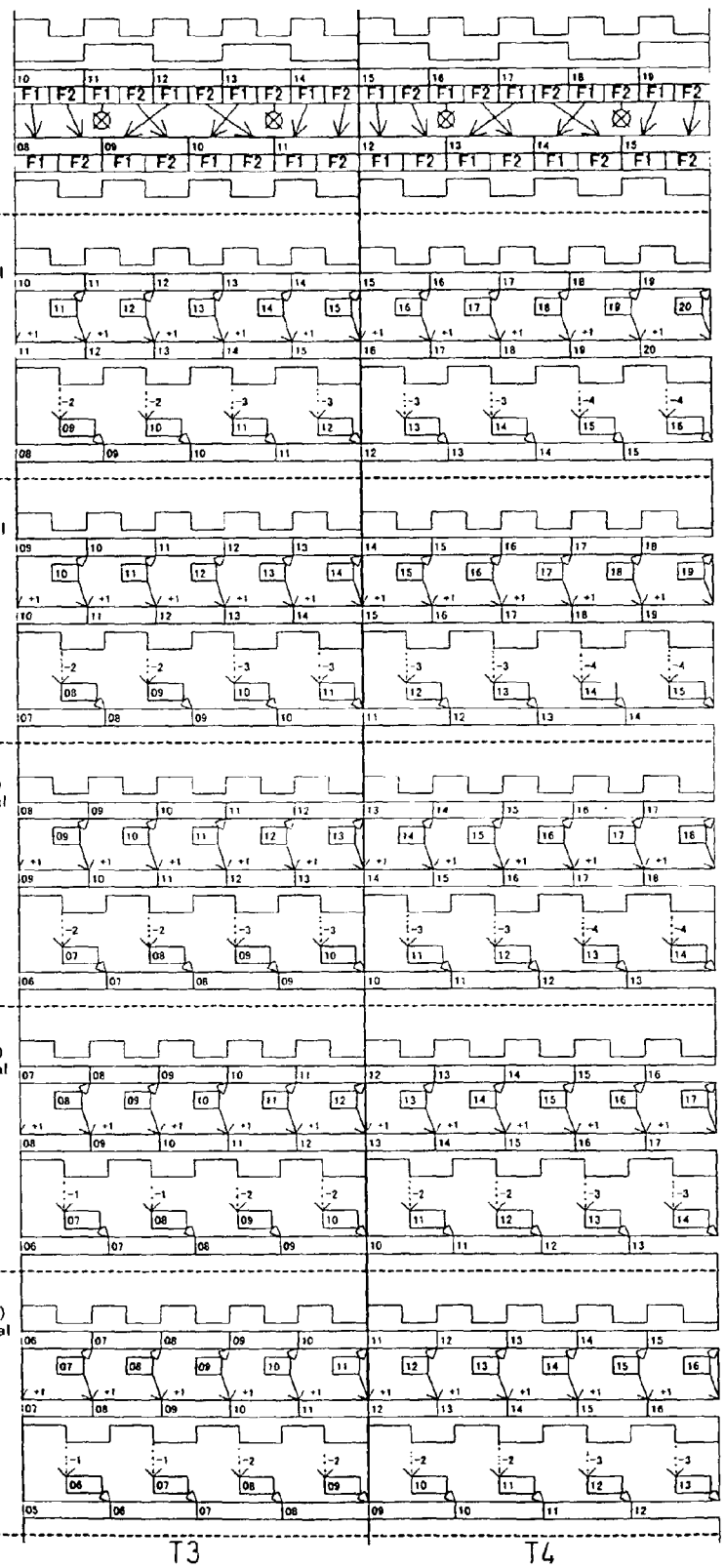
FIG. 32 is a further time chart in the time code calculating step of the time code calculating apparatus according to the fourth embodiment, illustrating a middle stage.
Figure 33:
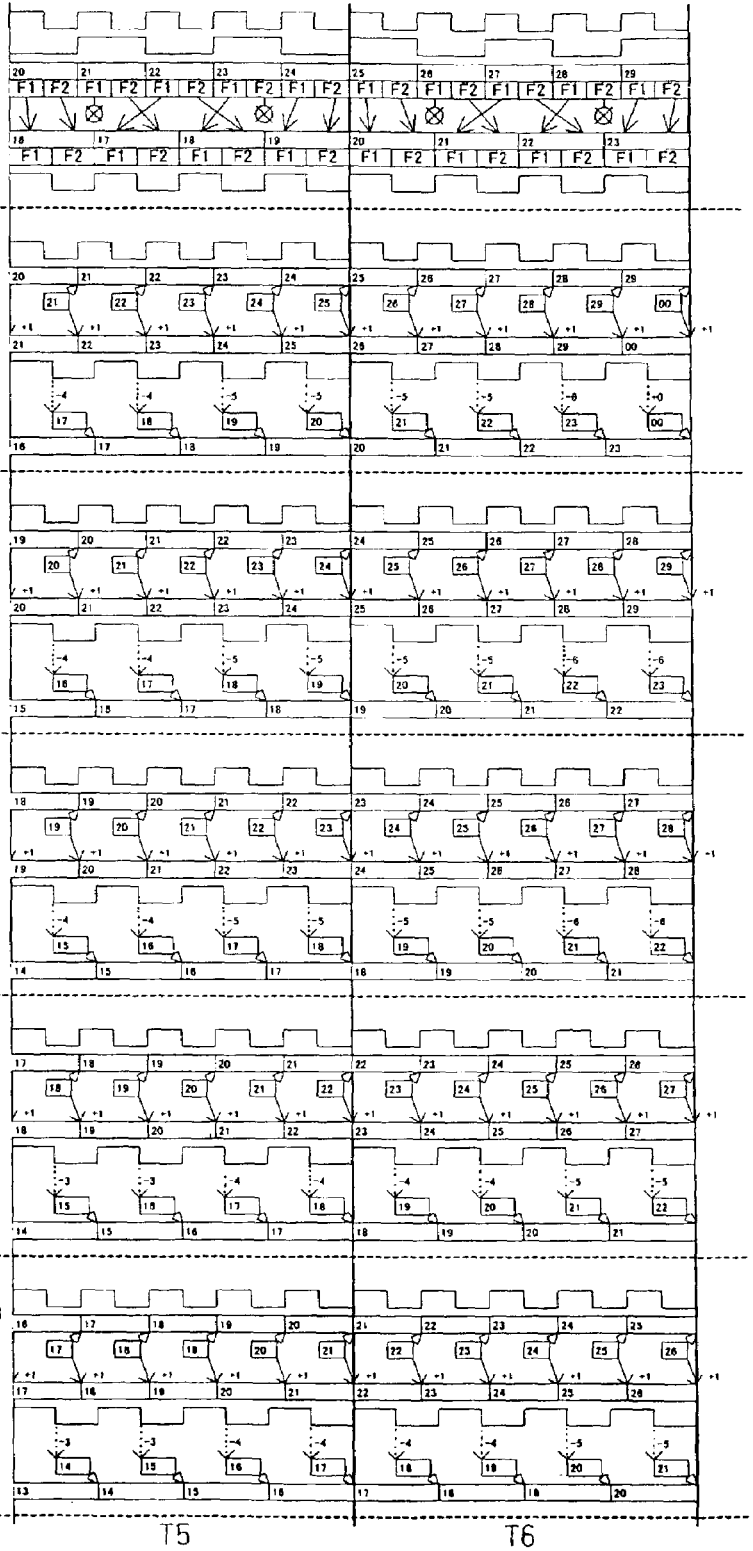
FIG. 33 is a further time chart in the time code calculating step of the time code calculating apparatus according to the fourth embodiment, illustrating a second stage.

The continuity converting circuit 326A outputs the generated set value 313 to the second LTC signal output circuit 328. The second LTC signal output circuit 328 reads the input set value 313 in the rise timing of the 24 frame/second frame pulse 307, thereby generating and outputting the 24 frame/second LTC output signal 314. FIGS. 31 to 33 show a conversion correlation diagram between the 24 frame/second LTC output signal 314 thus generated and each signal.

Fifth Embodiment

Figure 34:
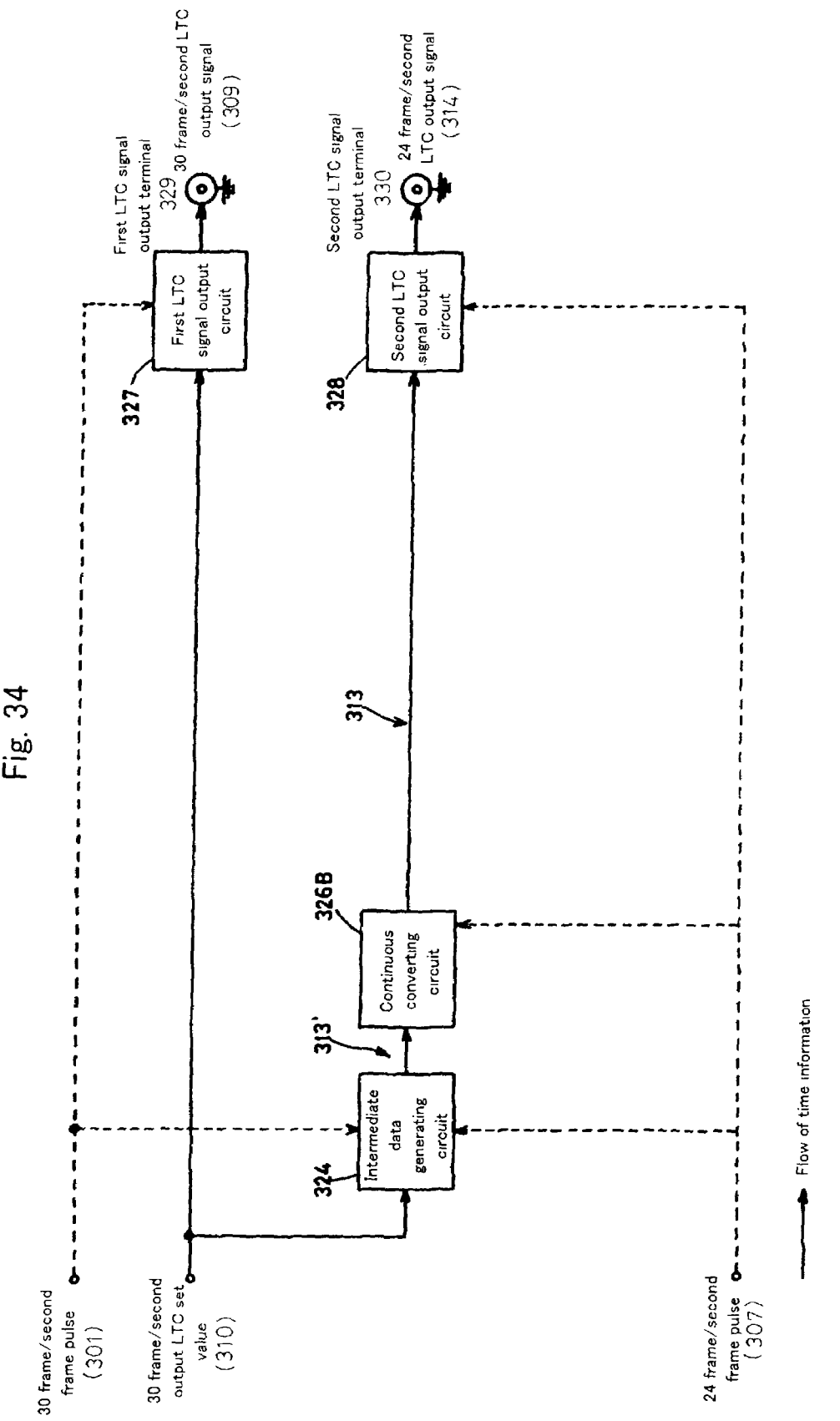
FIG. 34 is a block diagram showing the structure of a time code calculating apparatus according to a fifth embodiment of the present invention.

FIG. 34 is a block diagram showing the structure of a time code calculating apparatus according to a fifth embodiment of the present invention. The time code calculating apparatus basically has the same structure as that of the apparatus according to the fourth embodiment. However, the time code calculating apparatus has the following features.

The pattern recognizing circuit 325 is not required because the delay pattern information is not used.

The delay pattern information is not used so that the structure and operation of a continuity converting circuit 326B are different.

In the present embodiment, accordingly, description will be given to only the structure of the continuity converting circuit 326B and the overlapping count value correcting step to be executed by the continuity converting circuit 326B. Since other structures and steps are the same as those in the fourth embodiment, description thereof will be omitted.

The continuity addition offset table B4 of the continuity converting circuit 326A according to the fourth embodiment has a complicated data structure in which the offset data $B4_1$ to $B4_5$ are set every first to fifth delay patterns.

On the other hand, the continuity converting circuit 326B according to the present embodiment has the following continuity addition offset table B5. The continuity addition offset table B5 is constituted by one offset data $B5_1$ irrespective of a delay pattern as shown in FIG. 35. In addition, the offset data $B5_1$ are constituted by a single offset value group $B5_{1(M)}$.

The continuity converting circuit 326B executes a continuity addition offset processing (a subtraction offset processing) over intermediate data 313' based on the continuity addition offset table B5 thus constituted. For this reason, a pattern recognizing circuit for recognizing the delay pattern is omitted.

The operation to be executed by the time code calculating apparatus according to the present embodiment will be described below with reference to conversion process diagrams of FIGS. 36 to 40.

When a time code of a 30 frame/second type is to be converted into a time code of a 24 frame/second type, the continuity addition offset processing including the first subtraction offset processing and the second subtraction offset processing is required as described in the fourth embodiment.

In the first subtraction offset processing, a subtraction processing is not carried out over a count area 313' ($\alpha_r$) positioned on the first stage side (past side) on a time basis but is carried out over a count area 313' ($\alpha_r$+1) positioned on the second stage side (future side) by subtracting −1 from a count value thereof in the discontinuous count areas 313' ($\alpha_r$) and 313' ($\alpha_r$+1).

In the second subtraction offset processing, after the first subtraction offset processing is executed, the same subtraction offset processing (−1 subtraction processing) is continuously executed over all count areas 313' ($\alpha_r$+(2 to x)) positioned on the further backward side on a time basis from the count area 313' ($\alpha_r$+1) subjected to the first subtraction offset processing.

In order to execute the first subtraction offset processing, the following first and second processings are required. In the first processing, the discontinuous count areas 313' ($\alpha_r$) and 313' ($\alpha_r$+1) which are adjacent to each other in the intermediate data 313' are extracted selectively. In the second processing, the count area 313' ($\alpha_r$) positioned on the first stage side and the count area 313' ($\alpha_r$+1) positioned on the second stage side on a time basis are distinguished from each other in the discontinuous count areas 313' ($\alpha_r$) and 313' ($\alpha_r$+1) which are adjacent to each other.

For this reason, in the fourth embodiment, there are required the pattern recognizing circuit 325 for recognizing the first to fifth delay patterns and the continuous addition offset table B4 having the offset data $B4_1$ to $B4_5$.

In the present embodiment, such a structure is omitted as much as possible and the conversion of a time code is implemented. Correspondingly, the structure can be simplified. Therefore, the time code calculating apparatus according to the present embodiment is constituted in the following manner.

The continuity converting circuit 326B does not execute the first subtraction offset processing but executes only the second subtraction offset processing. For this reason, only the continuity addition offset table B5 for executing the second subtraction offset processing is stored in the continuity converting circuit 326B.

In the fourth embodiment, the first subtraction offset processing and the second subtraction offset processing are executed at the same time. For this reason, the continuity addition offset table B4 having the offset data $B4_1$ to $B4_5$ are stored in the continuity converting circuit 326A.

On the other hand, in the present embodiment, the second subtraction offset processing is executed. For this reason, the continuity addition offset table B5 including offset data $B5_1$ having one pattern and an offset value group $B5_{1(M)}$ having one pattern is stored in the continuity converting circuit 326B as shown in FIG. 35. Consequently, a table data volume is reduced and an increase in the speed of the operation processing is realized.

Next, the overlapping count value correcting step (continuity converting step) of the continuity converting circuit 326B using the continuity addition offset table B5 will be described with reference to FIGS. 36 to 40. FIGS. 36 to 40 are diagrams showing the conversion process of the continuity converting step.

In the intermediate data 313', five basic output patterns 1 to 5 which are different from each other are present for the first to fifth delay patterns described above. On the other hand, FIGS. 36 to 40 show the respective conversion processes for the intermediate data 313' taking the basic output patterns 1 to 5.

The continuity converting circuit 326B subtracts the offset data $B5_1$ (more specifically, the offset value group $B5_{1(M)}$) from each count value of the intermediate data 313', thereby generating a primary conversion value 315. The subtraction processing is executed irrespective of the output pattern of the intermediate data 313'.

The offset data $B5_1$ are used for executing the second subtraction offset processing and do not correspond to a processing of adding a continuity to the intermediate data 313'. For this reason, the primary conversion value 315 thus generated is to have a data configuration leaving a discontinuity incidental to the intermediate data 313'. Therefore, the continuity converting circuit 326B executes the following continuity converting step (the overlapping count value correcting step) over the generated primary conversion value 315.

For the continuity converting step, first of all, the same reference set processing as that described in the second embodiment is executed. The concept of a selection object count value, a selection object first stage count value, a conversion defined value, a conversion object count value and a conversion object first stage count value which are to be used in the following description is the same as that described in the second embodiment.

The selection object count value which satisfies either of the following conditions 1 and 2 is defined as a reference count value.

Condition 1: The selection object count value is (23).

Condition 2: The selection object count value is (0) and the conversion defined value of the selection object first stage count value is not (0).

After the reference count value is set, the same continuity conversion processing as that described in the second embodiment is executed on the basis of the reference count value thus set. More specifically, the conversion object count value is converted in such a manner that the conversion object count value continues backward side on a time basis (that is, in a count-up direction). The conversion processing is executed on the basis of the conversion defined value of the count value on the conversion object first stage side.

The conversion defined values obtained by executing such a continuity conversion processing continue to each other and become the 24 frame/second output LTC set value 313.

The continuity converting circuit 326B outputs the generated set value 313 to the second LTC signal output circuit 328. The second LTC signal output circuit 328 reads the input set value 313 in the rise timing of a 24 frame/second frame pulse 307, thereby generating and outputting a 24 frame/second LTC output signal 314.

Sixth Embodiment

Next, description will be given to a sixth embodiment in which the present invention is carried out in a time code calculating apparatus to be used for converting image data of a 24 frame/second type (a non-drop mode) into image data of a 30 frame/second type (a non-drop mode). The time code calculating apparatus converts a time code in such a state that a synchronous point is not fixedly set to a positive point (a 00 frame point of each second) but is set to an optional frame position of each point (each second).

Figure 41:
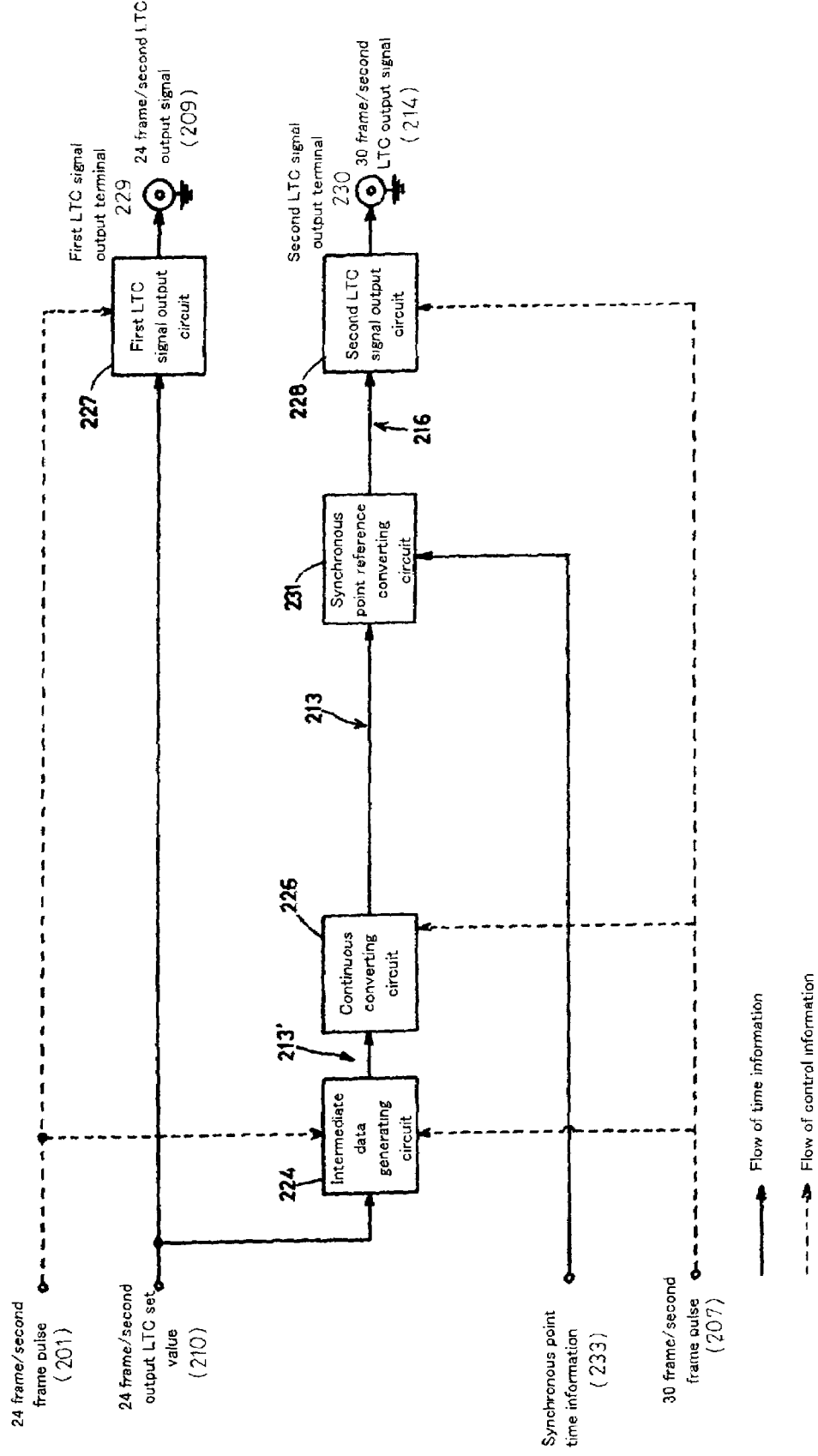
FIG. 41 is a block diagram showing the structure of a time code calculating apparatus according to a sixth embodiment of the present invention.

First of all, the schematic structure of the time code calculating apparatus according to the present embodiment will be described with reference to a functional block diagram of FIG. 41. The basic structure of the present embodiment has the same structure as that of each of the first to third embodiments, and the same or similar portions have the same reference numerals and description thereof will be omitted. A continuity converting circuit according to the present embodiment can have the same structure even if any of the continuity converting circuits 226A, 226B and 226C according to the first to third embodiments is used. For this reason, they will be generally referred to as a continuity converting circuit 226 in the following description and drawings (FIG. 41 and the like). In FIG. 41, a pattern recognizing circuit 225 and a 1-field delay 2-dividing frame pulse 208 are not shown. In the case in which the continuity converting circuit 226 is constituted by the continuity converting circuits 226A, 226B and 226C according to the first to third embodiments, it is apparent that the pattern recognizing circuit 225 and the 1-field delay 2-dividing frame pulse 208 are required.

The time code calculating apparatus according to the present embodiment is characterized by a synchronous point reference converting circuit 231 according to an example of a synchronous regulator. The synchronous point reference converting circuit 231 converts a 30 frame/second output LTC set value 213 output from the continuity converting circuit 226 in such a state that the synchronous point is fixed to the positive point into a synchronous regulation set value 216 corresponding to an optional synchronous point (an optional frame position). The optional synchronous point is set by synchronous point time information 233 input to the synchronous point reference converting circuit 231.

Next, description will be given to the synchronous regulating step to be executed by the synchronous point reference converting circuit 231.

In the present embodiment, the set of the synchronous point to the optional frame position is defined as follows. The count area (frame position) of intermediate data 213' is collated with the count area (frame position) of the 30 frame/second output LTC set value 213 and an offset is applied to the set value 213 in such a manner that the output timings of the count values (frame positions) to be synchronous with each other are apparently coincident with each other. This is defined as the set of the synchronous point to the optional frame position. The offset will be hereinafter referred to as a synchronous regulation offset.

The synchronous regulation offset processing will be described in more detail with reference to FIGS. 42 to 50. As described above, eight patterns in total (see FIGS. 10 to 17 and the like) including the pattern 1(*a*), pattern 1(*b*), the pattern 2(*a*), . . . , the pattern 4(*b*) are discontinuously present in the intermediate data 213' based on the delay pattern and the like. By executing the same synchronous regulation offset processing over these discontinuous patterns, it is possible to set the synchronous point to the optional frame position (count value).

For this reason, the synchronous regulation offset processing will be described below by taking, as an example, the discontinuous pattern (see FIG. 10) of the pattern 1(*a*) to be one of the discontinuous patterns. Also in the discontinuous patterns other than the pattern 1(*a*), similarly, the synchronous regulation offset processing is executed.

Figures 42A, 42B, 42C, 42D, 42E, 42F, 42G:
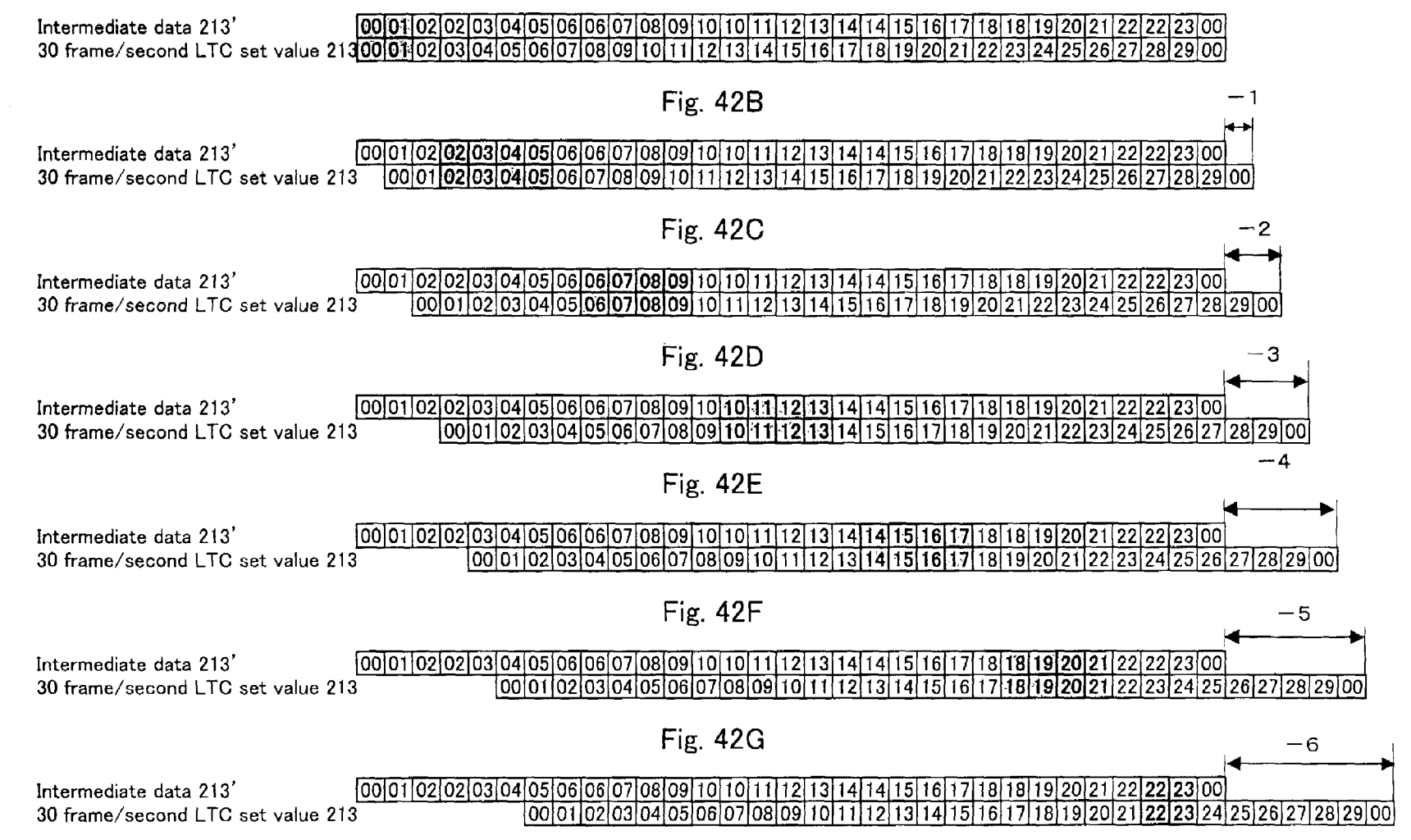

As shown in FIGS. 42A to 42G, eight patterns are present in the synchronous pattern of the intermediate data 213' and the 30 frame/second output LTC set value 213. The pattern in FIG. 42A is synchronous with 00 and 01 frames. The pattern in FIG. 42B is synchronous with 02 to 05 frames. The pattern in FIG. 42C is synchronous with 06 to 09 frames. The pattern in FIG. 42D is synchronous with 10 to 13 frames. The pattern in FIG. 42E is synchronous with 14 to 17 frames. The pattern in FIG. 42F is synchronous with 18 to 21 frames. The pattern in FIG. 42G is synchronous with 22 and 23 frames.

In these synchronous patterns, the set value 213 is moved toward the forward side (past side) on a time base with respect to the intermediate data 213'. The amount of movement is 0 in the pattern of FIG. 42A, is −1 in the pattern of FIG. 42B, is −2 in the pattern of FIG. 42C, is −3 in the pattern of FIG. 42D, is −4 in the pattern of FIG. 42E, is −5 in the pattern of FIG. 42F, and is −6 in the pattern of FIG. 42G.

Consequently, if the amount of movement of the set value 213 is set based on the frame position information of the synchronous point, the synchronous regulation set value 216 can be synchronized with the intermediate data 213' in an almost frame unit at the optional synchronous point (frame position).

In a synchronous regulation offset table C1 shown in FIG. 43, the amount of movement is set to be the synchronous regulation offset. When the synchronous point time information 233 is input, the synchronous point reference converting circuit 231 executes the following synchronous regulation offset processing based on the frame position information of the information 233.

In the case in which the frame position information is 00 and 01, an offset amount (+0) is set so that a synchronous regulation offset processing shown in FIG. 44 is executed. In this case, the synchronous regulation offset processing is not substantially executed because of the offset amount (+0). In the case in which the frame position information is 02 to 05, an offset amount (−1) is set and a synchronous regulation offset processing shown in FIG. 45 is executed. In the case in which the frame position information is 06 to 09, an offset amount (−2) is set so that a synchronous regulation offset processing shown in FIG. 46 is executed. In the case in which the frame position information is 10 to 13, an offset amount (−3) is set so that a synchronous regulation offset processing shown in FIG. 47 is executed. In the case in which the frame position information is 14 to 17, an offset amount (−4) is set so that a synchronous regulation offset processing shown in FIG. 48 is executed. In the case in which the frame position information is 18 to 21, an offset amount (−5) is set so that a synchronous regulation offset processing shown in FIG. 49 is executed. In the case in which the frame position information is 22 and 23, an offset amount (−6) is set so that a synchronous regulation offset processing shown in FIG. 50 is executed.

The synchronous point reference converting circuit 231 executes the synchronous point reference conversion processing, thereby generating a synchronous regulation set value 216 and outputting the set value 216 thus generated to a second LTC signal output circuit 228. The second LTC signal output circuit 228 outputs the input set value 216 as a 30 frame/second LTC output signal 214.

Seventh Embodiment

In the present embodiment, the present invention is carried out in a time code calculating apparatus to be used for converting image data of a 30 frame/second type (a non-drop mode) into image data of a 24 frame/second type (a non-drop mode). The time code calculating apparatus converts a time code in such a state that a synchronous point is not fixedly set to a positive point (a 00 frame point of each second) but is set to an optional frame position of each point (each second).

First of all, the schematic structure of the time code calculating apparatus according to the present embodiment will be described with reference to a functional block diagram of FIG. 51. The time code calculating apparatus according to the present embodiment has the same structure as that of each of the fourth and fifth embodiments, and the same or similar portions have the same reference numerals and description thereof will be omitted. A continuity converting circuit according to the present embodiment can have the same structure even if any of the continuity converting circuits 326A and 326B according to the fourth and fifth embodiments is used. For this reason, they will be generally referred to as a continuity converting circuit 326 in the following description and drawings (FIG. 51 and the like). In FIG. 51, a pattern recognizing circuit 325 is not shown. In the case in which the continuity converting circuit 326 is constituted by the continuity converting circuit 326A according to the fourth embodiment, the pattern recognizing circuit 325 is required.

The time code calculating apparatus according to the present embodiment is characterized by a synchronous point reference converting circuit 331 according to an example of a synchronous regulator. The synchronous point reference converting circuit 331 converts a 24 frame/second output LTC set value 313 into a 24 frame/second synchronous regulation set value 316 corresponding to an optional synchronous point (an optional frame position).

The 24 frame/second output LTC set value 313 is generated in the continuity converting circuit 326 in such a state that the synchronous point is fixed to the positive point.

The synchronous point is set by the synchronous point reference converting circuit 331 based on synchronous point time information 333.

Next, description will be given to the synchronous regulating step to be executed by the synchronous point reference converting circuit 331.

In the present embodiment, the set of the synchronous point to the optional frame position is defined as follows. The count value (frame position) of intermediate data 313' is collated with the count value (frame position) of the 24 frame/second output LTC set value 313 and an offset (a synchronous regulation offset) is applied to the set value 313 in such a manner that the output timings of the count values (frame positions) to be synchronous with each other are apparently coincident with each other. This is defined as the set of the synchronous point to the optional frame position.

The synchronous regulating step to be executed by the synchronous point reference converting circuit 331 will be described in more detail with reference to FIGS. 52 to 58. As described above, the discontinuity of five patterns (see FIGS. 36 to 40 and the like) is present in the intermediate data 313' based on the delay pattern and the like. In the present embodiment, it is possible to set the synchronous point to the optional frame position (count value) for any of these discontinuous patterns. In addition, the synchronous point can be set by the execution of the same synchronous regulation offset processing. For this reason, the synchronous regulating step will be described below by taking, as an example, a pattern 1 (see FIG. 36) to be one of the discontinuous patterns. Also in the discontinuous patterns other than the pattern 1, similarly, the same synchronous regulating step is executed.

Figures 52A, 52B, 52C, 52D, 52E:
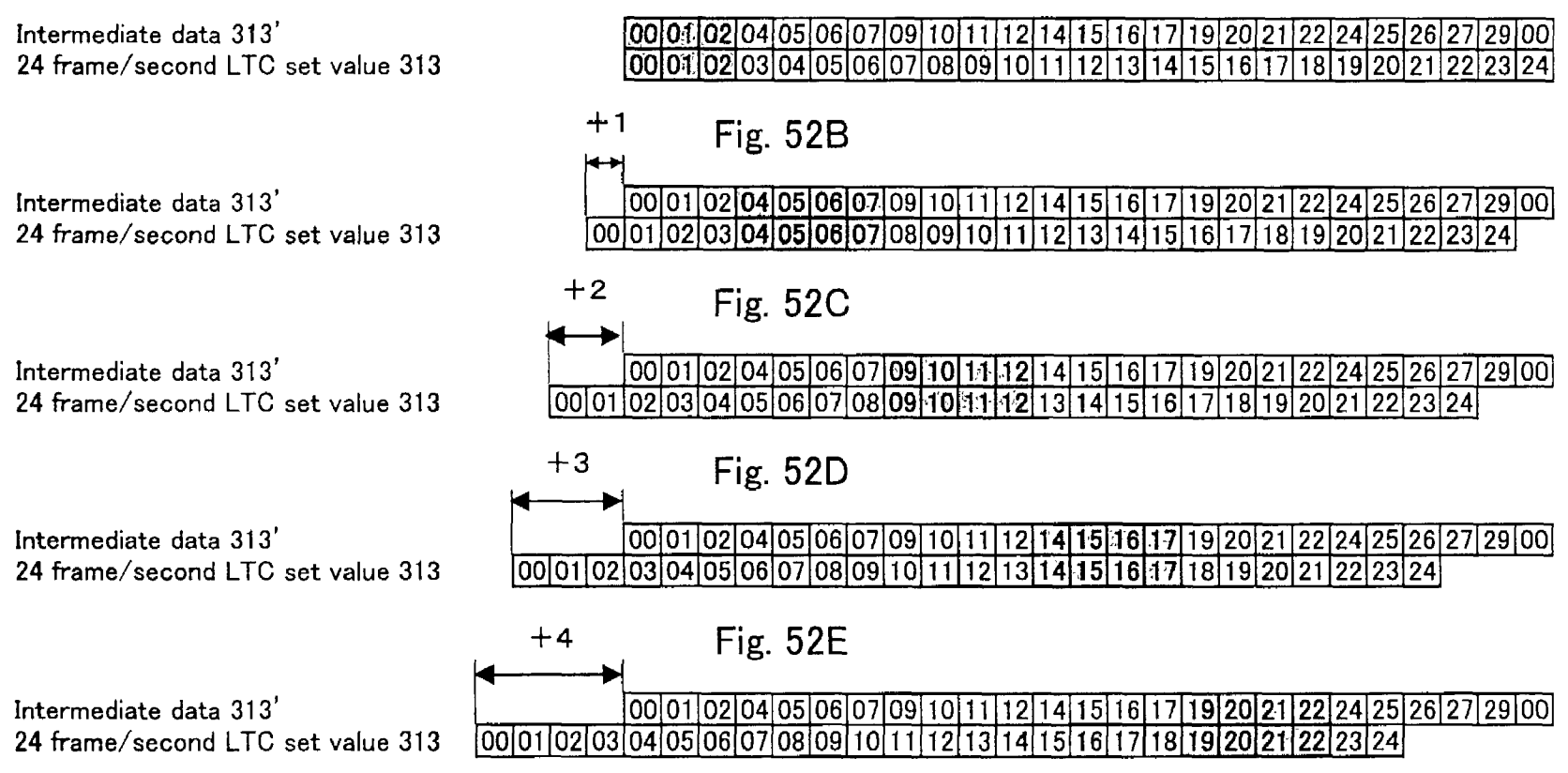

As shown in FIGS. 52A to 52E, five patterns are present in the synchronous pattern of the intermediate data 313' and the 24 frame/second output LTC set value 313. The pattern in FIG. 52A is synchronous with 00 to 02 frames. The pattern in FIG. 52B is synchronous with 04 to 07 frames. The pattern in FIG. 52C is synchronous with 09 to 12 frames. The pattern in FIG. 52D is synchronous with 14 to 17 frames. The pattern in FIG. 52E is synchronous with 19 to 22 frames.

In these synchronous patterns, the set value 313 is moved toward the backward side (future side) on a time base with respect to the intermediate data 313'. The amount of movement is 0 in the pattern of FIG. 52A, is +1 in the pattern of FIG. 52B, is +2 in the pattern of FIG. 52C, is +3 in the pattern of FIG. 52D, and is +4 in the pattern of FIG. 52E.

For this reason, if the amount of movement of the set value 313 is set based on the frame position information of the synchronous point, the 24 frame/second synchronous regulation set value 316 can be synchronized with the intermediate data 313' in an almost frame unit at the optional synchronous point (frame position).

In a synchronous regulation offset table C2 shown in FIG. 53, the amount of movement is set to be the synchronous regulation offset. When the synchronous point time information 333 is input, the synchronous point reference converting circuit 331 executes a next synchronous regulating step based on the frame position information of the information 333.

In the case in which the frame position information is 00 to 03, an offset amount (+0) is set so that a synchronous regulating step shown in FIG. 54 is executed. In this case, the synchronous regulating step is not substantially executed because of the offset amount (+0). In the case in which the frame position information is 04 to 08, an offset amount (+1) is set and a synchronous regulating step shown in FIG. 55 is executed. In the case in which the frame position information is 09 to 13, an offset amount (+2) is set so that a synchronous regulating step shown in FIG. 56 is executed. In the case in which the frame position information is 14 to 18, an offset amount (+3) is set so that a synchronous regulating step shown in FIG. 57 is executed. In the case in which the frame position information is 19 to 23, an offset amount (+4) is set so that a synchronous regulating step shown in FIG. 58 is executed.

The synchronous point reference converting circuit 331 executes the synchronous regulating step, thereby generating a 24 frame/second synchronous regulation set value 316 and outputting the set value 316 thus generated to a second LTC signal output circuit 328. The second LTC signal output circuit 328 outputs the input set value 316 as a 24 frame/second LTC output signal 314.

Eighth Embodiment

Figure 59:
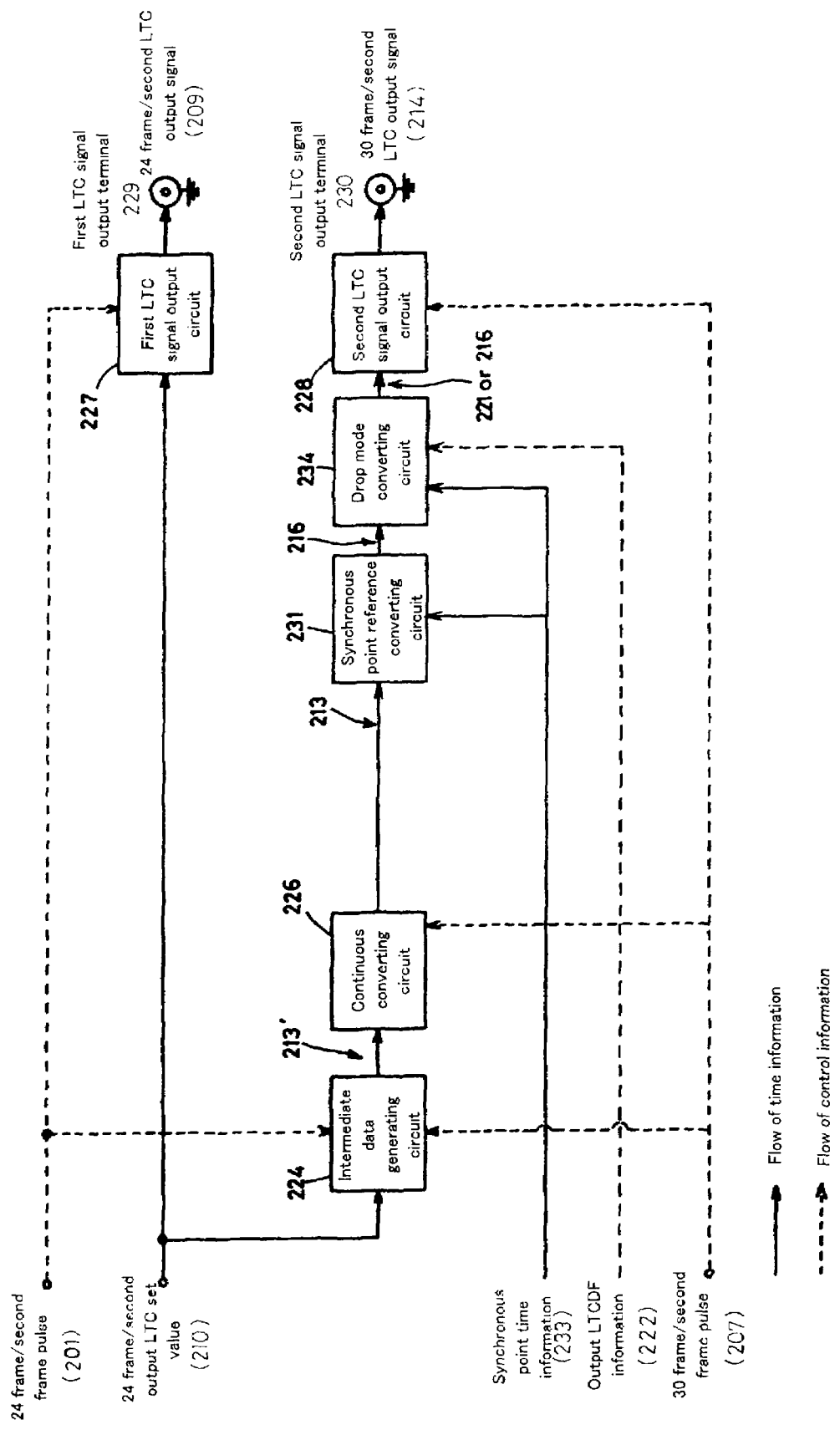
FIG. 59 is a block diagram showing the structure of a time code calculating apparatus according to an eighth embodiment of the present invention.
Figure 60:
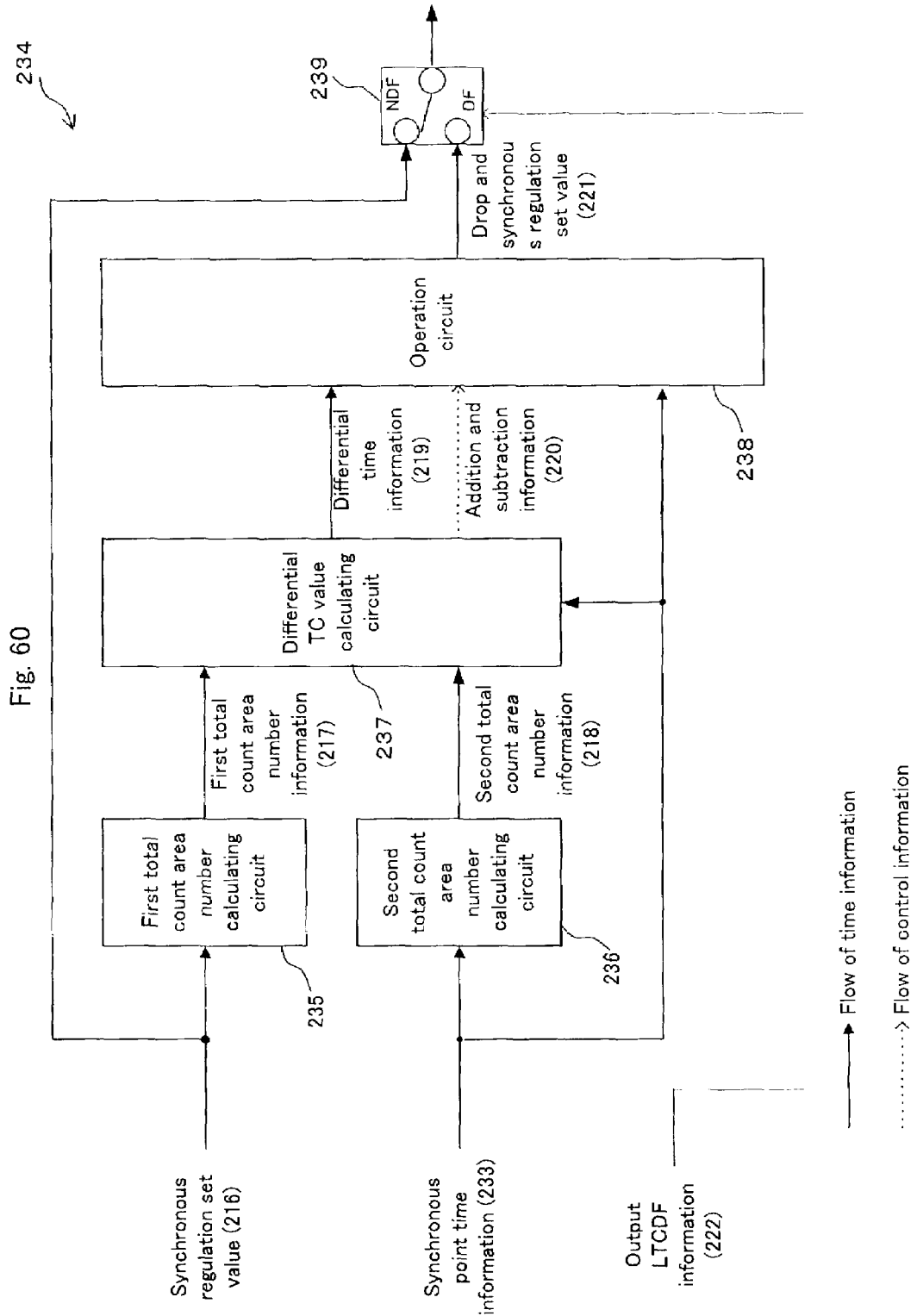
FIG. 60 is a block diagram showing the structure of a drop mode converting circuit according to the eighth embodiment.
Figure 61:
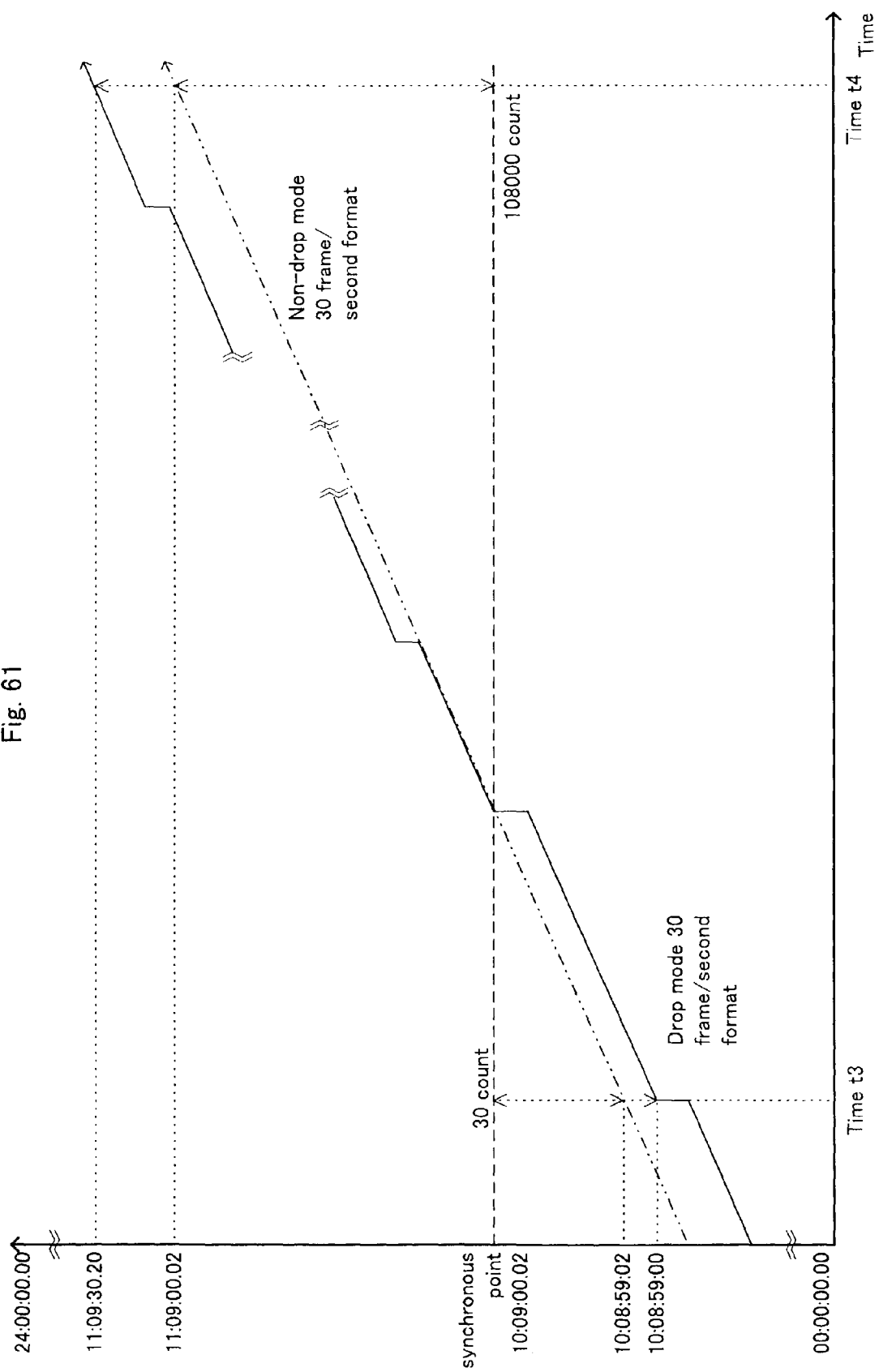
FIG. 61 is a chart for explaining the conversion process of a time code according to the eighth embodiment.

An eighth embodiment of the present invention will be described with reference to FIGS. 59 to 61. The eighth embodiment provides a time code calculating apparatus for converting a time code of a 24 frame/second type (a non-drop mode) into a time code of a 30 frame/second type (a drop mode)

The time code calculating apparatus according to the present embodiment has the same structure as that in the sixth embodiment, and the same or similar portions have the same reference numerals and description thereof will be omitted.

The time code calculating apparatus according to the present embodiment is characterized by a drop mode converting circuit 234 according to an example of a drop mode converter. The drop mode converting circuit 234 is provided between a synchronous point reference converting circuit 231 and a second LTC signal output circuit 228. The drop mode converting circuit 234 converts a synchronous regulation set value 216 to be data in a non-drop mode into a drop synchronous regulation set value 221 to be data in a drop mode.

Next, the structure of the drop mode converting circuit 234 and the drop mode converting step to be executed by the drop mode converting circuit 234 will be described with reference to FIGS. 60 and 61. The drop mode converting circuit 234 comprises a first total count area number calculating circuit 235 according to an example of a first total count area number calculator, a second total count area number calculating circuit 236 according to an example of a second total count area number device, a difference TC value calculating circuit 237 according to an example of a difference calculator, a calculating circuit 238 according to an example of a calculator, and a switching circuit 239.

When a synchronous regulation set value 216 is input, the first total count area number calculating circuit 235 converts the total count area number information (total frame number information in a 30 frame/second format) of time code information defined by the set value 216, thereby generating first total count area number information 217.

When synchronous point time information 233 is input, the second total count area number calculating circuit 236 converts time code information defined by the information 233 into the total count area number information in a 24 frame/second format (corresponding to the total frame number information), thereby generating second total count area number information 218.

The difference TC value calculating circuit 237 calculates a difference between the first total count area number information 217 and the second total count area number information 218. Furthermore, the difference TC value calculating circuit 237 converts the difference count area number (corresponding to difference frame number information) thus calculated into time information, thereby generating difference time information 219. Moreover, the difference TC value calculating circuit 237 generates addition and subtraction information 220 indicating whether the difference is positioned on the forward side (past side) or the backward side (future side) on a time basis with respect to a synchronous point.

The calculating circuit 238 simply carries out an operation by using a well-known time code calculating device based on the difference time information 219, the addition and subtraction information 220 and the synchronous point time information 233, thereby converting the synchronous regulation set value 216 into a drop synchronous regulation set value 221 to be data in the drop mode. The position on a time basis of the drop synchronous regulation set value 221 is regulated in such a manner that a synchronization is taken with the synchronous regulation set value 216 at a point defined by the synchronous point time information 233.

The switching circuit 239 selects the synchronous regulation set value 216 and the drop synchronous regulation set value 221 and outputs them toward the second LTC signal output circuit 228 based on output LTCDF information 222.

The output LTCDF information 222 indicates whether the output configuration of the 30 frame/second LTC output signal 214 output from the second LTC signal output circuit 228 is the drop mode or the non-drop mode.

The drop mode converting step to be executed by the drop mode converting circuit 234 will be described below with reference to a signal output configuration chart of FIG. 61. FIG. 61 is a chart showing a configuration in which t4 [11 (hour):09 (minute):00 (second):02 (frame)] or t3 [10 (hour):08 (minute):59 (second):02 (frame)] to be a non-drop mode time code is converted into a drop mode time in the case in which a synchronous point in a 30 frame/second format is set to [10 (hour):09 (minute):00 (second):02 (frame)].

At the drop mode converting step, in other words, a non-drop time is compared with a drop time to regulate the drop time with respect to the non-drop time in such a manner that both times are completely synchronous with each other in the synchronous point.

First of all, in the first total count area number calculating circuit 235, a total count area number (a total frame number) of the synchronous regulation set value 216 ($t4_{or}t3$) to be non-drop information is calculated. In the case of t4 [11 (hour):09 (minute):00 (second):02 (frame)], a count area number of 1204202 is calculated. In the case of t3 [10 (hour):08 (minute):59 (second):02 (frame)], moreover, a count area number of 1096172 is calculated.

On the other hand, in the second total count area number calculating circuit 236, a total count area number (a total frame number) of the synchronous point time information 233 to be non-drop information is calculated. In the case of the synchronous point [10 (hour):09 (minute):00 (second):02 (frame)], a count area number (a frame number) of 1096202 is calculated.

The difference TC value calculating circuit 237 calculates a difference in a count area number (a difference in a frame number) between the synchronous regulation set value 216 and the synchronous point time information 233. The difference in the count area number is calculated based on the first total count area number information 217 and the second total count area number information 218.

For example, in the case in which the synchronous regulation set value 216 is t4, 1204202−1096202=108000 is calculated. On the other hand, in the case in which the synchronous regulation set value 216 is t3, 1096202−1096172=30 is calculated.

The difference TC value calculating circuit 237 calculates the difference in the count area number and then generates the difference time information 219. The difference time information 219 is calculated by converting the difference in the count area number into time information in a 30 frame/second format in the non-drop mode.

In the case of t4 (a frame difference of 108000), the difference time information 219 is 01 (hour):00 (minute):00 (second):00 (frame). In the case of t3 (a frame difference of 30), the difference time information 219 is 00 (hour):00 (minute):1 (second):00 (frame).

The difference TC value calculating circuit 237 generates the addition and subtraction information 220 based on whether the difference time information 219 thus calculated is time information of + or −. In the case in which the calculated time information is + (more specifically, in the case in which the synchronous regulation set value 216>the synchronous point time information 233 is set), the addition and subtraction information (addition) 220 is generated. In the case in which the calculated time information is − (more specifically, in the case in which the synchronous regulation set value 216<the synchronous point time information 233 is set), the addition and subtraction information (subtraction) 220 is generated.

The addition and subtraction information (addition) 220 implies that the synchronous regulation set value 216 is positioned on the backward side (future side) on a time base with respect to the synchronous point. To the contrary, the addition and subtraction information (subtraction) 220 implies that the synchronous regulation set value 216 is positioned on the forward side (past side) on the time base with respect to the synchronous point.

The method of generating the difference time information 219 and the addition and subtraction information 220 by the difference TC value calculating circuit 237 has been schematically described above. The method of generating the difference time information 219 and the addition and subtraction information 220 will be described below in more detail.

In the difference TC value calculating circuit 237, the difference time information 219 is generated in the following manner based on the relative positional relationship between the first total count area number information 217 (the synchronous regulation set value 216) and the second total count area number information 218 (the synchronous point time information 233).

The Case of the First Total Count Area Number Information 217>the Second Total Count Area Number Information 218 and a Difference of Less than 12 Hours In this case, the difference in the count area number [the first total count area number information 217−the second total count area number information 218] is calculated, and the difference in the count area number is then converted into the time code information in the 30 frame/second format in the non-drop mode. Consequently, the difference time information 219 is generated. Furthermore, the addition and subtraction information (addition) 220 is generated.

The Case of the First Total Count Area Number Information 217>the Second Total Count Area Number Information 218 and a Difference of 12 Hours or More In this case, the difference in the count area number [(the Second Total Count Area Number Information 218+a count area number corresponding to 24 hours)−the first total count area number information 217] is calculated, and the difference in the count area number is then converted into the time code information in the 30 frame/second format in the non-drop mode. Consequently, the difference time information 219 is generated. Furthermore, the addition and subtraction information (subtraction) 220 is generated. In the case of this example, the count area number (frame number) corresponding to 24 hours indicates a count area number (frame number) corresponding to 24 hours in the non-drop 30 frame/second format, and more specifically, a count area number (frame number) of 2592000 is obtained.

The Case of the First Total Count Area Number Information 217<the Second Total Count Area Number Information 218 and a Difference of Less than 12 Hours In this case, the difference in the count area number [the second total count area number information 218−the first total count area number information 217] is calculated, and the difference in the count area number is then converted into the time code information in the 30 frame/second format in the non-drop mode. Consequently, the difference time information 219 is generated. Furthermore, the addition and subtraction information (subtraction) 220 is generated.

The Case of the First Total Count Area Number Information 217<the Second Total Count Area Number Information 218 and a Difference of 12 Hours or More In this case, the difference in the count area number [(the first total count area number information 217+a count area number corresponding to 24 hours)−the second total count area number information 218] is calculated, and the difference in the count area number is then converted into the time code information in the 30 frame/second format in the non-drop mode. Consequently, the difference time information 219 are generated. Furthermore, the addition and subtraction information (addition) 220 is generated.

The Case of the First Total Count Area Number Information 217=the Second Total Count Area Number Information 218

In this case, the difference time information 219 including a difference (00:00:00) and the addition and subtraction information (addition) 220 are generated.

The above processing is carried out for the following reason. A relative positional relationship on a time base between the synchronous regulation set value 216 and the synchronous point time information 233 is a relative positional relationship in the same day or a relative positional relationship interposing an international date line [24 (hour):00 (minute):00 (second):00 (frame)]. A time code is code data to be repeated in a cycle of 24 hours and cannot record the update of a date. For this reason, in the case of the relative positional relationship in the same day, there is no special problem. In the case of the positional relationship in which the set value 216 and the time information 233 are positioned with the international date line [24 (hour):00 (minute):00 (second):00 (frame)] interposed therebetween, their relative positional relationship on the time base is reversed. However, the difference time information 219 cannot be generated accurately.

On the other hand, a recording medium mainly comprising a magnetic recording tape which is currently used does not have a recording capacity of 12 hours or more. From this viewpoint, in the present embodiment, in the case in which a time difference of 12 hours or more is present between the synchronous regulation set value 216 and the synchronous point time information 233 is present, it is decided that such a relative positional relationship as to cause both of them to be opposed to each other with the international date line [24 (hour):00 (minute):00 (second):00 (frame)] interposed therebetween is set. Based on the decision, the count area number (frame number) corresponding to 24 hours is added to the first total count area number information 217 or the second total count area number information 218, and furthermore, an addition value thus obtained is subjected to the calculation of the difference in the count area number and the processing of a conversion to the time code information. Consequently, the relative positional relationship on the time base between the set value 216 and the time information 233 is corrected so that the difference time information 219 can be generated accurately.

The calculating circuit 238 generates the drop synchronous regulation set value 221 based on the difference time information 219 and the addition and subtraction information 220 which are thus calculated. More specifically, in the case in which a time passes (moved to the future side) or goes backward (moves to the past side) by the difference time information 219 defined in the non-drop 30 frame/ second format with respect to the synchronous point defined by the synchronous point time information 233, the value of the time code is obtained by a calculation.

For example, in the case in which the time t4 satisfies the conditions:

the synchronous regulation set value 216 is [11 (hour):09 (minute):00 (second):02 (frame)],
the difference time information 219 is [01 (hour):00 (minute):00 (second):00 (frame)], and
the addition and subtraction information (addition) 220, the drop synchronous regulation set value 221 is set to [11 (hour):09 (minute):03 (second):20 (frame)].

Similarly, in the case in which the time t3 satisfies the conditions:

the synchronous regulation set value 216 is [10 (hour):08 (minute):59 (second):02 (frame)],
the difference time information 219 is [00 (hour):01 (minute):01 (second):00 (frame)], and
the addition and subtraction information (subtraction) 220, the drop synchronous regulation set value 221 is set to [10 (hour):08 (minute):59 (second):00 (frame)].

Since the calculating method in the calculating circuit 238 is well known, detailed description will be omitted.

The switching circuit 239 switches the input drop synchronous regulation set value 221 and the synchronous regulation set value 216 based on the output LTCDF information 222, and outputs the output LTCDF information 222 to the second LTC signal output circuit 228. More specifically, in the case in which the output LTCDF information 222 is set in the drop mode, the drop synchronous regulation set value 221 is selected and is output to the second LTC signal output circuit 228. To the contrary, in the case in which the output LTCDF information 222 is set in the non-drop mode, the synchronous regulation set value 216 is selected and is output to the second LTC signal output circuit 228.

Ninth Embodiment

Figure 62:
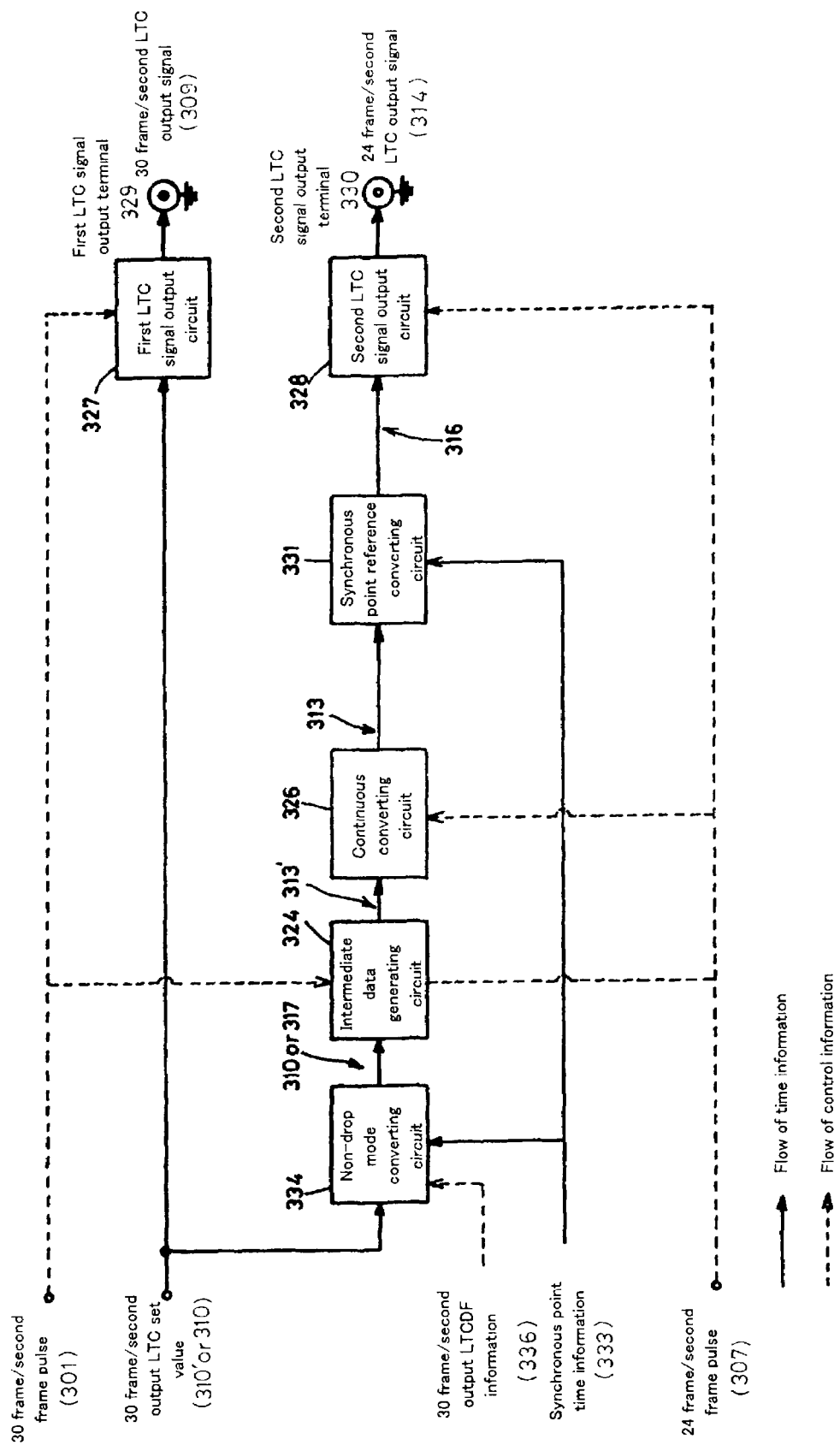
FIG. 62 is a block diagram showing the structure of a time code calculating apparatus according to a ninth embodiment of the present invention.
Figure 63:
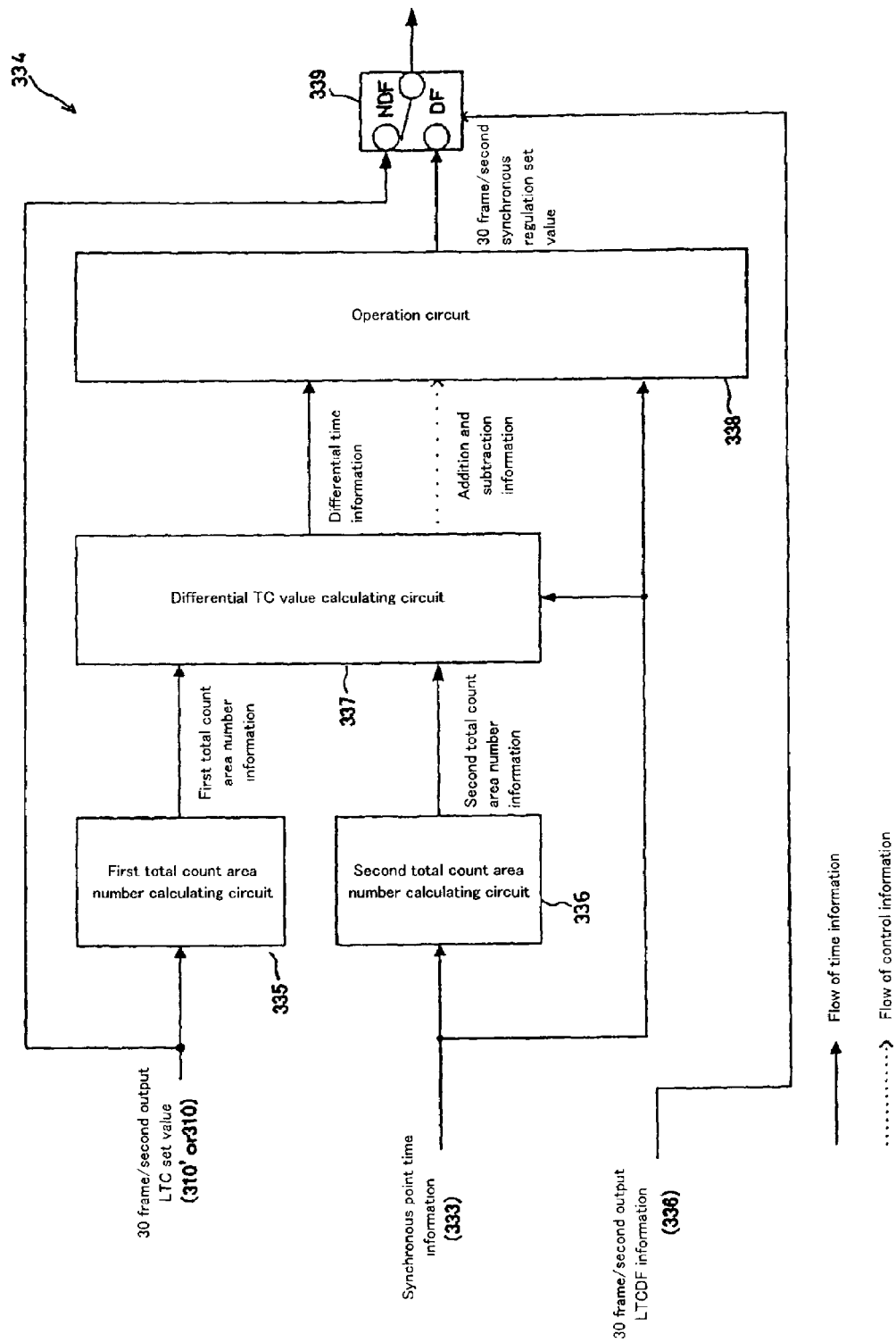
FIG. 63 is a block diagram showing the structure of a non-drop converting circuit according to the ninth embodiment.

A ninth embodiment of the present invention will be described with reference to FIGS. 62 and 63. The ninth embodiment provides a time code calculating apparatus for converting a time code of a 30 frame/second type (a drop mode) into a time code of a 24 frame/second type.

The basic structure according to the present embodiment is the same as that in the seventh embodiment, and the same or similar portions have the same reference numerals and description thereof will be omitted.

The time code calculating apparatus according to the present embodiment is characterized by a non-drop mode converting circuit 334 according to an example of a non-drop mode converter. The non-drop mode converting circuit 334 is provided on the input side of an intermediate data generating circuit 324. In the case in which a 30 frame/second output LTC set value 310' to be data in the drop mode is input, the non-drop mode converting circuit 334 converts the 30 frame/second output LTC set value 310' into a 30 frame/second synchronous regulation value 317 to be data in the non-drop mode and outputs the 30 frame/second synchronous regulation value 317 to the intermediate data generating circuit 324. To the contrary, in the case in which a 30 frame/second output LTC set value 310 to be data in the non-drop mode is input, the non-drop mode converting circuit 334 does not convert the set value 310 but exactly outputs the set value 310 to the intermediate data generating circuit 324.

The structure of the non-drop mode converting circuit 334 and the non-drop mode converting step to be executed by the non-drop mode converting circuit 334 are basically the same as those of the drop mode converting circuit 234 according to the eighth embodiment. More specifically, the non-drop mode converting circuit 334 comprises a first total count area number calculating circuit 335 according to an example of a first total count area number calculator, a second total count area number calculating circuit 336 according to an example of a second total count area number calculator, and a difference TC value calculating circuit 337 according to an example of a difference calculator, a calculating circuit 338 according to an example of a calculator, and a switching circuit 339.

The non-drop mode converting step to be executed by the non-drop mode converting circuit 334 will be described below.

When the 30 frame/second output LTC set value 310' is input, the first total count area number calculating circuit 335 converts the total count area number information (a 30 frame/second format in the drop mode) of time code information defined by the set value 310', thereby generating the first total count area number information 317.

When synchronous point time information 333 is input, the second total count area number calculating circuit 336 converts time code information defined by the information 333 into the total count area number information in a 30 frame/second format in the drop mode (corresponding to the total frame number information), thereby generating second total count area number information 318.

The difference TC value calculating circuit 337 calculates a difference (a frame number) between the first total count area number information 317 and the second total count area number information 318. Furthermore, the difference TC value calculating circuit 337 converts the difference (frame number) thus calculated into time information, thereby generating difference time information 319. Moreover, the difference TC value calculating circuit 337 generates addition and subtraction information 320 indicating whether the difference is positioned on the forward side (past side) or the backward side (future side) on a time basis with respect to a synchronous point.

The calculating circuit 338 converts the 30 frame/second output LTC set value 310' in the drop mode into a 30 frame/second synchronous regulation set value 321 to be data in the non-drop mode based on the difference time information 319 (non-drop time information), the addition and subtraction information 320 and the synchronous point time information 333. The position on a time basis of the 30 frame/second synchronous regulation set value 321 is regulated in such a manner that a synchronization is taken with the 24 frame/second synchronous regulation set value 316 at a point defined by the synchronous point time information 333.

The switching circuit 339 switches the input 30 frame/second synchronous regulation set value 321 and the 30 frame/second output LTC set value 310 in the non-drop mode based on the 30 frame/second output LTCDF information 336 and outputs them to the intermediate data generating circuit 324. More specifically, in the case in which the 30 frame/second output LTCDF information 336 is set in the drop mode, the 30 frame/second synchronous regulation set value 321 is selected and output to the intermediate data generating circuit 324. To the contrary, in the case in which the 30 frame/second output LTCDF information 336 is set in the non-drop mode, the 30 frame/second output LTC set value 310 in the non-drop mode is selected and output to the intermediate data generating circuit 324.

The intermediate data generating circuit 324 generates data 311 for 24 frame/second conversion based on the input 30 frame/second synchronous regulation set value 321 or 30 frame/second output LTC set value 310. Since the method has been described in detail in each of the above-mentioned embodiments, explanation will be omitted.

Tenth Embodiment

Figure 64:
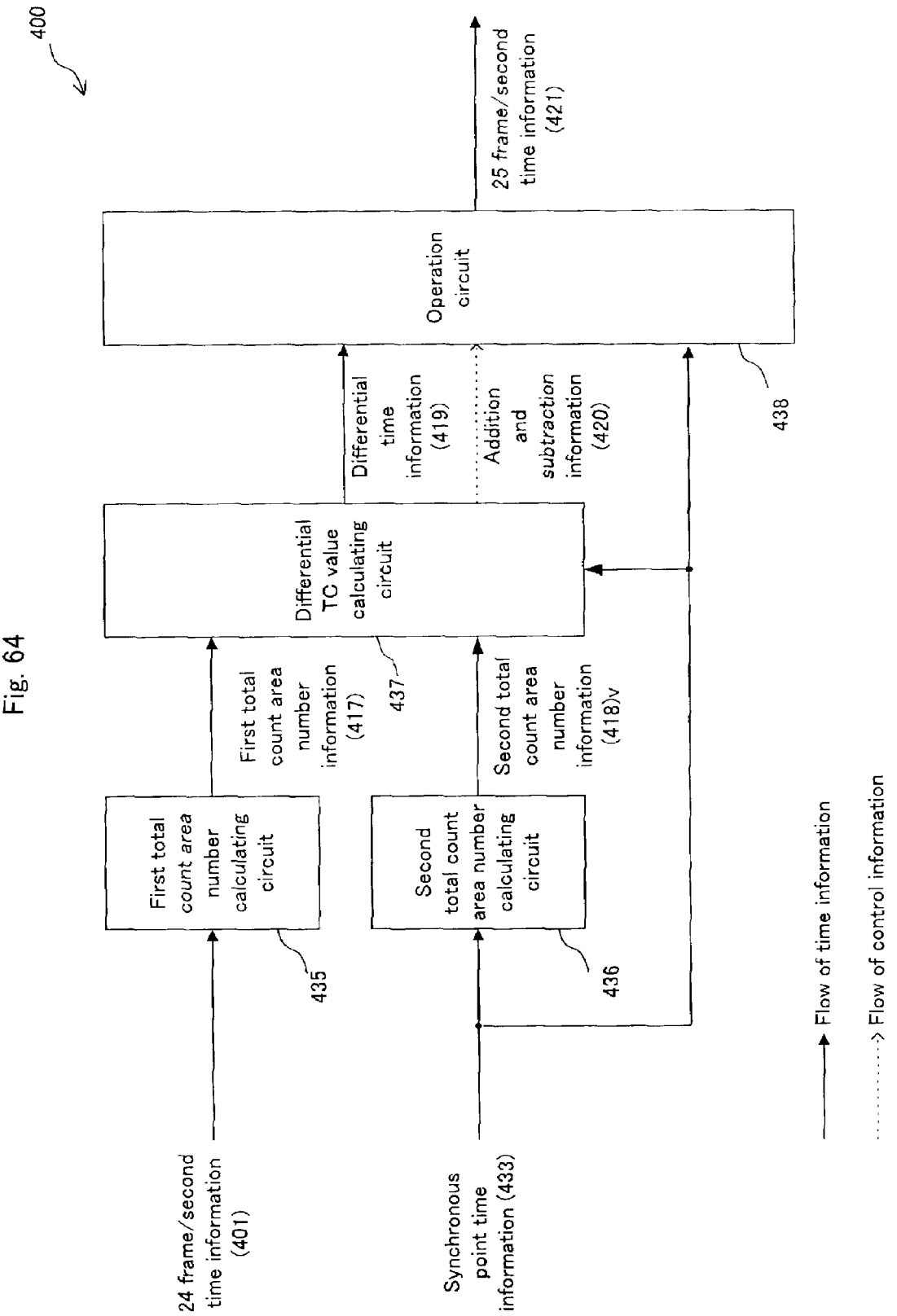
FIG. 64 is a block diagram showing the structure of a time code calculating apparatus according to a tenth embodiment of the present invention.

A tenth embodiment of the present invention will be described with reference to FIGS. 64 to 66. The tenth embodiment provides a time code calculating apparatus for converting a time code of a 24 frame/second type into a time code of a 25 frame/second type.

The time code calculating apparatus according to the present embodiment comprises a first total count area number calculating circuit 435 according to an example of a first total count area number calculator, a second total count area number calculating circuit 436 according to an example of a second total count area number calculator, a difference TC value calculating circuit 437 according to an example of a difference calculator, and a calculating circuit 438 according to an example of a calculator.

When 24 frame/second time information 401 is input, the first total count area number calculating circuit 435 converts the total count area number information (a 24 frame/second format) of time code information defined by the information 401, thereby generating first total count area number information 417.

When synchronous point time information 433 is input, the second total count area number calculating circuit 436 considers the information 433 to be the 24 frame/second format and converts time code information defined by the information 433 into the total count area number information in the 24 frame/second format (total frame number information), thereby generating second total count area number information 418.

The difference TC value calculating circuit 437 calculates a difference between the first total count area number information 417 and the second total count area number information 418. Furthermore, the difference TC value calculating circuit 437 converts the difference in the count area number (the difference in a frame number) thus calculated into time code information in a 25 frame/second format, thereby generating difference time information 419. Moreover, the difference TC value calculating circuit 437 generates addition and subtraction information 420 indicating whether the difference is positioned on the forward side or the backward side on a time basis with respect to a synchronous point.

The calculating circuit 438 converts the 24 frame/second time information 401 into 25 frame/second time information 421 based on the difference time information 419, the addition and subtraction information 420 and the synchronous point time information 433. In the execution of such a conversion processing, the calculating circuit 438 considers the synchronous point time information 433 to be the 25 frame/second format, thereby carrying out the operation.

Moreover, the position on a time basis of the 25 frame/second time information 421 is regulated in such a manner that a synchronization is taken with the 24 frame/second time information 401 at a point defined by the synchronous point time information 433.

A method of calculating a time code which is to be executed by the time code calculating apparatus according to the present embodiment will be described below with reference to a time chart of FIG. 65 and a signal output configuration chart of FIG. 66. The time code calculation implies a calculation for converting the time code in the 24 frame/second format into the time code in the 25 frame/second format.

The time code calculating apparatus according to the present embodiment executes an operation for simply reading the time code in the 24 frame/second format as the time code in the 25 frame/second format, thereby carrying out the processing of calculating the time code.

In this case, both of the formats have a frame difference of 1 frame/second. For this reason, in the case in which the time code in the 25 frame/second format obtained after the conversion is compared with the time code in the 24 frame/second format which has not been converted, a time difference between both of the time codes is increased when a time on the time code gains. The time difference between the time code in the 24 frame/second format and the time code in the 25 frame/second format is increased every frame for one second.

Figure 65:
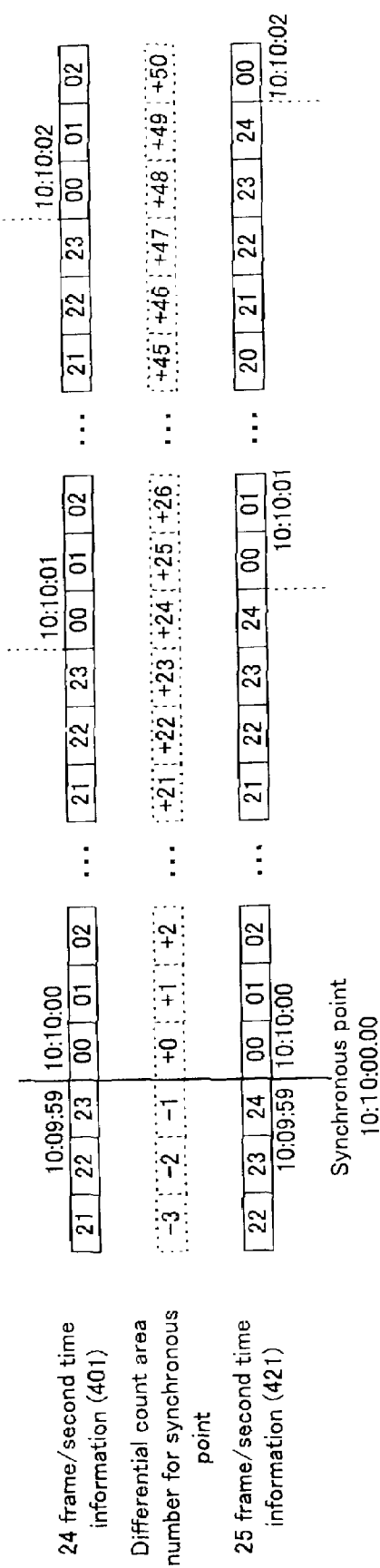
FIG. 65 is a diagram for explaining a time code calculation processing in the time code calculating apparatus according to the tenth embodiment.
Figure 66:
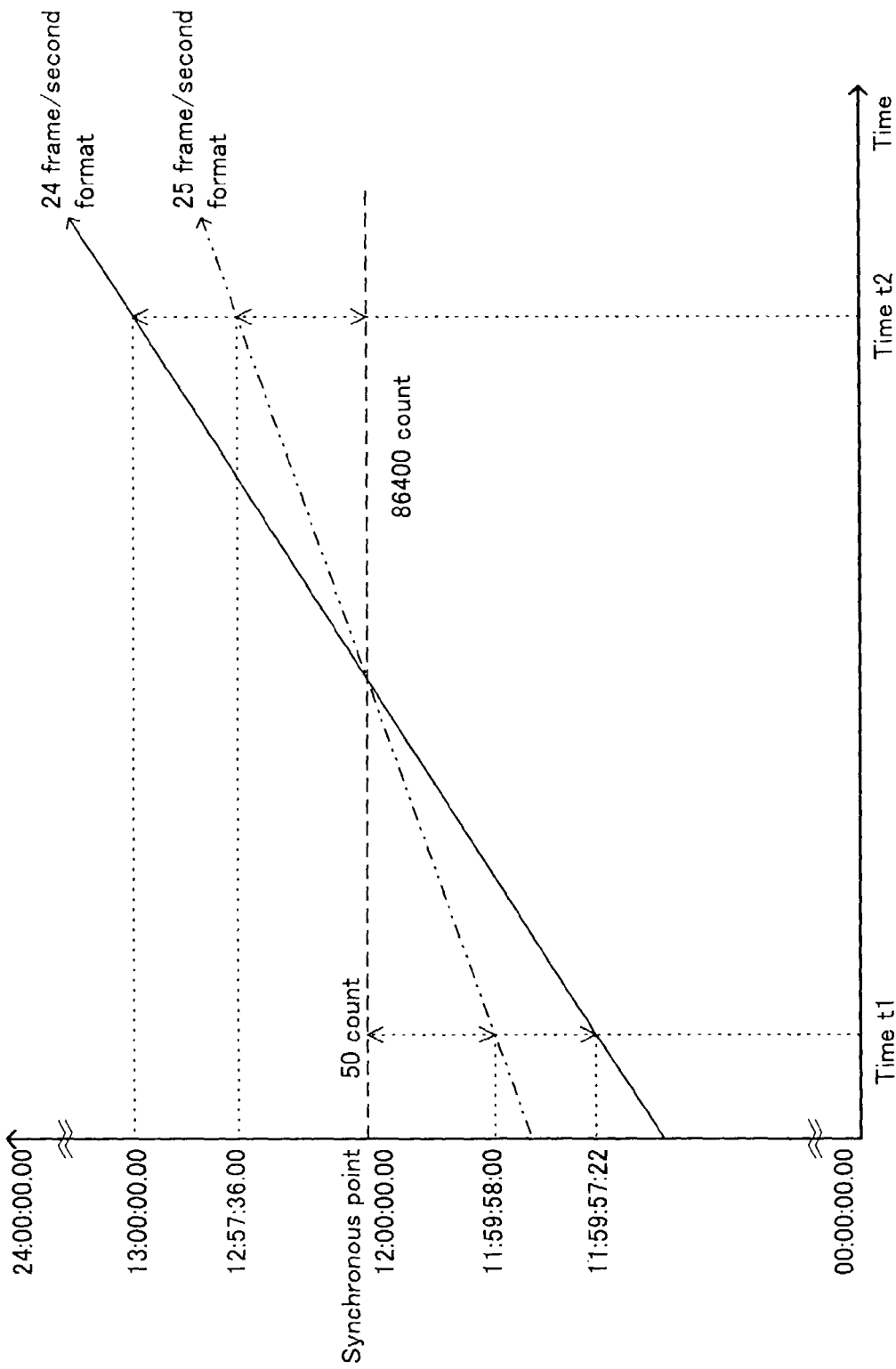
FIG. 66 is a chart for explaining the time code calculation processing in the time code calculating apparatus according to the tenth embodiment.

In an example shown in FIG. 65, when the time code in the 24 frame/second format is converted into the time code in the 25 frame/second format in such a state that the synchronous point is set to [10 (hour):10 (minute):00 (second):00 (frame)], the following time difference is made.

If a point of the time code in the 24 frame/second format in which one second passes from the synchronous point, that is, [10 (hour):10 (minute):01 (second):00 (frame)] is converted into the time code in the 25 frame/second format, [10 (hour):10 (minute):00 (second):24 (frame)] is obtained. After and before the conversion, a time difference corresponding to one frame in the 25 frame/second format is made.

Similarly, if a point of the time code in the 24 frame/second format in which two seconds pass from the synchronous point, that is, [10 (hour):10 (minute):02 (second):00 (frame)] is converted into the time code in the 25 frame/second format, [10 (hour):10 (minute):01 (second):23 (frame)] is obtained. After and before the conversion, a time difference corresponding to two frames in the 25 frame/second format is made.

Such a time difference can be calculated by the following processing. A difference count area number between each point on the 24 frame/second format and the synchronous point is calculated, and furthermore, the difference count area number is converted into the 25 frame/second format. Thus, the time difference can be calculated.

From the foregoing, it is preferable that the time code in the 25 frame/second format to be generated by the conversion should be shifted corresponding to the time difference from the synchronous point in order to synchronize the time code in the 24 frame/second format with the time code in the 25 frame/second format in the synchronous point.

For example, in the conversion of the time code in the 24 frame/second format indicative of [10 (hour):10 (minute):02 (second):00 (frame)] into the time code in the 25 frame/second format, it is preferable that the time code in the 25 frame/second format to be generated should be set with a shift to [10 (hour):10 (minute):01 (second):23 (frame)] in order to synchronize both of the time codes with each other in the synchronous point [10 (hour):10 (minute):00 (second):00 (frame)].

The time code calculating apparatus according to the present embodiment executes the time code conversion processing in the following manner. The time code calculating apparatus calculates a difference in a total frame between the 24 frame/second time information 401 and the synchronous point time information 433 and executes the time code conversion processing based on the result of the calculation.

The method of calculating a time code which is to be executed by the time code calculating apparatus according to the present embodiment will be described below in more detail. In the following description, the difference in a total count area number between the 24 frame/second time information 401 and he synchronous point time information 433 will be referred to as a difference count area number (abbreviated to a difference count area number) for the synchronous point.

As shown in FIG. 65, in the case in which the synchronous point is set to [10 (hour):10 (minute):00 (second):00 (frame)], the difference count area number is +48 when the 24 frame/second time information 401 is set to [10 (hour):10 (minute):02 (second):00 (frame)]. The time code on the 25 frame/second time information 421 corresponding to the difference count area number (+48) is [10 (hour):10 (minute):01 (second):23 (frame)].

In the 24 frame/second time information 401 and the 25 frame/second time information 421 to which the synchronous point is set, thus, frames correspond to each other one-on-one through a parameter to be the difference count area number (difference frame number). Thus, the difference count area number is calculated. Consequently, it is possible to calculate the 25 frame/second time information 421 to be the time code obtained after the conversion.

In consideration of such a time code calculating theory, the following processing is executed in the time code calculating method according to the present embodiment. First of all, in the difference TC value calculating circuit 437, a difference in a total count area number (a difference in a total frame number) between the 24 frame/second time information 401 and the synchronous point time information 433 is calculated. In the difference TC value calculating circuit 437, consequently, a difference count area number (a difference frame number) is calculated. In the difference TC value calculating circuit 437, furthermore, the difference count area number thus calculated is converted into the difference time information 419. In the difference time information 419, a point in which the time code advances by the difference count area number is defined by the 25 frame/second format to be a format obtained after the conversion.

In the example shown in FIG. 65, the difference time information 419 is as follows. The difference time information 419 corresponding to a point [10 (hour):10 (minute):02 (second):00 (frame)] of the time code on the 24 frame/second format is [00 (hour):00 (minute):01 (second):23 (frame)]

In other words, in the point [10 (hour):10 (minute):02 (second):00 (frame)] of the time code on the 24 frame/second format, the time code advances by 00 (hour):00 (minute):01 (second):23 (frame) with respect to a synchronous point of [10 (hour):10 (minute):00 (second):00 (frame)] in the 25 frame/second format.

The method of generating the difference time information 419 and the addition and subtraction information 420 by the difference TC value calculating circuit 437 has been schematically described above. The method of generating the difference time information 219 and the addition and subtraction information 420 will be described below in more detail.

In the difference TC value calculating circuit 437, the difference time information 419 is generated in the following manner based on the relative positional relationship between the first total count area number information 417 (the 24 frame/second time information 401) and the second total count area number information 418 (the synchronous point time information 433).

The Case of the First Total Count Area Number Information 417>the Second Total Count Area Number Information 418 and a Difference of Less than 12 Hours In this case, the difference in the count area number [the first total count area number information 417−the second total count area number information 418] is calculated, and the difference is then converted into the time code information in the 25 frame/second format. Consequently, the difference time information 419 is generated. Furthermore, the addition and subtraction information (addition) 420 is generated.

The Case of the First Total Count Area Number Information 417>the Second Total Count Area Number Information 418 and a Difference of 12 Hours or More In this case, the difference in the count area number [(the Second Total Count Area Number Information 418+a count area number corresponding to 24 hours)−the first total count area number information 417] is calculated, and the difference is then converted into the time information in the 25 frame/second format. Consequently, the difference time information 419 is generated. Furthermore, the addition and subtraction information (subtraction) 420 is generated. In the case of this example, the count area number (frame number) corresponding to 24 hours indicates a count area number (frame number) corresponding to 24 hours in the 24 frame/second format, and more specifically, a count (frame) of 2073600 is obtained.

The Case of the First Total Count Area Number Information 417<the Second Total Count Area Number Information 418 and a Difference of Less than 12 Hours In this case, the difference in the count area number [the second total count area number information 418−the first total count area number information 417] is calculated, and the difference is then converted into the time information in the 25 frame/second format. Consequently, the difference time information 419 is generated. Furthermore, the addition and subtraction information (subtraction) 420 is generated.

The Case of the First Total Count Area Number Information 417<the Second Total Count Area Number Information 418 and a Difference of 12 Hours or More In this case, the difference in the count area number [(the first total count area number information 417+a count area number corresponding to 24 hours)−the second total count area number information 418] is calculated, and the difference is then converted into the time information in the 25 frame/second format. Consequently, the difference time information 419 is generated. Furthermore, the addition and subtraction information (addition) 420 is generated.

The Case of the First Total Count Area Number Information 417=the Second Total Count Area Number Information 418

In this case, the difference time information 419 including a difference (00:00:00) and the addition and subtraction information (addition) 420 are generated.

The above processing is carried out for the following reason. A relative positional relationship on a time base between the 24 frame/second time information 401 and the synchronous point time information 433 is a relative positional relationship in the same day or a relative positional relationship interposing an international date line [24 (hour):00 (minute):00 (second):00 (frame)]. On the other hand, a time code is code data to be repeated in a cycle of 24 hours and cannot record the update of a date. For this reason, in the case of the relative positional relationship in the same day, there is no special problem. In the case of the positional relationship in which the 24 frame/second time information 401 and the synchronous point time information 433 are positioned with the international date line [24 (hour):00 (minute):00 (second):00 (frame)] interposed therebetween, their relative positional relationship on the time base is reversed. However, the difference time information 419 cannot be generated accurately.

On the other hand, a recording medium mainly comprising a magnetic recording tape which is currently used doe not have a recording capacity of 12 hours or more. From this viewpoint, in the present embodiment, in the case in which a time difference of 12 hours or more is present between the 24 frame/second time information 401 and the synchronous point time information 433 is present, it is decided that such a relative positional relationship as to cause both of them to be opposed to each other with the international date line [24 (hour):00:00] interposed therebetween is set. Based on the decision, the count area number (frame number) corresponding to 24 hours is added to the first total count area number information 417 or the second total count area number information 418, and furthermore, the calculation of the difference in the count area number (the difference in the frame number) and the processing of a conversion to the time code information are carried out. Consequently, the relative positional relationship on the time base between the 24 frame/second time information 401 and the synchronous point time information 433 is corrected so that the difference time information 419 can be generated accurately.

The calculating circuit 438 to which the difference time information 419 thus generated, the addition and subtraction information 420 and the synchronous point time information 433 are input executes the following operation. In the case in which a time passes or goes backward by the difference time information 419 defined in the 25 frame/second format with respect to the synchronous point defined by the synchronous point time information 433, the calculating circuit 438 calculates the value of the time code. Consequently, the calculating circuit 438 generates the 25 frame/second time information 421.

In the case in which the difference time information 419 is plus (the point defined by the 24 frame/second time information 401 is later than the synchronous point on a time basis), the addition and subtraction information 420 indicates the (addition) to teach such a situation to the calculating circuit 438. In the case in which the difference time information 419 is minus (the point defined by the 24 frame/second time information 401 is earlier than the synchronous point on a time basis), similarly, the addition and subtraction information 420 indicates the (subtraction) to teach such a situation to the calculating circuit 438.

The specific calculating method in the calculating circuit 438 is not the feature of the present invention but may be executed in any well-known method. For this reason, detailed description will be omitted.

The time code converting operation according to the present embodiment will be described below in more detail with reference to FIG. 66. The description will be given by taking the following state as an example. The description will be given to the time code converting operation according to the present embodiment by taking, as an example, how the 24 frame/second time information 401 indicative of a point t1 [11 (hour):59 (minute):57 (second):22 (frame)] or the 24 frame/second time information 401 indicative of a point t2 [13 (hour):00 (minute):00 (second):00 (frame)] is converted into the 25 frame/second time information 421 on the assumption that a point [12 (hour):00 (minute):00 (second):00 (frame)] at which 12 hours just pass from the start of recording of the time code is set to be the synchronous point.

First of all, in the first total count area number calculating circuit 435, a total count area number (first total count area number information 417) in the 24 frame/second time information 401 is calculated. Herein, [13 (hour):00 (minute):00 (second):00 (frame)]=1123200 (in the case of t2) and [11 (hour):59 (minute):57 (second):22 (frame)]=1036750 (in the case of t1) are calculated as the second total count area number information 418.

On the other hand, in the second total count area number calculating circuit 436, a total count area number (the second total count area number information 418) in the synchronous point time information 433 is calculated. Herein, [12 (hour):00 (minute):00 (second):00 (frame)]=1036800 is calculated as the first total count area number information 417.

In the difference TC value calculating circuit 437, first of all, a difference in a count area number (a difference in a frame number) between the first total count area number information 417 and the second total count area number information 418 is calculated. Herein, 1123200−1036800=86400 (in the case of t2) and 1036800−1036750=50 (in the case of t1) are calculated as the difference in the count area number (the difference in the frame number).

In the difference TC value calculating circuit 437, furthermore, the difference in the count area number thus calculated is converted as the difference time information 419 in the 25 frame/second format. In the case of t2, [00 (hour):57 (minute):36 (second):00 (frame)] is calculated as the difference time information 419. In this case, the addition and subtraction information 420 indicates the (addition). In the case of t1, [00 (hour):00 (minute):02 (second):00 (frame)] is calculated as the difference time information 419. In this case, the addition and subtraction information 420 indicates the (subtraction).

In the calculating circuit 438, 25 frame/second time information 421 is generated based on the difference time information 419 and the addition and subtraction information 420 which are input. In the case of t2, [12 (hour):57 (minute):36 (second):00 (frame)] is generated as the 25 frame/second time information 421. In the case of t1, [11 (hour):59 (minute):58 (second):00 (frame)] is generated as the 25 frame/second time information 421.

Eleventh Embodiment

Figure 67:
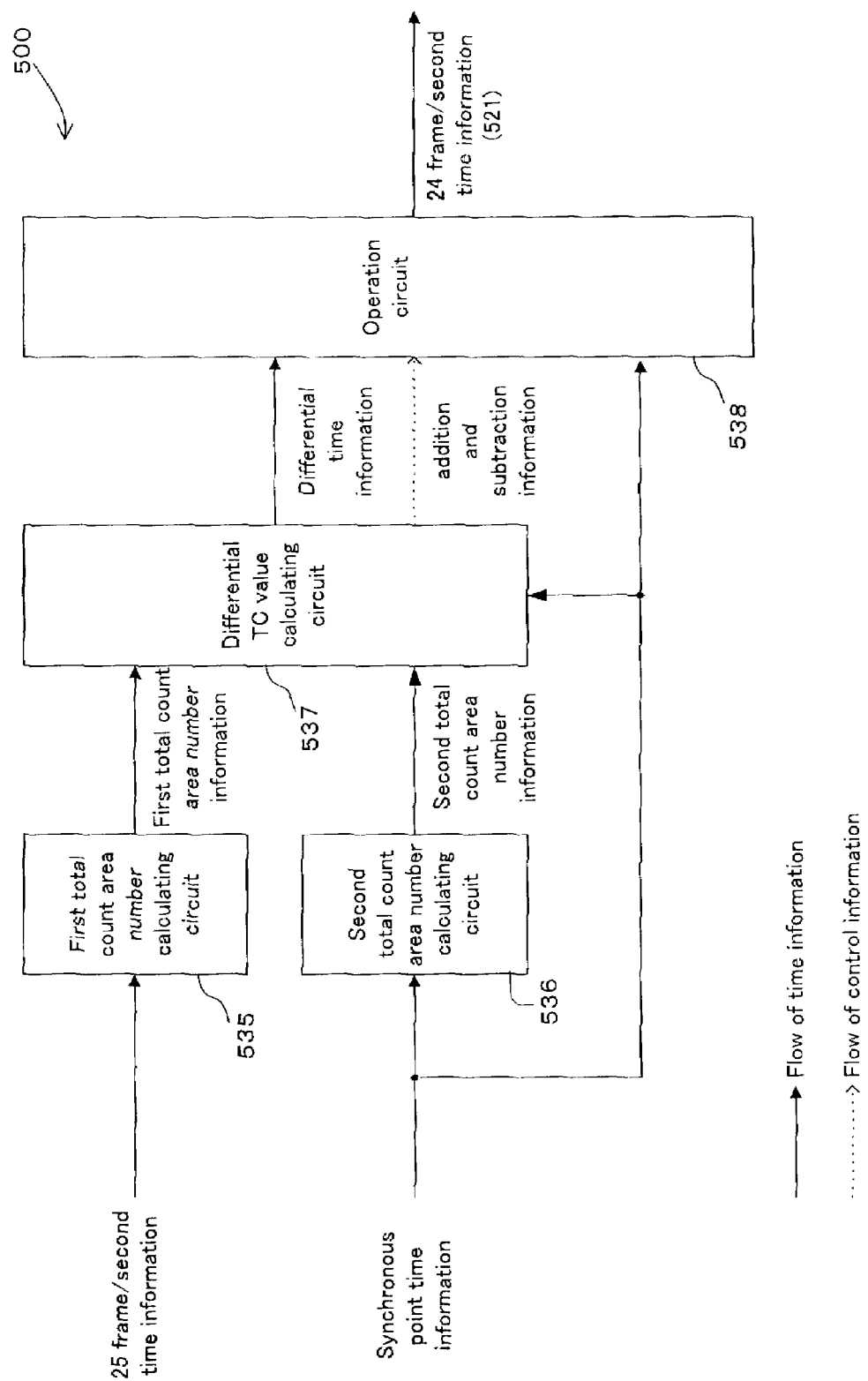
FIG. 67 is a block diagram showing the structure of a time code calculating apparatus according to an eleventh embodiment of the present invention.

An eleventh embodiment of the present invention will be described with reference to FIGS. 67, 68 and 69. The eleventh embodiment provides a time code calculating apparatus for converting a time code of a 25 frame/second type into a time code of a 24 frame/second type.

The time code calculating apparatus according to the present embodiment comprises a first total count area number calculating circuit 535 according to an example of a first total count area number calculator, a second total count area number calculating circuit 536 according to an example of a second total count area number calculator, a difference TC value calculating circuit 537 according to an example of a difference calculator, and a calculating circuit 538 according to an example of a calculator.

When 25 frame/second time information 501 is input, the first total count area number calculating circuit 535 converts the total count area number information (a 25 frame/second format) of time code information defined by the information 501, thereby generating first total count area number information 517.

When synchronous point time information 533 is input, the second total count area number calculating circuit 536 considers the information 533 to be the 25 frame/second format and converts the defined time code information into the total count area number (total frame number) information in the 25 frame/second format, thereby generating second total count area number information 518.

The difference TC value calculating circuit 537 calculates a difference between the first total count area number information 517 and the second total count area number information 518. Furthermore, the difference TC value calculating circuit 537 converts the difference count area number thus calculated into time code information in a 24 frame/second information, thereby generating difference time information 519. Moreover, the difference TC value calculating circuit 537 generates addition and subtraction information 520 indicating whether the difference is positioned on the forward side or the backward side on a time basis with respect to a synchronous point.

The calculating circuit 538 converts the 25 frame/second time information 501 into 24 frame/second time information 521 based on the difference time information 519, the addition and subtraction information 520 and the synchronous point time information 533 which is considered to be in the 24 frame/second format. The position on a time basis of the 24 frame/second time information 521 is regulated in such a manner that a synchronization is taken with the 25 frame/second time information 501 on a point defined by the synchronous point time information 533.

A method of calculating a time code which is to be executed by the time code calculating apparatus according to the present embodiment will be described below in more detail with reference to a time chart of FIG. 68 and a signal output configuration chart of FIG. 66.

Figure 68:
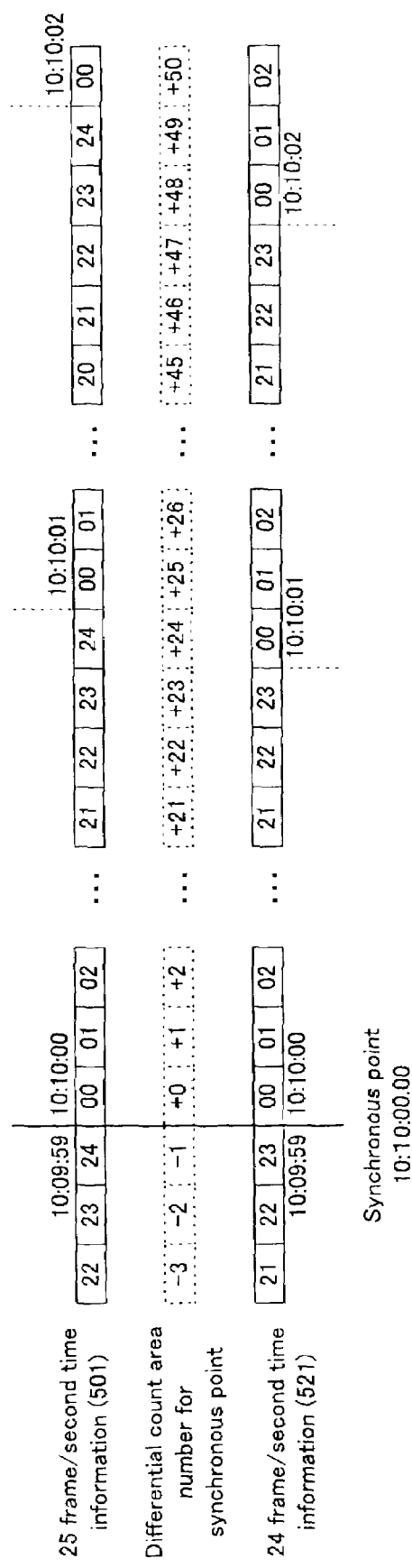
FIG. 68 is a diagram for explaining a time code calculation processing in the time code calculating apparatus according to the eleventh embodiment.

A processing of converting the time code in the 25 frame/second format into the time code in the 24 frame/second format is executed by simply reading the time code in the 25 frame/second format as the time code in the 24 frame/second format as shown in FIG. 68.

In this case, both of the formats have a frame difference of 1 frame/second. For this reason, in the case in which the time code in the 24 frame/second format obtained after the conversion is compared with the time code in the 25 frame/second format which has not been converted, a time difference between both of the time codes is increased when a time on the time code gains with respect to a synchronous point. The time difference between the time code in the 25 frame/second format and the time code in the 24 frame/second format is decreased every frame for one second.

An example shown in FIG. 68 indicates that the following time difference is made when the time code in the 25 frame/second format is converted into the time code in the 24 frame/second format in such a state that the synchronous point is set to [10 (hour):10 (minute):00 (second):00 (frame)].

A point of the time code in the 25 frame/second format in which one second passes from the synchronous point, that is, [10 (hour):10 (minute):01 (second):00 (frame)] is converted into the time code in the 24 frame/second format, [10 (hour):10 (minute):01 (second):01 (frame)] is obtained. After and before the conversion, a time difference corresponding to one frame in the 24 frame/second format is made.

Similarly, a point of the time code in the 25 frame/second format in which two seconds pass from the synchronous point, that is, [10 (hour):10 (minute):02 (second):00 (frame)] is converted into the time code in the 24 frame/second format, [10 (hour):10 (minute):02 (second):02 (frame)] is obtained. After and before the conversion, a time difference corresponding to two frames in the 24 frame/second format is made.

Such a time difference can be calculated by the following processing. A difference count area number between each point on the 25 frame/second format and the synchronous point is calculated, and furthermore, the difference count area number is converted into the 24 frame/second format. Thus, the time difference can be calculated.

From the foregoing, it is preferable that the time code in the 24 frame/second format to be generated by the conversion should be shifted corresponding to the time difference from the synchronous point in order to synchronize the time code in the 25 frame/second format with the time code in the 24 frame/second format in the synchronous point.

For example, in the conversion of the time code in the 25 frame/second format indicative of [10 (hour):10 (minute):02 (second):00 (frame)] into the time code in the 24 frame/second format, it is preferable that the time code in the 24 frame/second format to be generated should be set with a shift to [10 (hour):10 (minute):02 (second):02 (frame)] in order to synchronize both of the time codes with each other in the synchronous point [10 (hour):10 (minute):00 (second):00 (frame)].

The time code calculating apparatus according to the present embodiment executes the time code conversion processing in the following manner. The time code calculating apparatus calculates a difference in a total frame between the 25 frame/second time information 501 and the synchronous point time information 533 and executes the time code conversion processing based on the result of the calculation. Since such a conversion processing is basically the same as the conversion processing according to the tenth embodiment, more detailed description thereof will be omitted.

In consideration of such a time code calculating theory, the following processing is executed in the present embodiment. First of all, in the difference TC value calculating circuit 537, a difference in a total count area number (a difference in a frame number) between the 25 frame/second time information 501 and the synchronous point time information 533 is calculated so that a difference count area number is calculated. In the difference TC value calculating circuit 537, furthermore, the difference count area number thus calculated is converted into the difference time information 519. In the difference time information 519, a point in which the time code advances by the difference count area number is defined by the 24 frame/second format to be a format obtained after the conversion.

In the example shown in FIG. 68, the difference time information 519 is as follows. The difference time information 519 corresponding to a point [10 (hour):10 (minute):02

(second):00 (frame)] of the time code on the 25 frame/second format is [00 (hour):00 (minute):02 (second) 02 (frame)]

In other words, in the point [10 (hour):10 (minute):02 (second):00 (frame)] of the time code on the 25 frame/second format, the time code advances by a synchronous point of 00 (hour):00 (minute):02 (second):02 (frame) with respect to [10 (hour):10 (minute):00 (second):00 (frame)] in the 24 frame/second format.

The method of generating the difference time information 519 and the addition and subtraction information 520 by the difference TC value calculating circuit 537 has been schematically described above. In more detail, the method of generating the difference time information 519 and the addition and subtraction information 520 is the same as that described in the tenth embodiment and description thereof will be therefore omitted. The count area number (frame number) corresponding to 24 hours in this example indicates a count area number (frame number) corresponding to 24 hours in the 25 frame/second format, and more specifically, a count (frame) of 2160000 is obtained.

The difference time information 519 thus generated is input to the calculating circuit 538 together with the addition and subtraction information 520 and the synchronous point time information 533. Consequently, the 24 frame/second time information 521 is generated in the calculating circuit 538. The generation of the 24 frame/second time information 521 is executed in the following manner. By obtaining, by a calculation, the value of the time code when a time passes or goes backward by the difference time information 519 defined in the 24 frame/second format with respect to the synchronous point defined by the synchronous point time information 533, the 24 frame/second time information 521 is generated.

In the case in which the difference time information 519 is plus (the point defined by the 25 frame/second time information 501 is later than the synchronous point on a time basis), the addition and subtraction information 520 indicates the (addition) to teach such a situation to the calculating circuit 538. In the case in which the difference time information 519 is minus (the point defined by the 25 frame/second time information 501 is earlier than the synchronous point on a time basis), similarly, the addition and subtraction information 520 indicates the (subtraction) to teach such a situation to the calculating circuit 538.

The specific calculating method in the calculating circuit 538 is not the feature of the present invention but may be executed in any well-known method. For this reason, detailed description will be omitted.

The time code converting operation according to the present embodiment will be described below in more detail with reference to FIG. 66. Since the state shown in FIG. 66 has been described in the tenth embodiment, detailed description thereof will be omitted.

First of all, in the first total count area number calculating circuit 535, a total count area number (first total count area number information 517) in the 25 frame/second time information 501 is calculated. Herein, [12 (hour):57 (minute):36 (second):00 (frame)]=1166400 (in the case of t2) and [11 (hour):59 (minute):58 (second):00 (frame)]=1079950 (in the case of t1) are calculated as second total count area number information 518.

On the other hand, in the second total count area number calculating circuit 536, a total count area number (the second total count area number information 518) in the synchronous point time information 533 is calculated. Herein, [12 (hour): 00 (minute):00 (second):00 (frame)]=1080000 is calculated as the first total count area number information 517.

In the difference TC value calculating circuit 537, first of all, a difference in a count area number (a difference in a frame number) between the first total count area number information 517 and the second total count area number information 518 is calculated. Herein, 1166400−1080000=86400 (in the case of t2) and 1080000−1079950=50 (in the case of t1) are calculated as the difference in the count area number.

In the difference TC value calculating circuit 537, furthermore, the difference in the count area number thus calculated is converted as the difference time information 519 in the 24 frame/second format. In the case of t2, [01 (hour):00 (minute):00 (second):00 (frame)] is calculated as the difference time information 519. In this case, the addition and subtraction information 520 indicates the (addition). In the case of t1, [00 (hour):00 (minute):02 (second):02 (frame)] is calculated as the difference time information 519. In this case, the addition and subtraction information 520 indicates the (subtraction).

In the calculating circuit 538, the 24 frame/second time information 521 is generated based on the difference time information 519 and the addition and subtraction information 520 which are input. In the case of t2, [13 (hour):00 (minute):00 (second):00 (frame)] is generated as the 25 frame/second time information 521. In the case of t1, [11 (hour):59 (minute):57 (second):22 (frame)] is generated as the 24 frame/second time information 521.

As described above, according to the present invention, it is possible to provide a time code calculating method and a time code calculating apparatus which can be used optimally when converting the standard of an image signal.

While the most preferred embodiments of the present invention have been described in detail, the combination and arrangement for the preferred embodiments can be variously changed without departing from the spirit and scope of the present invention described in the appended claims.

What is claimed is:

1. A time code calculating method for converting a predetermined time code into another time code in a different format while increasing or decreasing a count value for one second corresponding to the format of the time code obtained after the conversion, comprising:
    an intermediate data generating step of generating intermediate data by reading the time code which has not been converted in a frame pulse corresponding to the time code obtained after the conversion; and
    an overlapping count value correcting step of correcting an overlapping count value generated in the intermediate data to add a continuity to the intermediate data, thereby generating the time code which has been converted.

2. The time code calculating method according to claim 1, wherein at the overlapping count value correcting step, a continuity addition offset for adding a continuity to the count value is added to or subtracted from the intermediate data.

3. The time code calculating method according to claim 2, wherein an overlapping count value decision signal for deciding a relative positional relationship of the overlapping count value is generated from a frame pulse corresponding to the time code which has not been converted, and the continuity addition offset is set based on a correspondence relationship between the overlapping count value decision signal and the intermediate data.

4. The time code calculating method according to claim 1, wherein at the overlapping count value correcting step, an operational correction is carried out in such a manner that a count value positioned rearward on a time base in adjacent count values continues from a count value positioned forward when whether a continuity of the adjacent count values is missing is decided and it is decided that the continuity is missing.

5. The time code calculating method according to claim 1, further comprising the synchronous regulating step of causing a synchronous count position of the time code obtained after the conversion to be coincident with a synchronous count position of the time code which has not been converted, at the synchronous regulating step, a synchronous regulation offset being created corresponding to the synchronous count position of the time code which has not been converted and being added to or subtracted from the time code obtained after the conversion.

6. The time code calculating method according to claim 1, further comprising the drop mode converting step of converting the time code obtained after the conversion into a time code in a drop mode, the drop mode converting step including the steps of:
calculating a total count area number in each count area in a time code obtained after the conversion of the time code;
calculating a total count area number in a synchronous point position in the time code obtained after the conversion of the time code;
calculating a difference between the total count area number of the count area and the total count area number of the synchronous point, and converting the difference into difference time information in a time code obtained after drop mode conversion; and
calculating time information in each count area in the time code obtained after the drop mode conversion from the difference time information and time information of the synchronous point position, thereby generating a time code after the drop mode conversion.

7. The time code calculating method according to claim 1, further comprising the non-drop mode converting step of converting a time code in a drop mode which has not been conversion into a time code in a non-drop mode as a preprocessing for the time code conversion, the non-drop mode converting step including the steps of:
calculating a total count area number in each count area in a time code obtained before the conversion of the time code;
calculating a total count area number in a synchronous point position in the time code obtained before the conversion of the time code;
calculating a difference between the total count area number of the count area and the total count area number of the synchronous point, and converting the difference into difference time information in a time code obtained after non-drop mode conversion; and
calculating time information in each count area in the time code obtained after the non-drop mode conversion from the difference time information and time information of the synchronous point position, thereby generating a time code after the non-drop mode conversion.

8. A time code calculating apparatus for converting a predetermined time code into another time code in a different format while increasing or decreasing a count value for one second corresponding to the format of the time code obtained after the conversion, comprising:

an intermediate data generator for generating intermediate data by reading the time code which has not been converted in a frame pulse corresponding to the time code obtained after the conversion; and
an overlapping count value corrector for correcting an overlapping count value generated in the intermediate data to add a continuity to the intermediate data, thereby generating the time code obtained after the conversion.

9. The time code calculating apparatus according to claim 8, wherein the overlapping count value corrector serves to add or subtract a continuity addition offset for adding a continuity to the count value to or from the intermediate data.

10. The time code calculating apparatus according to claim 9, wherein the overlapping count value corrector serves to generate an overlapping count value decision signal for deciding a relative positional relationship of the overlapping count value from a frame pulse corresponding to the time code which has not been converted, and to set the continuity addition offset based on a correspondence relationship between the overlapping count value decision signal and the intermediate data.

11. The time code calculating apparatus according to claim 8, wherein the overlapping count value corrector serves to carry out an operational correction in such a manner that a count value positioned rearward on a time base in adjacent count values continues from a count value positioned forward when whether a continuity of the adjacent count values is missing is decided and it is decided that the continuity is missing.

12. The time code calculating apparatus according to claim 8, further comprising a synchronous regulator for causing a synchronous count position of the time code obtained after the conversion to be coincident with a synchronous count position of the time code which has not been converted, the synchronous regulator serving to create a synchronous regulation offset corresponding to the synchronous count position of the time code which has not been converted and to add or subtract the synchronous regulation offset to or from the time code obtained after the conversion.

13. The time code calculating apparatus according to claim 8, further comprising a drop mode converter for converting the time code obtained after the conversion into a time code in a drop mode, the drop mode converter including:
a first total count area number calculator for calculating a total count area number in each count area in a time code obtained after the conversion of the time code;
a second total count area number calculator for calculating a total count area number in a synchronous point position in the time code obtained after the conversion of the time code;
a difference calculator for calculating a difference between the total count area number of the count area and the total count area number of the synchronous point, and converting the difference into difference time information in a time code obtained after drop mode conversion; and
a calculator for calculating time information in each count area in the time code obtained after the drop mode conversion from the difference time information and time information of the synchronous point position, thereby generating a time code after the drop mode conversion.

14. The time code calculating apparatus according to claim 8, further comprising a non-drop mode converter for converting a time code in a drop mode which has not been conversion into a time code in a non-drop mode as a preprocessing for the time code conversion, the non-drop mode converter including:
a first total count area number calculator for calculating a total count area number in each count area in a time code obtained before the conversion of the time code;
a second total count area number calculator for calculating a total count area number in a synchronous point position in the time code obtained before the conversion of the time code;
a difference calculator for calculating a difference between the total count area number of the count area and the total count area number of the synchronous point, and converting the difference into difference time information in a time code obtained after non-drop mode conversion; and a calculator for calculating time information in each count area in the time code obtained after the non-drop mode conversion from the difference time information and time information of the synchronous point position, thereby generating a time code after the non-drop mode conversion.

* * * * *